(12) United States Patent
Gao et al.

(10) Patent No.: US 11,993,904 B2
(45) Date of Patent: May 28, 2024

(54) AUTOMATIC MOVING SNOW REMOVAL DEVICE

(71) Applicant: Positec Power Tools (Suzhou) Co., Ltd., Jiangsu (CN)

(72) Inventors: Don Zhendong Gao, Suzhou (CN); Ka Tat Kelvin Wong, Suzhou (CN); Shiping Jiao, Suzhou (CN); Xiahong Zha, Suzhou (CN); Fengli Zhao, Suzhou (CN); Xianfeng Li, Suzhou (CN)

(73) Assignee: Positec Power Tools (Suzhou) Co., Ltd., JiangSu (CN)

( * ) Notice: Subject to any disclaimer, the term of this patent is extended or adjusted under 35 U.S.C. 154(b) by 70 days.

(21) Appl. No.: 17/827,314

(22) Filed: May 27, 2022

(65) Prior Publication Data

US 2022/0282440 A1 Sep. 8, 2022

Related U.S. Application Data

(63) Continuation of application No. 17/004,549, filed on Aug. 27, 2020, now Pat. No. 11,352,757, which is a
(Continued)

(30) Foreign Application Priority Data

Feb. 6, 2016 (CN) .......................... 201610083759.X
Sep. 18, 2016 (CN) .......................... 201610828015.6
Oct. 14, 2016 (CN) .......................... 201610898386.1

(51) Int. Cl.
*G05D 1/00* (2006.01)
*E01H 1/00* (2006.01)
(Continued)

(52) U.S. Cl.
CPC ............... *E01H 5/098* (2013.01); *E01H 1/00* (2013.01); *E01H 5/045* (2013.01); *E01H 5/08* (2013.01);
(Continued)

(58) Field of Classification Search
CPC ........... E01H 5/045; E01H 5/08; E01H 5/098; E01H 1/00; G05D 1/02; G05D 1/021; G01S 15/93; G01S 15/931
See application file for complete search history.

(56) References Cited

U.S. PATENT DOCUMENTS 1,770,587 A 7/1930 Carpenter
2,175,542 A 10/1939 Robarge
(Continued)

FOREIGN PATENT DOCUMENTS

CA 2752554 8/2010
CN 2641120 Y 9/2004
(Continued)

OTHER PUBLICATIONS

State Intellectual Property Office of the P.R. China, International Search Report and Written Opinion (English translation included) for PCT/CN2017/072996 dated Apr. 26, 2017.
(Continued)

*Primary Examiner* — Tara Mayo
(74) *Attorney, Agent, or Firm* — Lee & Hayes P.C.

(57) ABSTRACT

An automatic moving snow removal device including a moving module, driving a snow blower to move; a working module, including a working motor and a snow throwing mechanism driven by the working motor, the snow throwing mechanism is driven by the working motor to collect accumulated snow and inclusions on the ground and throw out of the snow throwing mechanism; and a control module, configured to control a rotary speed of the working motor to
(Continued)

cause a speed when the inclusions depart from the snow throwing mechanism is not higher than 41 m/s.

18 Claims, 36 Drawing Sheets

Related U.S. Application Data continuation of application No. 16/054,239, filed on Aug. 3, 2018, now Pat. No. 10,920,386, which is a continuation of application No. PCT/CN2017/072996, filed on Feb. 6, 2017.

(51) Int. Cl.
    *E01H 5/04*     (2006.01)
    *E01H 5/08*     (2006.01)
    *E01H 5/09*     (2006.01)
    *G01S 15/93*     (2020.01)
    *G01S 15/931*     (2020.01)

(52) U.S. Cl.
    CPC ............ *G01S 15/93* (2013.01); *G01S 15/931* (2013.01); *G05D 1/02* (2013.01); *G05D 1/021* (2013.01)

(56) References Cited

U.S. PATENT DOCUMENTS

| | | |
|---|---|---|
| 3,805,421 A | 4/1974 | Kamlukin et al. |
| 4,255,880 A | 3/1981 | McMickle et al. |
| 4,477,989 A | 10/1984 | Vachon |
| 8,037,624 B2 | 10/2011 | McKeown et al. |
| 2010/0205834 A1 | 8/2010 | McKeown et al. |
| 2014/0180478 A1 | 6/2014 | Letsky |
| 2016/0244925 A1 | 8/2016 | Yuki et al. |
| 2017/0073916 A1 | 3/2017 | Palicki et al. |

FOREIGN PATENT DOCUMENTS

| | | |
|---|---|---|
| CN | 1904215 A | 1/2007 |
| CN | 100566126 | 12/2009 |
| CN | 202090316 U | 12/2011 |
| CN | 103911967 A | 7/2014 |
| CN | 203846440 U | 9/2014 |
| EP | 2398967 | 11/2017 |
| JP | 2007032209 | 2/2007 |
| JP | 4433477 | 3/2010 |
| WO | 2010094116 | 8/2010 |
| WO | 2016102144 A1 | 6/2016 |
| WO | 2017133708 A1 | 8/2017 |

OTHER PUBLICATIONS

European Patent Office, Supplementary European Search Report for application No. 17747028 dated Jul. 31, 2019.

FIG. 36
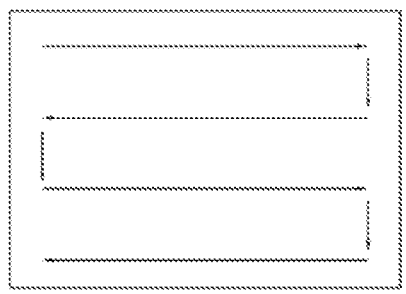
FIG. 37
| A1 | A2 | A3 |  | An |  |
|----|----|----|----|----|----|
| B1 |  |  |  |  |  |
| * |  |  |  |  |  |
| * |  |  |  |  |  |
| * |  |  |  |  |  |
| * |  |  |  |  |  |
| * |  |  |  |  |  |
| N1 | N2 | N3 |  | Nn |  |
FIG. 38

AUTOMATIC MOVING SNOW REMOVAL DEVICE

BACKGROUND

Technical Field

The present invention relates to the field of intelligent control, and in particular to an automatic moving snow removal device.

Lots of snow will be accumulated on a road surface after snowing in winter and causes much trouble for outgoing of people. Several methods for removing the ice and snow on the road comprise artificial snow removal, snow melting for snow removal and mechanical snow removal. The artificial snow removal by artificial sweeping is larger in labor intensity, time consuming and labor consuming, and low in sweeping efficiency. The snow melting method by using heat energy or chemical agent scattering is larger in energy consumption and high in cost, and easily pollutes and corrodes the environment and the road surface, and is only suitable for some special occasions. While the currently used mechanical snow removal devices are higher in cost, poorer in snow removal effect and have certain damage action to the road surface due to the huge size and complex structure, and the use is affected.

The current small mechanical snow blower mainly consists of a prime motor, a transmission device, a snow collecting device, a snow throwing device and an operation system. The prime motor may adopt an electromotor or an engine, and mostly adopts a gasoline engine or diesel engine at present. The snow collecting device is configured to collect the accumulated snow and mainly adopts a snow shovel or spiral auger. The snow throwing device throws the collected accumulated snow to one side of the road or into a collecting device. The two main manners comprise a snow throwing impeller and a blower. The operation device mainly controls the operation of the device, and realizes the advancing and driving directions of the machine by hand push. In this way, under the manpower push, the ice and snow removal machines continuously advance to consistently remove the accumulated ice and snow.

In order to reduce the labor intensity of an operator, there are some automatic moving snow removal machines, that is, the snow removal machines are driven by the prime motor to move, and the snow removal machines continuously advance while the efficient snow removal is realized by various mechanical transmission devices, thereby greatly saving the manpower.

On such basis, it is very necessary to develop a snow removal device which is higher in degree of automation, low in use cost, timesaving and laborsaving to use, good in snow removal effect, and capable of rapidly shoveling the accumulated snow after snowing, thereby facilitating outgoing of people.

SUMMARY

An objective of the present invention is to provide a snow removal device having an automatic working capacity.

The technical solution adopted by the present invention to solve the technical problems is as follows: a snow removal device having an automatic working capacity comprises a working module, configured to execute specific work of the automatic snow removal device; a moving module, configured to drive the automatic snow removal device to move on the ground; an energy module, at least providing energy for the moving module of the automatic snow removal device, or at least providing energy for both the moving module and the working module; a detection module, configured to detect external environment and/or internal parameters; and a control module, wherein the control module stores an automatic working algorithm of the snow removal device, and the control module controls the moving module and/or the working module of the automatic snow removal device according to the information detected by the detection module and based on the algorithm, such that the automatic snow removal device walks and works according to a preset path rule.

In one embodiment, the energy module comprises a chargeable battery and/or photovoltaic battery.

In one embodiment, the working module comprises a snow scraping component, a snow throwing component and a motor driving the snow scraping component and the snow throwing component to work.

In one embodiment, the snow scraping component comprises a snow collecting wheel, and a rotary speed of the snow collecting wheel is smaller than 100 rpm.

In one embodiment, the snow throwing component comprises a snow throwing wheel driven by the motor, and a rotary speed of the snow throwing wheel is 1000-5000 rpm.

In one embodiment, the snow throwing component comprises a snow throwing cylinder for throwing out the snow collected by the snow scraping component, the detection module comprises an obstacle detection device, the obstacle detection device is configured to detect obstacles within a preset range in a snow output direction of the snow throwing cylinder, and the control module adjusts a position of the snow throwing cylinder according to a signal detected by the obstacle detection device to change a snow outlet direction.

In one embodiment, the moving module comprises a driving wheel, a moving motor driving the driving wheel, a driven wheel and a track connected on the driving wheel and a driven wheel.

In one embodiment, the detection module comprises a direction detection device, the direction detection device is configured to detect a moving direction of the snow removal device, the snow removal device further comprises an input module, the control module can automatically generate a border coordinate map by taking a start point position where the snow removal device begins to work as an original point according to the information of a working area of a rule input by the input module, and the control module controls the automatic snow removal device to move and work in a border of the working area by using the direction detection device according to the border coordinate map.

In one embodiment, the direction detection device comprises an electronic compass or gyroscope.

In one embodiment, the automatic snow removal device further comprises a location navigation module, the control module stores the border coordinate map of the working area of the snow removal device, and the control module controls the automatic snow removal device to regularly move and work within the working area according to the border coordinate map and coordinates of a real time position of the automatic snow removal device detected by the location navigation module.

In one embodiment, the detection module comprises an energy detection unit, the energy detection unit is configured to detect an energy value of the energy module and feeds information of the energy value back to the control module, and when the energy value detected by the detection module reaches or is lower than a preset value, the control module controls the automatic moving snow removal device to move to a preset site for energy supplement.

In one embodiment, the control module comprises a path comparison unit, the path comparison unit can compare a path where the snow removal has been finished with a preset path, and when both of them are consistent, the control module controls the automatic snow removal device to move to the preset site for energy supplement.

In one embodiment, the automatic snow removal device is the snow removal device has at least three states, a moving state of regularly moving and working along the preset path, a standby state of stopping in the preset site and an energy supplement state of stopping in the preset site, the detection module comprises a snow detection device, and if the snow detection device detects snow or that a snowfall reaches a preset value, the control module controls the snow removal device to depart from the preset site and to be converted from the standby state to the working state.

In one embodiment, an automatic moving snow removal device comprises a working module, configured to execute specific work of the automatic moving snow removal device;

a moving module, configured to drive the automatic moving snow removal device to move on the ground; an energy module, configured to provide energy for the moving module and the working module of the automatic moving snow removal device; and a control module, wherein the control module is configured to control the working module and the moving module of the automatic moving snow removal device; the working module comprises at least two working head mechanisms, the at least two working head mechanisms are alternatively matched and connected to a host of the automatic moving snow removal device, and the control module executes a control mode corresponding to the working head mechanism according to the matched and connected working head.

In one embodiment, the host of the automatic moving snow removal device comprises a connecting part configured to be matched and connected with the working head mechanism, the connecting part is provided with at least two signal switches, the at least two working head mechanisms are matched and connected to the host to trigger different signal switches, and the control module recognizes a form of the working head mechanism according to different switch signals.

In one embodiment, the at least two working head mechanisms respectively comprise a working part for snow removal and a working motor driving the working part to move, and the control modes corresponding to the at least two working head mechanisms comprise rotary speeds and/or turning directions of respectively corresponding working motors.

In one embodiment, the moving module comprises at least one driving wheel and a moving motor driving the driving wheel, and the control modes corresponding to the at least two working head mechanisms comprise rotary speeds and/or turning directions of respectively corresponding moving motors.

In one embodiment, the control modes corresponding to the at least two working head mechanisms comprise respectively corresponding snow removal paths.

In an embodiment an automatic moving snow removal device comprises a working module, configured to execute specific work of the automatic moving snow removal device; a moving module, configured to drive the automatic moving snow removal device to move on the ground; an energy module, configured to provide energy for the moving module and the working module of the automatic moving snow removal device; and a control module, wherein the control module is configured to control the working module and the moving module of the automatic moving snow removal device; the automatic moving snow removal device further comprises a detection module, the detection module feeds the information of detected snowfall back to the control module, and when the snowfall reaches a preset value, the control module controls the moving module to move and the working module to work.

In one embodiment, the snow detection module comprises a pressure sensor or a humidity sensor, the pressure sensor feeds a detected pressure signal back to the control module, the humidity sensor feeds a detected humidity signal back to the control module, and the control module judges whether it snows according to the humidity signal, calculates a thickness of the snow according to the pressure signal in the case of snowing, and controls the automatic moving snow removal device to begin to work when the thickness of the snow reaches a preset value.

In one embodiment, the snow detection module comprises at least two conductive elements and an insulating part disposed between the two conductive elements, a height of the insulating part is larger than those of the two conductive elements, and the height of the insulating part is the preset value of the thickness of the snow.

In one embodiment, the snow detection module comprises a container and a light sensor and a humidity sensor disposed in the container, the light sensor feeds a detected light signal back to the control module, the humidity module feeds a detected humidity signal back to the control module, and the control module judges snow coverage according to the light signal and the humidity signal and then controls the automatic moving snow removal device to begin to work.

In one embodiment, the snow detection module comprises at least two conductive parts disposed on the bottom of the automatic moving snow removal device, the at least two conductive parts are disposed in different heights relative to the ground and send a turning on signal to the control module, and the control module judges the thickness of the snow according to different turning on signals and the heights of the conductive parts.

In one embodiment, the control module executes different snow removal modes according to different snowfalls.

In an embodiment an automatic moving snow removal device comprises a working module, configured to execute specific work of the automatic moving snow removal device; a moving module, configured to drive the automatic moving snow removal device to move on the ground; an energy module, configured to provide energy for the moving module and the working module of the automatic moving snow removal device; and a control module, wherein the control module is configured to control the working module and the moving module of the automatic moving snow removal device; the automatic moving snow removal device further comprises a man-machine interaction module, the man-machine interaction module comprises an operation panel configured to input/output information, and the control module can automatically generate a snow removal path according to the size information of a working area input on the operation panel, and controls the moving module and the working module according to the generated snow removal path.

In one embodiment, the automatic moving snow removal device further comprises a detection module, the detection module is configured to detect a moving direction of the automatic moving snow removal device and transmit detected direction data to the control module, and the control module compares the received direction data with direction data of the preset path and controls the moving module to adjust the moving direction when the two pieces of data are inconsistent.

In one embodiment, the detection module comprises an electronic compass or gyroscope.

In one embodiment, a start point position of the automatic moving snow removal device along the snow removal path is set to be a coordinate original point, and the control module calculates a moving distance of the automatic moving snow removal device according to a moving speed and moving time of the moving module and controls the moving module to steer when the moving distance reaches the input size of the working area.

In one embodiment, a control method for the foregoing automatic moving snow removal device comprises the following steps: 1) inputting size information of a working area input on an operation panel of the automatic moving snow removal device; 2) generating a snow removal path according to the input size information of the working area by a control module; and 3) controlling a working module and a moving module to remove snow along the generated snow removal path by the control module.

In one embodiment, the control method further comprises setting a start point position of the automatic moving snow removal device along the snow removal path to be a coordinate original point.

In one embodiment, the control method further comprises that the control module controls the moving module to cause the automatic moving snow removal device to return back to the start point position by the control module after the automatic moving snow removal device moves along the complete snow removal path.

In one embodiment, a plurality of the snow removal paths are generated, and the final snow removal path can be determined in a manner of user selection or system default.

In an embodiment an automatic moving snow removal device comprises a working module, configured to execute specific work of the automatic moving snow removal device; a moving module, configured to drive the automatic moving snow removal device to move on the ground; an energy module, configured to provide energy for the moving module and the working module of the automatic moving snow removal device; and a control module, wherein the control module is configured to control the working module and the moving module of the automatic moving snow removal device; the automatic moving snow removal device further comprises a heating thermal insulation device, and the heating thermal insulation device can be repeatedly heated by electric energy and keeps part of the energy module and the control module at a preset temperature.

In one embodiment, the heating thermal insulation device comprises an electric heating thermal insulation material at least partially covering a host housing of the automatic moving snow removal device.

In one embodiment, the electric heating thermal insulation material is electrified for heating during energy supplement of the automatic moving snow removal device, and performs thermal insulation during working of the automatic moving snow removal device.

In one embodiment, the heating thermal insulation device comprises an electric heating thermal insulation material at least partially covering the energy module and the control module of the automatic moving snow removal device.

In an embodiment an automatic moving snow removal device comprises a working module, configured to execute specific work of the automatic moving snow removal device; a moving module, configured to drive the automatic moving snow removal device to move on the ground; an energy module, configured to provide energy for the moving module and the working module of the automatic moving snow removal device; and a control module, wherein the control module is configured to control the working module and the moving module of the automatic moving snow removal device, such that the automatic moving snow removal device moves and works within a preset border.

The automatic moving snow removal device further comprises a location navigation module, and the control module generates a snow removal path according to a map of the preset border, and controls the automatic moving snow removal device to move along the snow removal path according to coordinate data provided by the location navigation module.

In one embodiment, the map of the preset border is formed by continuous coordinates formed in a manner that the location navigation module moves for a circle along the border of a working area.

In one embodiment, the preset border is an electrified wire disposed along the border of the working area.

In one embodiment, the location navigation module is a GPS location navigation module, the automatic moving snow removal device further comprises a detection module, the detection module is configured to detect a relative position relationship between the automatic moving snow removal device and the electrified wire, the control module calculates relative coordinates of the automatic moving snow removal device according to the information navigation position detected by the detection module and performs absolute location and error elimination according to the coordinates of the GPS location navigation module, to obtain the map of the preset border formed by continuous coordinates of the automatic moving snow removal device along the electrified wire.

In one embodiment, the location navigation module is an ultra wide band location module, at least two ultra wide band labels are disposed inside or outside the preset border, the ultra wide band location module calculates relative coordinates of two positions of the automatic moving snow removal device by the at least two ultra wide band labels, the ultra wide band location module moves for a circle along the border of the moveing area to form two continuous relative coordinates relative to the ultra wide band labels, and the two continuous relative coordinates form the map of the preset border.

In one embodiment, the map of the preset border is generated by artificially circling on an electronic map and leading into the control module.

In one embodiment, the automatic moving snow removal device further comprises a detection module, the detection module is configured for a dip angle of the automatic walking snow removal device, the location navigation module can record the coordinate value of each point when the automatic walking snow removal device walks along a preset area, the detection module records the dip angle value of each point, and the control module generates the border map in a 3D form according to the coordinate values and the dip angle values.

In one embodiment, the snow removal path performs snow removal toward a direction along an extending direction parallel with a road or performs reciprocating snow removal back and forth.

In one embodiment, the snow removal path performs snow removal toward a direction along an extending direction vertical to the road or performs reciprocating snow removal back and forth.

In one embodiment, the snow removal path comprises at least one snow piling point.

In one embodiment, the snow removal path contains a fixed snow throwing direction.

In one embodiment, the map of the preset border comprises at least two different areas, and the control module can execute different control modes according to the marks of different areas.

In one embodiment, the at least two different areas comprise at least one snow removal area, and one or more of an intersection area, a lawn area, an island area and a narrow passage area.

In one embodiment, the control modules defaults that the snow removal is required for the snow removal area, no snow removal is required for the island area, and the snow removal is selective for other areas.

In one embodiment, the at least two different areas comprise at least two snow removal areas and a connecting passage area between the two snow removal areas.

In one embodiment, the control module defaults that the snow removal is required for the snow removal areas, and is selective for the connecting passage area.

In one embodiment, the automatic moving snow removal device further comprises a working alarm device, and if the automatic moving snow removal device enters a set area and/or reaches preset alarm time, the control module controls the working alarm device to alarm.

In an embodiment an automatic moving snow removal device comprises a working module, configured to execute specific work of the automatic moving snow removal device; a moving module, configured to drive the automatic moving snow removal device to move on the ground; an energy module, configured to provide energy for the moving module and the working module of the automatic moving snow removal device; and a control module, wherein the control module is configured to control the working module and the moving module of the automatic moving snow removal device, such that the automatic moving snow removal device moves and works within a preset border.

The automatic moving snow removal device further comprises a detection module, the detection module is configured to detect an energy value of the energy module and feeds information of the energy value back to the control module, and when the energy value detected by the detection module reaches or is lower than a preset value, the control module controls the automatic moving snow removal device to move to a preset site for energy supplement.

In one embodiment, the energy module comprises a chargeable battery and a charging connecting structure, the working module and the charging connecting structure are respectively disposed on front and back sides of the automatic moving snow removal device, a snow removal moving direction of the automatic snow removal device is the advancing direction, the automatic moving snow removal device advances to the preset site along a withdrawing direction opposite to the advancing direction, and the charging connecting structure is caused to be jointed with a charging structure on the preset site.

In one embodiment, the energy module comprises a chargeable battery and a wireless charging receiving device, the wireless charging receiving device is disposed on the bottom of the automatic moving snow removal device, a wireless charging emitting device is disposed on the preset site, and the chargeable battery is charged by jointing the wireless charging receiving device and the wireless charging emitting device.

In one embodiment, there are at least preset values of the energy value, and the control module controls the automatic moving snow removal device to return back to the preset site along different paths according to the difference that the energy value detected by the detection module reaches or is lower than the preset values.

In one embodiment, the preset values comprise a first preset value and a second preset value, if the energy value detected by the detection module reaches or is lower than the first preset value, the control module controls the automatic moving snow removal device to move and return back along the preset snow removal path and controls the working module for snow removal, and if the energy value detected by the detection module reaches or is lower than the second preset value, the control module controls the automatic moving snow removal device to move and return back along the path where the snow removal has been finished.

In an embodiment an automatic moving snow removal device comprises a working module, configured to execute specific work of the automatic moving snow removal device; a moving module, configured to drive the automatic moving snow removal device to move on the ground; an energy module, configured to provide energy for the moving module and the working module of the automatic moving snow removal device; and a control module, wherein the control module is configured to control the working module and the moving module of the automatic moving snow removal device, such that the automatic moving snow removal device moves and works within a preset border.

The control module can generates snow removal paths according to a preset area, and controls the automatic moving snow removal device to move to the preset site after the automatic moving snow removal device moves along all the snow removal paths completely.

In an embodiment an automatic moving snow removal device comprises a working module, configured to execute specific work of the automatic moving snow removal device; a moving module, configured to drive the automatic moving snow removal device to move on the ground; an energy module, configured to provide energy for the moving module and the working module of the automatic moving snow removal device; and a control module, wherein the control module is configured to control the working module and the moving module of the automatic moving snow removal device; the working module comprises a working head mechanism movably matched and connected to a host of the automatic moving snow removal device, and the working head mechanism can adjust the distance thereof relative to the ground relative to the movement of the host of the automatic moving snow removal device.

In one embodiment, the working head mechanism is provided with a rolling wheel device, and when the ground supporting the rolling wheel device forms an angle with the ground supporting the host, the rolling wheel device can be guided to drive the working head mechanism to move relative to the host.

In one embodiment, the automatic moving snow removal device further comprises a working head mechanism height adjusting mechanism, the working head mechanism height adjusting mechanism comprises a drive motor and a transmission mechanism connected between the drive motor and the working head mechanism, and the drive motor can drive the working head mechanism to move relative to the host by the transmission mechanism.

In one embodiment, the control module controls the drive motor to drive the working head mechanism to ascend or descend relative to the host according to a preset control mode.

In an embodiment an automatic moving snow removal device comprises a working module, configured to execute specific work of the automatic moving snow removal device; a moving module, configured to drive the automatic moving snow removal device to move on the ground; an energy module, configured to provide energy for the moving module and the working module of the automatic moving snow removal device; and a control module, wherein the control module is configured to control the working module and the moving module of the automatic moving snow removal device; the working module comprises a working head mechanism configured to collect the snow on the ground and throw the snow to one direction, the automatic moving snow removal device further comprises a snow throwing angle adjusting mechanism configured to adjust a snow throwing direction, and the snow throwing angle adjusting mechanism is connected to the working head mechanism, and the snow throwing angle adjusting mechanism adjusts the snow throwing direction according to an instruction of the control module.

In one embodiment, the control module instructs the snow throwing angle adjusting mechanism to adjust the snow throwing direction according to the change of the advancing direction of the automatic moving snow removal device.

In one embodiment, the automatic moving snow removal device further comprises an obstacle detection device, the obstacle detection device is configured to detect people and objects within a preset range of the snow throwing direction, and the control module instructs the snow throwing angle adjusting mechanism to adjust the snow throwing direction according to a signal detected by the obstacle detection device.

In one embodiment, the working head mechanism comprises a snow throwing cylinder, the snow throwing angle adjusting mechanism comprises a steering motor and a transmission mechanism connected between the steering motor and the snow throwing cylinder, and the steering motor can be controlled by the transmission mechanism to drive the snow throwing cylinder to rotate to change the snow throwing direction.

In an embodiment an automatic snow removal system comprises an automatic moving snow removal device and a remote control device controlling the automatic moving snow removal device to operate, wherein the automatic moving snow removal device further comprises a working module, configured to execute specific work of the automatic moving snow removal device; a moving module, configured to drive the automatic moving snow removal device to move on the ground; an energy module, configured to provide energy for the moving module and the working module of the automatic moving snow removal device; and a control module, wherein the control module is configured to control the working module and the moving module of the automatic moving snow removal device; the automatic moving snow removal device further comprises a monitoring module and a communication module, the monitoring module is configured to monitor the surrounding environment of the automatic moving snow removal device, the communication module is configured to transmit information monitored by the monitoring module to the remote control device, receive a signal sent by the remote control device and sends the signal to the control module, and the control module controls the moving module and the working module according to the signal received by the communication module.

In an embodiment an automatic snow removal system comprises an automatic moving snow removal device and a remote control device controlling the automatic moving snow removal device to operate, wherein the automatic moving snow removal device further comprises a working module, configured to execute specific work of the automatic moving snow removal device; a moving module, configured to drive the automatic moving snow removal device to move on the ground; an energy module, configured to provide energy for the moving module and the working module of the automatic moving snow removal device; a control module, wherein the control module is configured to control the working module and the moving module of the automatic moving snow removal device; and a communication module, configured to receive a signal sent by the remote control device and transmit to the control module; the remote control device comprises an operation panel configured to input/output information, and the control module can automatically generate a snow removal path according to the size information of a working area input by a user on the operation panel and received by the communication module, and controls the moving module and the working module according to the generated snow removal path.

In one embodiment, the automatic moving snow removal device further comprises a detection module, the detection module is configured to detect a moving direction of the automatic moving snow removal device and transmit detected direction data to the control module, and the control module compares the received direction data with direction data of the preset path and controls the moving module to adjust the moving direction when the two pieces of data are inconsistent.

In one embodiment, the detection module comprises an electronic compass or gyroscope.

In one embodiment, a start point position of the automatic moving snow removal device along the snow removal path is set to be a coordinate original point, and the control module calculates a moving distance of the automatic moving snow removal device according to a moving speed and moving time of the moving module and controls the moving module to steer when the moving distance reaches the input size of the working area.

In one embodiment, the moving information of the automatic moving snow removal device can be input on the operation panel of the remote control device, and the control module controls the moving module according to a moving signal output by the remote control device and received by the communication module.

A control method for the foregoing automatic moving snow removal device comprises the following steps: 1) inputting size information of a working area on an operation panel of an remote control device; 2) causing the automatic moving snow removal device to move to the working area by the remote control device; 3) generating a snow removal path according to the input size information of the working area by a control module; and 4) controlling a working module and a moving module to remove snow along the generated snow removal path by the control module.

In one embodiment, the control method further comprises setting a start point position of the automatic moving snow removal device along the snow removal path to be a coordinate original point.

In one embodiment, the control method further comprises that the control module controls the moving module to cause the automatic moving snow removal device to return back to the start point position after the automatic moving snow removal device moves along the complete snow removal path.

In one embodiment, a plurality of the snow removal paths are generated, and the final snow removal path can be determined in a manner of user selection or system default.

In an embodiment an automatic snow removal system comprises an automatic moving snow removal device and a monitoring device monitoring operation of the automatic moving snow removal device, wherein the automatic moving snow removal device further comprises a working module, configured to execute specific work of the automatic moving snow removal device; a moving module, configured to drive the automatic moving snow removal device to move on the ground; an energy module, configured to provide energy for the moving module and the working module of the automatic moving snow removal device; and a control module, wherein the control module is configured to control the working module and the moving module of the automatic moving snow removal device; the automatic moving snow removal device further comprises a communication module, the map of a working area of the automatic moving snow removal device is determined, whether the automatic moving snow removal device moves within the working areas is monitored, the communication module is configured to transmit information monitored by the monitoring module to the control module, and the control module controls the moving module and the working module according to the signal received by the communication module.

In an embodiment an automatic snow removal system comprises an automatic moving snow removal device and a boundary configured to limit a working area of the automatic moving snow removal device, wherein the automatic moving snow removal device further comprises a working module, configured to execute specific work of the automatic moving snow removal device; a moving module, configured to drive the automatic moving snow removal device to move on the ground; an energy module, configured to provide energy for the moving module and the working module of the automatic moving snow removal device; and a control module, wherein the control module is configured to control the working module and the moving module of the automatic moving snow removal device; and the boundary can be set into multiple marks, and the control module executes control modes corresponding to the marks according to the marks of the boundary.

In one embodiment, the control modes corresponding to the multiple marks comprise one or more of the mode of removing snow and moving along a preset path, the mode of moving along the preset path, the mode of snow removal according to a preset height and the mode of no need of snow removal.

In an embodiment an automatic snow removal comprises an automatic moving snow removal device and a dock for parking or energy supplement of the automatic moving snow removal device, wherein the automatic moving snow removal device further comprises a working module, configured to execute specific work of the automatic moving snow removal device; a moving module, configured to drive the automatic moving snow removal device to move on the ground; an energy module, configured to provide energy for the moving module and the working module of the automatic moving snow removal device; and a control module, wherein the control module is configured to control the working module and the moving module of the automatic moving snow removal device; and the dock comprises a door capable of being converted between an opening state and a closing state, and the door can be closed as the automatic moving snow removal device enters the dock so as to close the automatic moving snow removal device within the dock.

In one embodiment, the door is kept in an opening state by a bias pressure mechanism, and the movement that the automatic moving snow removal device enters the dock can overcome an abutting force of the bias pressure mechanism to convert the door to the closing state.

In one embodiment, the dock is provided with a detection device and an automatic control device configured to control the door to be opened and closed, and if the detection device detects the movement of the automatic moving snow removal device to a direction of the dock, the automatic control device controls the door to be opened for the entrance of the automatic moving snow removal device.

In an embodiment an automatic snow removal system comprises an automatic moving snow removal device and a dock for parking or energy supplement of the automatic moving snow removal device, wherein the automatic moving snow removal device further comprises a working module, configured to execute specific work of the automatic moving snow removal device; a moving module, configured to drive the automatic moving snow removal device to move on the ground; an energy module, configured to provide energy for the moving module and the working module of the automatic moving snow removal device; and a control module, wherein the control module is configured to control the working module and the moving module of the automatic moving snow removal device; and the dock comprises a base and an outer cover connected on the base, the outer cover is provided with a snow sweeping device, and the snow sweeping device can be triggered once the automatic moving snow removal device enters the dock to clean the accumulated snow on the top of the automatic moving snow removal device.

In one embodiment, the snow sweeping device comprises a rolling brush disposed on the outer edge of the outer cover, and the rolling brush can rotate around an axis parallel with the ground.

In one embodiment, the snow sweeping device comprises a plurality of row brushes disposed on the outer edge of the outer cover, and the plurality of row brushes can rotate around an axis at an angle relative to the ground.

In an embodiment an automatic snow removal system comprises an automatic moving snow removal device and a dock for parking or energy supplement of the automatic moving snow removal device, wherein the automatic moving snow removal device further comprises a working module, configured to execute specific work of the automatic moving snow removal device; a moving module, configured to drive the automatic moving snow removal device to move on the ground; an energy module, configured to provide energy for the moving module and the working module of the automatic moving snow removal device; and a control module, wherein the control module is configured to control the working module and the moving module of the automatic moving snow removal device; and the dock comprises a base and an outer cover connected on the base, the dock also comprises a heating thermal insulation device, and the heating thermal insulation device is configured to heat and perform thermal insulation on the automatic moving device entering the dock.

In one embodiment, the heating thermal insulation device comprises one or more of an air heater, an electric furnace, and an electric radiator.

In one embodiment, the heating thermal insulation device comprises an electric heating thermal insulation material disposed on the outer side wall or the outer cover or the bottom of the dock.

In one embodiment, the electric heating thermal insulation material is constructed into a carbon crystal floor heating material, and the carbon crystal floor heating material is embedded into the bottom of the base.

A dock for parking or energy supplement of an automatic moving device comprises a base and an outer cover connected on the base, the outer cover can be converted between an opening state and a closing state relative to the base, and the outer cover be closed as the automatic moving snow removal device enters the dock so as to close the automatic moving snow removal device within the dock.

In one embodiment, the outer cover is kept in an opening state by a bias pressure mechanism, and the movement that the automatic moving snow removal device enters the dock can overcome an abutting force of the bias pressure mechanism to convert the outer cover to the closing state.

In one embodiment, the dock is provided with a detection device and an automatic control device configured to control the door to be opened and closed, and if the detection device detects the movement of the automatic moving snow removal device to a direction of the dock, the automatic control device controls the outer cover to be opened to for the entrance of the automatic moving snow removal device.

A dock for parking or energy supplement of an automatic moving device comprises a base and an outer cover connected on the base, the dock also comprises a heating thermal insulation device, and the heating thermal insulation device is configured to heat and perform thermal insulation on the automatic moving device entering the dock.

In one embodiment, the heating thermal insulation device comprises one or more of an air heater, an electric furnace, and an electric radiator.

In one embodiment, the heating thermal insulation device comprises an electric heating thermal insulation material disposed on the outer side wall or the outer cover or the bottom of the dock.

In one embodiment, the electric heating thermal insulation material is constructed into a carbon crystal floor heating material, and the carbon crystal floor heating material is embedded into the bottom of the base.

A dock for parking or energy supplement of an automatic moving device comprises a base and an outer cover connected on the base, the outer cover is provided with a snow sweeping device, and the snow sweeping device can be triggered once the automatic moving snow removal device enters the dock to clean the accumulated snow on the top of the automatic moving snow removal device.

In one embodiment, the snow sweeping device comprises a rolling brush disposed on the outer edge of the outer cover, and the rolling brush can rotate around an axis parallel with the ground.

In one embodiment, the snow sweeping device comprises a plurality of row brushes disposed on the outer edge of the outer cover, and the plurality of row brushes can rotate around an axis at an angle relative to the ground.

A control method for a self-moving device, the self-moving device is provided with a turnable object throwing device and a plurality of obstacle sensors respectively corresponding to different detection positions, the method comprises: receiving signals of the plurality of obstacle sensors; judging whether the obstacle sensor corresponding to the current object throwing direction detects an obstacle according to the received signal of the obstacle sensor; controlling the object throwing device to steer when the obstacle sensor corresponding to the current object throwing direction detects the obstacle, such that the object throwing direction is the direction of an area where the obstacle is not detected and which is unprocessed by the self-moving device.

In one embodiment, the step of setting the object throwing direction to be the direction of an area where the obstacle is not detected and which is unprocessed by the self-moving device comprises judging whether the obstacle sensors except for the obstacle sensor corresponding to the current object throwing direction detect the obstacle; if the obstacle sensor not detecting the obstacle exists, judging whether a direction corresponding to the obstacle sensor not detecting the obstacle points at the area unprocessed by the self-moving device; if the direction corresponding to the obstacle sensor not detecting the obstacle points at the area that has been processed by the self-moving device, then continuing to judge till one of the obstacle sensors not detecting the obstacle is judged and the direction corresponding to such obstacle sensor points at the area unprocessed by the self-moving device, and setting the corresponding direction to be the object throwing direction.

In one embodiment, the method further comprises the step that if all obstacle sensors detect the obstacle, or the directions corresponding to the obstacle sensors not detecting the obstacle are all the directions of the areas that have been processed by the self-moving device, then controlling the self-moving device to halt for preset time, and then continuing to execute the step of judging whether the obstacle sensor corresponding to the current object throwing direction detects an obstacle according to the received signal of the obstacle sensor.

In one embodiment, if after the self-moving device is halted for certain time, all obstacle sensors detect the obstacle, or the directions corresponding to the obstacle sensors not detecting the obstacle are all the directions of the areas that have been processed by the self-moving device, then controlling the self-moving device to withdraw for certain distance, and re-planning a moving path of the self-moving device.

In one embodiment, the method further comprises that before the self-moving device moves, setting an initial object throwing direction of the object throwing device as a first direction; receiving signals of the multiple obstacle sensors; judging whether the obstacle sensor corresponding to the initial object throwing direction detects the obstacle according to the received signal of the obstacle sensor; and setting the object throwing direction to be a direction corresponding to the obstacle sensor not detecting the obstacle if the obstacle sensor corresponding to the initial object throwing direction detects the obstacle.

In one embodiment, the self-moving device is a snow blower.

In one embodiment, the obstacle sensors are ultrasonic sensors.

The present embodiments further provide a control system for a self-moving device. The self-moving device is provided with a turnable object throwing device and a plurality of obstacle sensors respectively corresponding to different detection positions, the system comprises a signal receiving module, configured to receive signals of the plurality of obstacle sensors; a signal processing module, an input end thereof being connected to an input end of the signal receiving module, wherein the signal processing module is configured to judge whether the obstacle sensor corresponding to the current object throwing direction detects an obstacle according to the received signal of the obstacle sensor; and a signal output module, an input end thereof being connected to an output end of the signal processing module, wherein the signal output module is configured to cause the object throwing device to steer when the obstacle sensor corresponding to the current object throwing direction detects the obstacle, such that the object throwing direction is the direction of an area where the obstacle is not detected and which is unprocessed by the self-moving device.

In one embodiment, the signal processing module comprises an obstacle sensor judging unit, an input end thereof being connected to an output end of the signal receiving module, wherein the obstacle sensor judging unit is configured to judge whether the obstacle sensors except for the obstacle sensor corresponding to the current object throwing direction detect the obstacle; and an area judging unit, an input end thereof being connected to an output end of the obstacle sensor judging unit, wherein the area judging unit is configured to, if the obstacle sensor not detecting the obstacle exists, judge whether a direction corresponding to the obstacle sensor not detecting the obstacle points at the area unprocessed by the self-moving device.

In one embodiment, the signal output module is configured to, when all obstacle sensors detect the obstacle, or the directions corresponding to the obstacle sensors not detecting the obstacle are all the directions of the areas that have been processed by the self-moving device, control the self-moving device to halt for preset time, and then judge whether the obstacle sensor corresponding to the current object throwing direction detects an obstacle according to the received signal of the obstacle sensor.

In one embodiment, if after the self-moving device is halted for certain time, all obstacle sensors detect the obstacle, or the directions corresponding to the obstacle sensors not detecting the obstacle are all the directions of the areas that have been processed by the self-moving device, then the self-moving device is controlled to withdraw for certain distance, and a moving path of the self-moving device is re-planned.

In one embodiment, the obstacle sensors are ultrasonic sensors.

In one embodiment, the self-moving device is a snow blower.

The present embodiments further provide a snow throwing method, comprising the steps of obtaining a wind direction during snow throwing; obtaining a current snow throwing direction; obtaining an angle difference between the wind direction and the snow throwing direction; and adjusting the snow throwing direction to enable the angle difference between the wind direction and the snow throwing direction to be within a preset range.

In one embodiment, the step of enabling the angle difference between the wind direction and the snow throwing direction to be within a preset range comprises: adjusting the snow throwing direction to be consistent with the wind direction.

In one embodiment, adjusting the snow throwing direction comprises rotating a snow throwing mechanism to change the snow throwing direction.

In one embodiment, the snow throwing method further comprises the following steps: obtaining wind power after the wind direction is changed when the wind direction is changed; judging whether the wind power exceeds a predetermined threshold; and entering the step of adjusting the snow throwing direction to enable the angle difference between the wind direction and the snow throwing direction to be within a preset range if yes, and keeping the snow throwing direction unchanged if no.

In one embodiment, the step of keeping the snow throwing direction unchanged if no comprises increasing an initial speed when the snow is thrown, and keeping the snow throwing direction unchanged.

In one embodiment, the step of obtaining a wind direction during snow throwing comprises obtaining multiple wind power of multiple wind directions and the wind directions within a preset time period; selecting the wind direction of the maximal wind power; and taking the wind direction of the maximal wind power as the wind direction during snow throwing.

In one embodiment, the snow throwing method further comprises the steps: judging whether the maximal wind power exceeds a predetermined threshold; and taking the wind direction of the maximal wind direction as the wind direction during snow throwing if yes, and selecting any wind direction as the wind direction during snow throwing or no wind direction if no.

The embodiments further provide a snow throwing system, comprising a wind direction obtaining module, configured to obtain a wind direction during snow throwing; a snow throwing direction detection module, configured to obtain a current snow throwing direction; an angle judging module, configured to obtain an angle difference between the wind direction and the snow throwing direction; and a snow throwing direction control module, configured to adjust the snow throwing direction to enable the angle difference between the wind direction and the snow throwing direction to be within a preset range.

In one embodiment, the step of adjusting the snow throwing direction to enable the angle difference between the wind direction and the snow throwing direction to be within a preset range comprises: adjusting the snow throwing direction to be consistent with the wind direction.

In one embodiment, the adjusting the snow throwing direction comprises rotating a snow throwing mechanism to change the snow throwing direction.

In one embodiment, the wind direction obtaining module is further configured to obtain wind power after the wind direction is changed; and judge whether the wind power exceeds a predetermined threshold.

In one embodiment, the snow throwing direction control module is further configured to increase an initial speed when the snow is thrown, and keep the snow throwing direction unchanged.

In one embodiment, the wind direction obtaining module is further configured to obtain multiple wind power of multiple wind directions and the wind directions within a preset time period; select the wind direction of the maximal wind power; and take the wind direction of the maximal wind power as the wind direction during snow throwing.

In one embodiment, the wind direction obtaining module is further configured to judge whether the maximal wind power exceeds a predetermined threshold; and take the wind direction of the maximal wind direction as the wind direction during snow throwing if yes, and select any wind direction as the wind direction during snow throwing if no.

The present embodiments further provide an automatic moving snow removal device, and the snow and inclusions thrown by which cannot injure people or damage objects, that is, the thrown objects have save energy. Specifically, the automatic moving snow removal device comprises a moving module, driving a snow blower to move; a working module, comprising a working motor and a snow throwing mechanism driven by the working motor, wherein the snow throwing mechanism is driven by the working motor to collect accumulated snow and inclusions on the ground and throw out of the snow throwing mechanism; and a control module, configured to control a rotary speed of the working motor to cause a speed when the inclusions depart from the snow throwing mechanism is not higher than 41 m/s.

In one embodiment, the speed when the inclusions depart from the snow throwing mechanism is not higher than 20 m/s.

In one embodiment, the speed when the inclusions depart from the snow throwing mechanism is 17.8±1 m/s.

In one embodiment, the speed when the inclusions depart from the snow throwing mechanism is 16.8±1 m/s.

In one embodiment, the speed when the inclusions depart from the snow throwing mechanism is 14.2±1 m/s.

In one embodiment, the speed when the inclusions depart from the snow throwing mechanism is 12.5±1 m/s The present embodiments further provide an automatic moving snow removal device, and the snow and inclusions thrown by which cannot injure people or damage objects, that is, the thrown objects have save energy. Specifically, the automatic moving snow removal device comprises a moving module, driving the snow removal device to move; a working module, comprising a working motor and a snow throwing mechanism driven by the working motor, wherein the snow throwing mechanism is driven by the working motor to collect accumulated snow and inclusions on the ground and throw out of the snow throwing mechanism; and a control module, configured to control a rotary speed of the working motor to cause an impulse when the inclusions depart from the snow throwing mechanism is not higher than 0.041 Kg·m/s.

In one embodiment, the impulse when the inclusions depart from the snow throwing mechanism is not higher than 0.02 Kg·m/s.

In one embodiment, the impulse when the inclusions depart from the snow throwing mechanism is 0.0178±0.001 Kg·m/s.

In one embodiment, the impulse when the inclusions depart from the snow throwing mechanism is 0.0168±0.001 Kg·m/s.

In one embodiment, the impulse when the inclusions depart from the snow throwing mechanism is 0.0142±0.001 Kg·m/s.

In one embodiment, the impulse when the inclusions depart from the snow throwing mechanism is 0.0125±0.001 Kg·m/s.

In one embodiment, the snow throwing mechanism comprises a snow scraping component rotating around a central axis, the working motor drives the component to rotate to collect the accumulated snow and inclusions to the snow throwing mechanism, and a maximal linear speed of the snow scraping component is not higher than 41 m/s.

In one embodiment, a radius of said snow scraping component is not larger than 0.085 m, and a rotary speed of the snow scraping component is not larger than 2000 r/min.

In one embodiment, the rotary speed of the snow scraping component is 2000-1400 r/min.

In one embodiment, the radius of the snow scraping component is not larger than 0.1 m, and the rotary speed of the snow scraping component is not larger than 1600 r/min.

The present embodiments further provide a snow removal device capable of automatically avoiding obstacles for snow throwing, and the snow removal device comprises a working module, configured to execute specific work of the snow removal device and comprising a snow throwing guiding component, guiding the working module to throw snow to a direction over against the snow throwing component; a moving module, configured to drive the snow removal device to move on the ground; a detection module, comprising an obstacle sensing component for detecting whether an obstacle exists in an external environment of the snow removal device; and a control module, configured to control the working module and the moving module according to signals transmitted by the detection module to cause the working module to throw the snow to a direction without the obstacle.

In one embodiment, the guiding of the snow throwing guiding component can be adjusted, the obstacle sensing component is configured to detect whether the obstacle exists in a direction over against the snow throwing guiding component, and when judging that the obstacle exists in the direction over against the snow throwing guiding component according to the signal transmitted by the obstacle sensing component, the control module controls the show throwing guiding component to change the guiding.

In one embodiment, the obstacle sensing component is further configured to detect whether the obstacle exists in other multiple directions in the external environment of the snow removal device, and the control module controls the snow throwing guiding component to change the guiding according to the signal transmitted by the obstacle sensing component to cause the snow throwing guiding component to be over against the direction of an area without the obstacle.

In one embodiment, the detection module further comprises a ground state recognizing module, the ground state recognizing module recognizes the snow removal state of the ground of the snow removal device, and the control module controls the snow throwing guiding component to change the guiding according to the signals transmitted by the obstacle sensing component and the ground state recognizing component to cause the snow throwing guiding component to be over against the direction of an area without the obstacle and without snow removal.

In one embodiment, the obstacle sensing component is configured to detect whether the obstacle exists in a direction over against the snow throwing guiding component, and the control module controls the snow removal device to halt for preset time when judging that the obstacle exists in the direction over against the snow throwing guiding component according to the signal transmitted by the obstacle sensing component, then judges whether the obstacle exists in a direction over against the snow throwing guiding component again, and controls the snow removal device to continue to work when the judging result is not.

In one embodiment, when judging the obstacle exists in the direction over against the snow throwing guiding component again, the control module re-plans a moving path of the snow removal device.

The present embodiments further provide a snow removal device capable of intelligently adjusting a snow throwing direction, the snow removal device comprises a working module, configured to execute specific work of the snow removal device and comprising a snow throwing guiding component, guiding the working module to throw snow to a direction over against the snow throwing component, wherein the guiding of the snow guiding throwing component is adjustable; a moving module, configured to drive the snow removal device to move on the ground; a detection module, configured to detect environment parameters of an external environment where the snow removal device is and/or internal parameters of the snow removal device; and a control module, configured to control the snow throwing guiding component to change the guiding according to the signal transmitted by the detection module.

In one embodiment, the environment parameters comprise wind direction, and the control module controls an angle difference between the direction over against the snow throwing guiding component and the wind direction to be within a preset range according to the signal transmitted by the detection module.

In one embodiment, the environment parameters further comprise whether the obstacle exists in the direction over against the snow throwing guiding component, and the control module controls the snow throwing guiding component to change the guiding when judging that the obstacle exists in the direction over against the snow throwing guiding component according to the signal transmitted by the detection module.

The automatic moving snow removal device according to the embodiments of the present invention is not required to be personally operated by an operator when in work, and is not required to be monitored by the operator all the time either, has automatic working capacity, saves labor, and can rapidly shovel the accumulated snow after snowing, thereby facilitating the outgoing of people.

BRIEF DESCRIPTION OF THE DRAWINGS

FIG. 36 is a schematic diagram of a second path of snow pushing when the snow removal mode of a snow blower is snow pushing in a preferred embodiment according to the present invention.

FIG. 37 is a schematic diagram of a third path of snow pushing when the snow removal mode of a snow blower is snow pushing in a preferred embodiment according to the present invention.

FIG. 38 is a schematic diagram of a state change of a dip angle of a snow blower in a ramp in a preferred embodiment according to the present invention.

In the figures:

Figure 1:
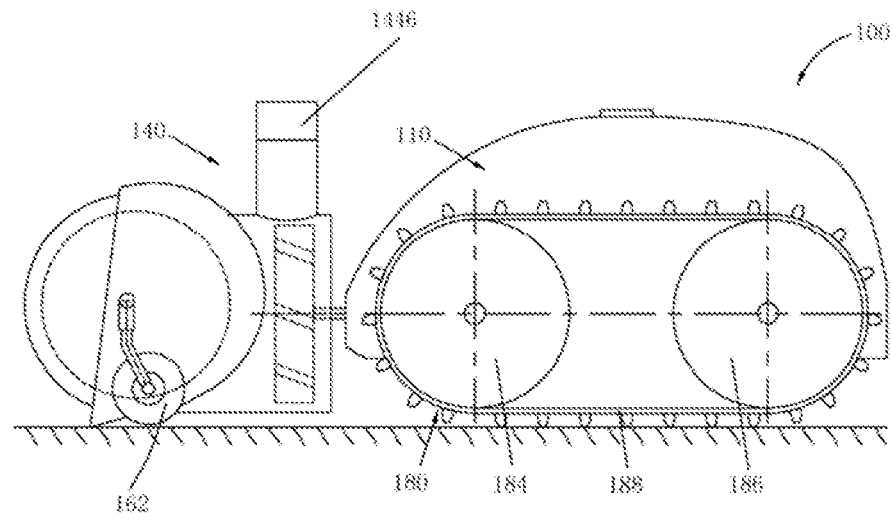
FIG. 1 is a front view of an automatic moving snow removal device in a preferred first embodiment according to the present invention.

| | | |
|---|---|---|
| Snow blower 100 | Snow removal mechanism 120 | Snow throwing mechanism 140 |
| Snow pushing mechanism 160 | Host 110 | Rolling brush 122 |
| Chargeable battery 170 | Protective cover 124 | Damping mechanism 126 |
| Snow scraping component 142 | Snow throwing component 144 | Motor 146 |
| Snow throwing wheel 1442 | Snow throwing cylinder 1444 | Fault detection sensor 1448 |
| Steering motor 1449 | Electric heating thermal insulation material 130, 130' | Dock 500 |
| Base 510 | Outer cover 530 | Charging electrode 550 |
| Raised rib 532 | Torsional spring 512 | Carbon crystal floor heating material 514 |
| Wireless charging emitting device 560 | Wireless charging receiving device 106 | Snow detector 102 |
| Conductive metal bar 103 | Insulation rib plate 104 | Container 200 |
| Optical sensor 202 | Humidity sensor 204 | Conductive part 105 |
| Location unit 131 | Memory unit 132 | Sending unit 133 |
| Location navigation device 130 | Border line 320 | Ultra wide band label 410 |
| Intersection 330 | | Connecting passage 360 |
| Narrow area 350 | Signal processing module A120 | Snow sweeping device 580 |
| Signal receiving module A110 | Signal output module A130 | Obstacle sensor judging unit A121 |
| Area judging unit A122 | Wind direction obtaining module B110 | Snow throwing system B100 |
| Snow throwing direction control module B140 | Snow throwing direction detection module B120 | Angle judging module B130 |

DETAILED DESCRIPTION

The automatic moving snow throwing device according to the specific embodiments of the present invention can be an automatic snow sweeping machine, an automatic snow throwing/lifting machine, an automatic snow pushing/shoveling machine, and combinations thereof, etc. They automatically move on the ground or the surface of a working area for the ice and snow removal work such as snow sweeping, snow throwing or snow pushing, and can be considered as snow blowers having an automatic working capacity. The automatic working capacity here means that when the snow blower works for snow removal, the personal operation, all-time remote control or all-time monitoring of the user is not required, the user can do other work by only needing to finish related setting, and the snow blowers automatically execute related programs.

As shown in FIGS. 1 to 10, the preferred embodiment of the automatic moving snow removal device is an automatic snow throwing machine. Here, the automatic snow throwing machine, the automatic snow sweeping machine and the automatic snow pushing machine as called by a joint name: snow blower. The snow blower for snow throwing comprises a working module, a moving module, an energy module, a control module, a detection module, etc.

The working module is configured to execute specific work of the snow blower and comprises a snow throwing mechanism 140 and a working motor driving the snow throwing mechanism 140 to work, etc., the snow throwing mechanism 140 is a working head mechanism, and of course, the working module further comprises the part such as a snow throwing angle adjusting mechanism to optimize or adjust a snow removal effect.

Figure 4:
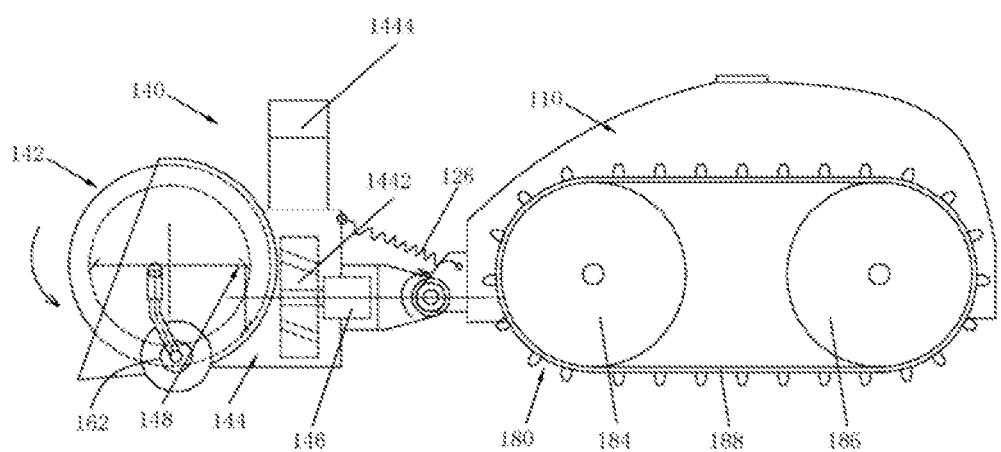
FIG. 4 is a floating schematic view of a snow throwing working head of the automatic moving snow removal device in FIG. 1.

As shown in FIG. 4, the snow throwing mechanism 140 comprises a snow scraping component 142, a snow throwing component 144 and a motor 146 driving the snow scraping component 142 and the snow throwing component 144 to work, the snow scraping component 142 can be a spiral snow collecting wheel, such as an auger, in one embodiment, a speed of the auger is smaller than 100 r/min and in another embodiment, the speed of the auger is smaller than 50 r/min, and the snow can be collected more efficiently. The snow throwing component 144 comprises a snow throwing wheel 1442 and a snow throwing cylinder 1444, the snow throwing wheel 1442 can be a centrifugal fan, the snow collecting wheel rotates along an arrow direction as shown in the figure to collect the snow into a cavity body, and the centrifugal fan in the cavity body throws the accumulated out from the snow throwing cylinder 1444 by using a centrifugal force during high speed rotation. A rotary speed of the snow throwing wheel is better 1000-1500 r/min, and in one embodiment, the rotary speed is 2500-3500 r/min, wherein the snow scraping component 142 and the snow throwing component 144 can be driven by the same motor, or driven by different motors. As shown in the figure, one motor 146 drives the front end snow scraping component 142 by a transmission mechanism 148 and drives the centrifugal fan to rotate at the same time. The transmission mechanism 146 can be a conical gear mechanism, a turbine worm mechanism, etc.

The detection module of the snow blower 100 can comprise two parts, one part is configured to detect an external environment of the snow blower 100, which specifically and possibly comprises one or more of the distance, the angle and the direction of the snow blower 100 or configured to detect the condition of the surrounding environment comprising people, animals, moving objects, obstacles, weather condition (rail, snow and the like), etc., when the snow blower 100 works. The one part comprises various environment sensors, such as a humidity sensor, a temperature sensor, an acceleration sensor and a light ray sensor, and these sensors can help the snow blower 100 to judge a working environment to execute the corresponding programs. The other part is configured to detect internal parameters of the snow blower, such as the detection on energy and the detection on a moving distance.

Figure 5:
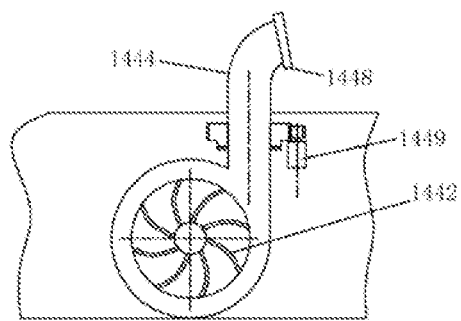
FIG. 5 is a rotating schematic view of a snow throwing pipe of the snow throwing working head of the automatic moving snow removal device in FIG. 1.
Figure 6:
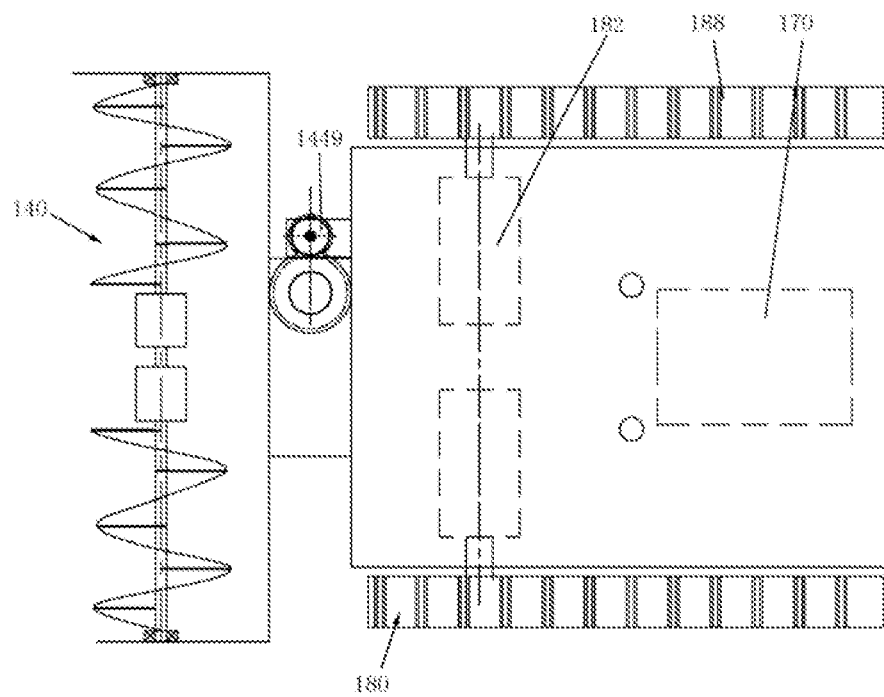
FIG. 6 is a rotating top schematic view of the snow throwing pipe of the snow throwing working head in FIG. 5.

During snow throwing, attention should be paid to the safety of snow throwing to prevent the snow from being thrown onto people and animals to cause an injury. Therefore, the detection module needs to comprise an obstacle detection device. Referring to FIGS. 5 and 6, in the present embodiment, a snow outlet position of the snow throwing cylinder 1444 is provided with an obstacle detection sensor 1448, that is, the obstacle detection sensor 1448 is configured to detect whether the area in the snow throwing direction has people, animals or other obstacles in real time. The obstacle detection sensor 1448 can be an ultrasonic sensor, an infrared sensor, a laser sensor, etc. When the obstacle detection sensor 1448 detects the obstacle within a certain range of the snow throwing direction, the orientation of a snow throwing opening can be automatically changed, so as to change the snow throwing direction. Specifically, the snow throwing cylinder 1444 rotatably sleeves an outlet pipe of the snow throwing wheel 1442, a steering motor 1449 is disposed on one side of the snow throwing cylinder 1444, a pair of gears is disposed between the steering motor 1449 and the snow throwing cylinder 1444, and the steering motor 1449 drives the snow throwing cylinder 1446 to rotate by the pair of gears. The steering and the rotary speed of the steering motor 1449 are controlled by the control module, the control module can control the steering motor 1449 according to a signal detected by the obstacle detection sensor 1448, the steering motor 1449 can also be controlled based on other conditions, for example, when the moving direction of the snow blower is changed but the snow throwing direction is not changed, the control module is required to control the steering motor 1449 to drive the snow throwing cylinder 1444 to rotate to keep the original snow throwing direction.

Figure 2:
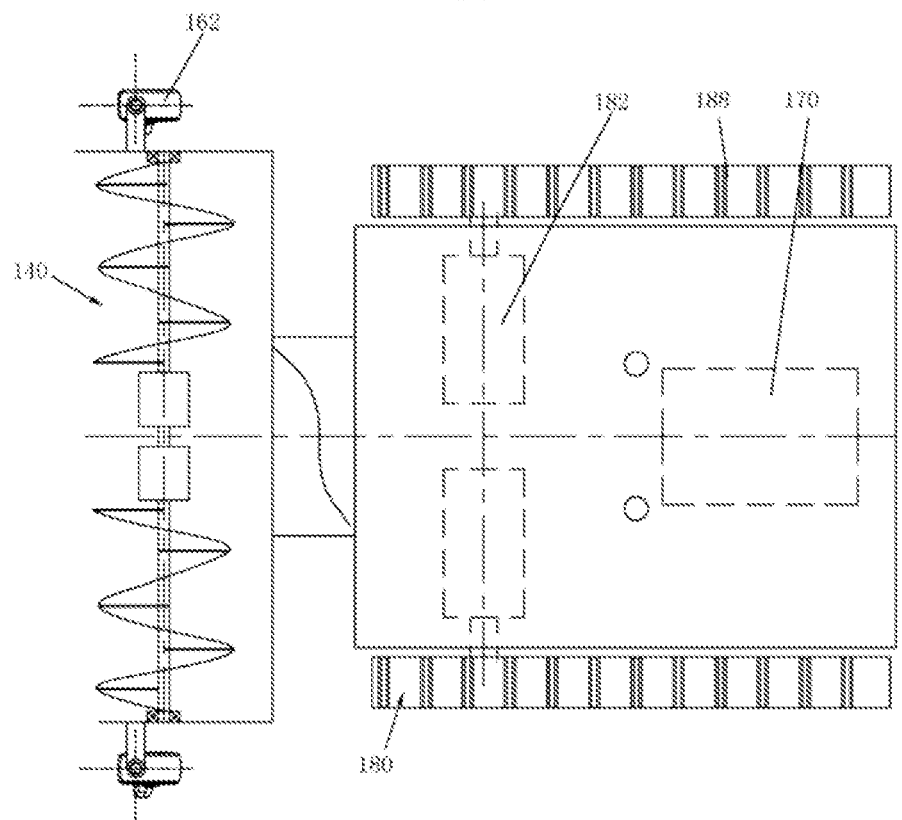
FIG. 2 is a top view of the automatic moving snow removal device in FIG. 1.
Figure 3:
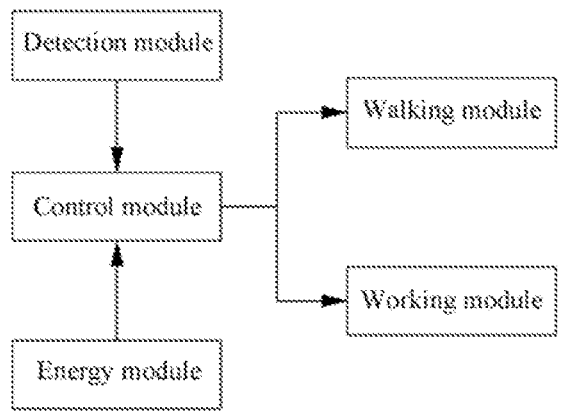
FIG. 3 is a system block diagram of the automatic moving snow removal device in FIG. 1.

Referring to FIGS. 1, 2 and 4, in order to realize the stable support of the working head mechanism such as the snow throwing mechanism, the working head mechanism is provided with rolling wheel devices 162, and in one embodiment, two rolling wheel devices 162 are disposed, which are located both sides of the working head mechanism along an advancing direction of the snow blower 100, when the snow blower 100 moves on the ground, the working head mechanism can be supported, and due to the support of rolling, the resistance that a host 110 of the snow blower 100 drives the working mechanism to advance is reduced, and energy is saved. Besides, since the working head mechanism and the host 110 are in pivoting connection, when the snow blower 100 moves on an uphill or downhill ramp, the working head mechanism will ascend or descend for an angle in advance relative to the host 110 due to the support of the rolling wheel devices 162, and the working head mechanism is prevented from being abutted against the ground or being too far away from the ground so as to completely clean the accumulated snow.

Referring to FIG. 4, in the present embodiment, the distance of the working head mechanism relative to the ground is adjustable, that is, the working head mechanism is floatable. When a section in the moving path of the snow blower 100 needs no snow removal, or only a certain thickness instead of all the snow on the surface needs to cleaned, the snow blower 100 may be required to span across some obstacles, and in these situations, the working head mechanism is required to be lifted from the ground for certain distance. According to the foregoing fact that the working head mechanism and the host 110 are in pivoting connection, the host 100 can be provided with a drive motor, the working head mechanism is driven by the drive motor to pivot relative to the host 110, such that the distance of the working head mechanism relative to the ground can be adjusted. In other some implementable embodiments, the working head mechanism can be disposed to be vertically movable relative to the host, and similarly, the vertical movement of the working head can be realized by using the drive motor to drive a rotary-linear converting mechanism. The control of the drive motor can be realized by the control module, i.e., the rotary speed, the steering and rotating time of the drive motor are controlled by the control module, thereby adjusting the distance of the working head relative to the ground.

Continuing to refer to FIGS. 1, 2 and 4, the moving module is configured to drive the snow blower to move on the ground or surface in the working area, and the moving module consists of a track moving component 180 and moving motors 182 driving the track moving component. The track moving component 180 mainly comprises driving wheels 184 and driven wheels 186 connected to the moving motors and tracks 188 connected on the driving wheels and the driven wheels, and two tracks 188 and two corresponding driving wheels 184 and driven wheels 186 are respectively disposed and are located on both sides of the snow blower. Two moving motors 182 are disposed and respectively drive the driving wheels 184 on the corresponding two sides, wherein the driving wheels 184 can be front or back wheels, of course, the amount of the driving wheels is not necessarily two, each wheel of the multiple driving wheels is controlled by one motor, and in this way, the moving capacity on rainy and snowy days is higher like four-wheel drive of vehicles. In one embodiment, the tracks 188 are rubber tracks, and have the characteristics of large traction force, small vibration, low noise, good wet land passage capacity, no damage to the road surface, high sped, small mass and the like, and the rubber tracks can improve the driving performances of the machinery, expand the range of mechanical operation, and also have the advantages of flexible steering and high passage capacity on complex terrains and the like. Of course, the moving module can be formed by a wheel set mounted on the snow blower and a moving motor driving the wheel set. The wheel set comprises driving wheels connected to the moving motor and an auxiliary wheel mainly playing a role of auxiliary supporting, two driving wheels are disposed and are located on the back part of the snow blower, at least one driving wheel is connected to the moving motor, and one or two auxiliary wheels are disposed and are located on the back part of the snow blower. Compared with the wheel type moving, the track type moving has large support area and small ground connection specific pressure, and is suitable for the operation in soft or muddy sites, and is small in sinking degree, small in rolling resistance and better in passage capacity. Besides, the support surfaces of the tracks are provided with track teeth, which are not easy to slip and good in traction attachment property and are favorable for realizing a larger traction force. But compared with the track type moving, the wheel type moving is simple in structure, light in weight, small in motion inertia, good in buffering effect, wear-resistant, low in cost, long in service life and better in maneuvering characteristics. Of course, the moving module can be combined by the track moving system and the wheel system, that is, the front end of the snow blower is provided with the track system, which can grip the ground uphill and downhill, prevent slippage and the like, and the back end is provided with the wheel system, which can reduce the weight and improve the maneuvering characteristics. In order to obtain better sweeping quality, in one embodiment, the moving speed of the moving module is smaller than 70 m/min, in another embodiment the moving speed is 15-30 m/min.

The above working module and moving module are driven by different motors, these motors are powered by the energy module, the two driving wheels 184 of the moving module are respectively connected to one moving motor independently, and the two moving motors are controlled to rotate at the same speed in the same direction or rotate at different speeds or rotate in different directions, the snow throwing machine moves straightly or is steered. Or for the moving module, the two driving wheels are driven by one moving motor, while the support wheel is controlled by the other steering motor to realize steering. By using multiple motors, the respective systems can be controlled independently, and the structure of the transmission system is simplified. In one embodiment, the above motors are electric motors. Of course, according to the difference of provided energy, a pneumatic motor, a hydraulic motor, an engine and the like can be alternately used, and the combination with electric motors can also be used.

The energy module is configured to provide energy for various work of the snow throwing machine, such as electric energy, hydraulic power, gasoline, diesel, natural gas, etc., the energy module can only provide energy for the moving module, for example, during snow pushing, the working head is not required to be driven by the motor, the energy module can also only provide energy for both the moving module and the working module, while the control module is powered by an independent battery, etc. In one embodiment, the energy module of the present embodiments comprise a chargeable battery 170 and a charging connecting structure, and the charging connecting structure is usually a charging electrode plate capable of being exposed out of the snow blower. In one embodiment, the chargeable battery 170 is a lithium battery, and of course, if wirelessly charged, the charging connecting can also be a wireless charging receiving device. In addition, the energy module can also be a photovoltaic battery, that is, be charged by a solar cell. Therefore, the energy supply of respective modules has multiple choices, for example, the moving module and/or the working module with large energy consumption is powered by the energy such as the gasoline, diesel and natural gas, while the energy of the control module is provided by adopting the battery (comprising a one-shot battery, the chargeable battery, the photovoltaic battery, etc.). According to the working condition and energy consumption of the snow blower, the total power used by the working module and the moving module is between 200-3000 W, and of course for the complex working conditions or the working in larger areas, the total power can be higher, for example 5000W.

The control module is configured to control the automatic moving and working of the snow throwing machine, is a core part of the snow throwing machine, and executes the functions comprising controlling the working module to start to work or be stopped, generating the moving path and controlling the moving module to move along the moving path, judging electric quantity of the energy module and timely instructing the snow throwing machine to return for charging and the like. The control module usually comprises a controller, a memory and other peripheral circuits. The controller can execute a hardware instruction, for example, executes program instructions stored in a readable memory medium (a disk or memory, etc.,) of the processor by a universal or special processor. The controller reads the instructions from the memory and executes these instructions to control the operation of the snow blower. The controller can use any usable processor, and the common processor can be, for example, a singlechip, a digital signal processor (DSP), an advanced RISC machines (ARM) processor, a programmable logic circuit (PLC), etc. The memory can be implemented by any common technologies, such as a computer read only memory (ROM), a random access memory (ROM), a static RAM (SRAM), a dynamic RAM (DRAM), a FLASH and a double data rate (DDR) synchronous dynamic random-access memory (SDRAM), or some other memory technologies. The control module is provided with algorithms for executing work according to various pieces of information and working conditions, or computer programs, and these algorithms or programs are executed to control the operation of the snow throwing machine.

Except the above modules, the snow blower further comprises a housing for containing and mounting respective modules, and an input module for a user to input certain set information, for example, an operation panel, or a remote control device for remotely inputting set information (for example, a mobile phone, an IPAD, a laptop, a remote control, etc.,), i.e., a man-machine interaction module and the like.

Figure 7:
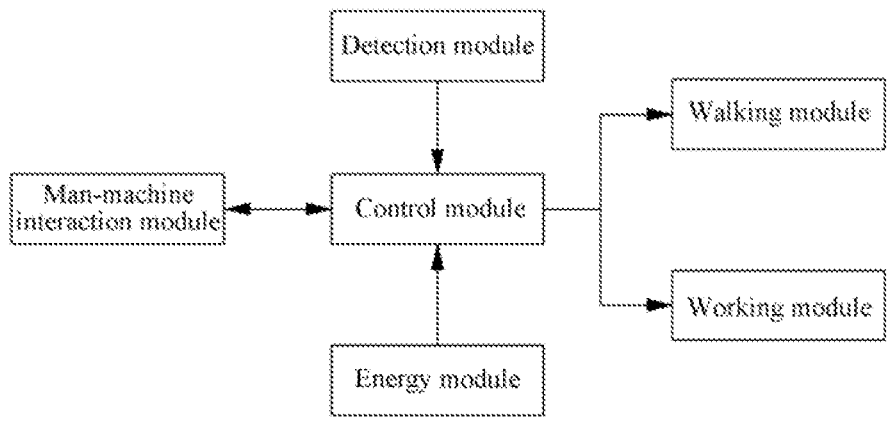
FIG. 7 is a system block diagram of automatic work implemented by the automatic moving snow removal device in FIG. 1.

The snow blower 100 according to the present embodiment can automatically perform snow removal work in the working area, and its working path cannot be random. Therefore, the moving path of the snow blower must be planned, and such planning can be realized in two manners, one manner is a man-machine control manner, for example, remote control operation, setting on the operation panel, etc. As shown in FIG. 7, the system of the snow blower 100 comprises a working module, a moving module, an energy module, a control module, a detection module and a man-machine interaction module, wherein the man-machine interaction module has a communication unit, and can receive a control signal sent by an intelligent device such as a remote control, a SMARTPHONE and an IPAD, these control signals are transmitted to the controller of the snow blower, and the controller can control the snow blower to advance, withdraw, steer, etc. In addition, the snow blower 100 can be provided with a camera, such that the remote control can be realized by the user indoors. If the camera is not mounted, the remote control can be realized by the user through direct observation. The above snow blower in the remote control manner does not need the detection module, and such manner is relatively simple, but needs all-time operation of the user.

Figure 8:
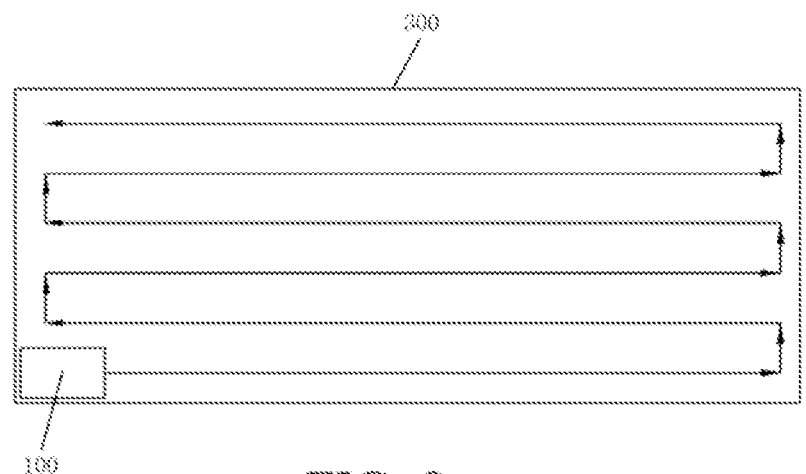
FIG. 8 is a snow removal path diagram of an automatically working snow blower in FIG. 7.
Figure 9:
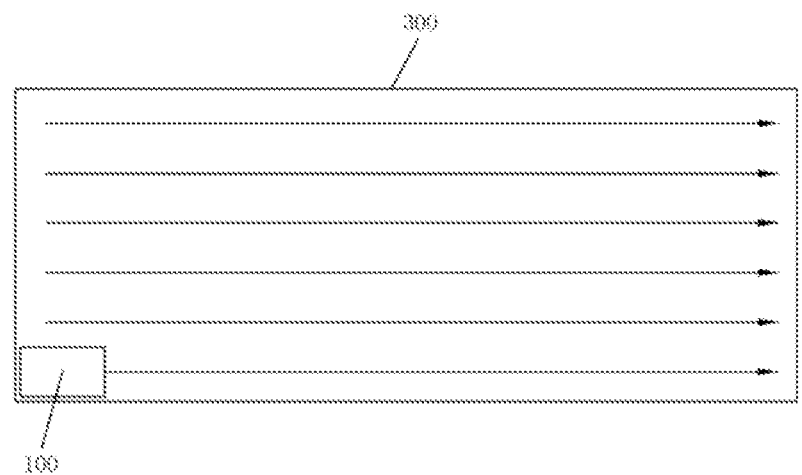
FIG. 9 is another snow removal path diagram of the automatically working snow blower in FIG. 7.

The preferable man-machine control manner in the present embodiment is that the user remotely controls the snow blower 100 to advance to a start point of the working area, and then causes the snow blower 100 to automatically move and work by certain settings. These settings can be the setting of specific data such as a moving direction, a moving distance and a moving manner of the snow blower 100, and can also be the setting that the snow blower sweeps the snow according to a fixed shape, for example, a rectangle, a circle or other shapes, the snow blower automatically works according to the set graphic shape, and the like. For the snow blower with such automatic working manner, the detection module at least comprises a direction detection device, for example, the sensor indicating the direction, such as an electronic compass or gyroscope, in this way, the user can set an advancing direction of the snow throwing machine and cause the snow throwing machine to move on a straight line. The control module can set the start point position where the snow throwing machine begins to work as an original point to generate a border coordinate map according to the information (such as the length and width sizes) of the regular working area input by the input module, and the control module controls the snow throwing machine to regularly move and work within a border of the working area by using the direction detection device according to the border coordinate map. Specifically, as shown in FIGS. 8 and 9, the user manually inputs a snow removal area for example 4m×10 m by the input module for example a remote control device or a built-in operation panel of the snow throwing machine, remotely controls the snow blower to advance to the start point or manually pushes the snow blower to the start point, and sets the position of the snow blower as the coordinate original point, the controller generates at least two snow removal paths according to the algorithms or programs stored in the control module and according to the data input by the user, one snow removal path is as shown in FIG. 8 and is the snow removal path of reciprocating along the length direction of a road, the other snow removal path is as shown in FIG. 9 and is the snow removal path toward one direction along the length direction of the road. The advancing times for snow removal can be automatically generated according to a width of the working head, for example, if the width of the working head is 0.5 m and the set snow removal area is 4 m wide, then the controller calculates that the advancing of at least 8 times is required. The user can select of the snow removal paths, and can also directly start the snow blower for working, that is, adopts the snow removal path of system default. By a direction indicating sensor, the detected direction data are transmitted to the control module, and the control module compares the received direction data with the selected snow removal path direction data, and controls the moving direction to adjust the moving direction when the two pieces of data are inconsistent, such that the snow throwing machine can move along the straight line. The controller can also calculate the moving distance of the snow throwing machine according to the rotary speed and the moving time of the driving wheels of the moving module, and controls the snow throwing machine to steer once the preset distance is reached, in one embodiment, the moving circle number N of the driving wheels and a perimeter L of the driving wheels are detected, and the moving distance is obtained by multiplying N by L. The moving distance of the snow throwing machine can be also be realized by setting a speedometer. The snow blower is returned back to the start point after the snow removal is finished, and the user can set another area for snow removal.

The above man-machine controlled semiautomatic snow removal mode is suitable for the conditions of relatively simple working areas and regular roads, the semiautomatic path can be set to be reciprocating or moving in the same direction, the moving in the same direction is intended to pile the snow to one side, while the reciprocating is intended to pile the snow to two sides, and after the working is finished, the snow blower can be returned back to the start point or directly stops. In addition, the user can set the direction of a fixed start point, so as to avoid the deviated moving caused by direction deviation after the snow blower is remotely controlled by the user to return back to the start point. After the path is well set, the control module will control an advancing direction of the snow blower according to the direction detection sensor, and calculates the advancing distance, in this way, no artificial operation is required in the working process of the snow blower. The above setting can also be realized without the intelligent device such as the remote control, the SMARTPHONE and the IPAD, for example, the snow blower is provided with the operation panel per se, and the corresponding settings can be finished on the operation panel.

Figure 10:
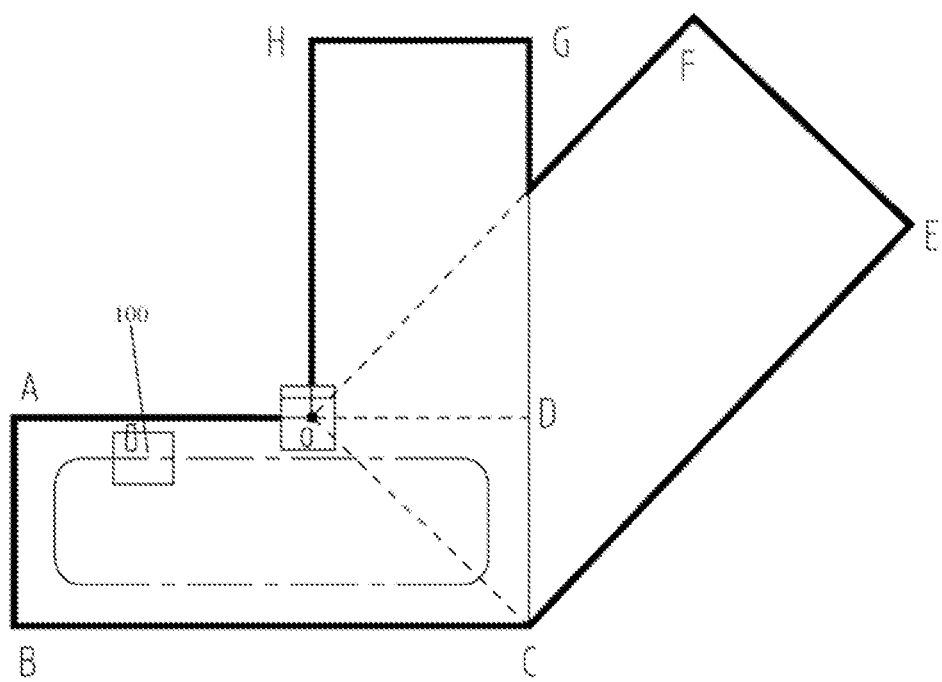
FIG. 10 is yet another snow removal path diagram of the automatically working snow blower in FIG. 7.
Figure 11:
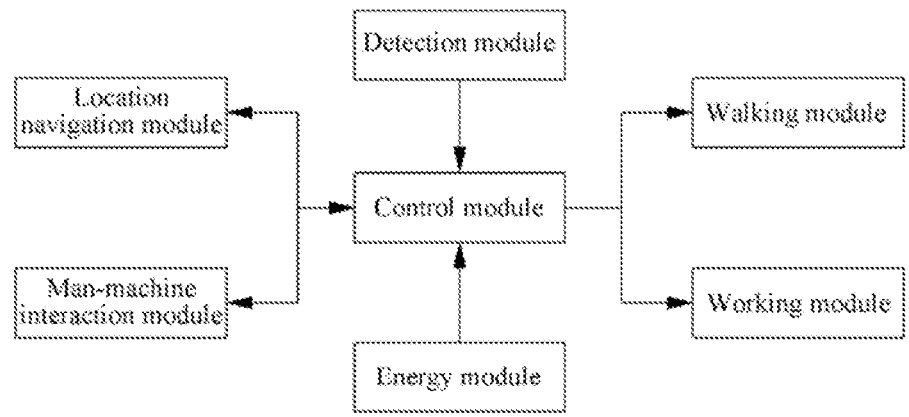
FIG. 11 is a system block diagram of a snow blower in a preferred second embodiment according to the present invention.

FIG. 10 shows a relatively complex working condition, the working area comprises three parts extending to three directions, when the snow removal area is set, the setting can be performed respectively according to the above method, that is, after the working of one area is finished, the another area is set, of course, there are more preferable solutions. Specifically, the working area can be divided into three regular areas: OABCDO, OCEFO and ODGHO, wherein the intersection point O of the borders or the extending directions of the borders of the three areas is set as the base point, i.e., the original point, by using the snow sweeping path solution that the regular area uses the direction sensor and a regular parallel line mentioned in the above method, multiple areas can be set once, the snow blower is returned back to the original O after one area is completely swept, and sweeps another area after correction.

The two above manners can be both considered as linear path manners of inertia guide navigation, and in such embodiment, the detection module further comprises an energy detection unit, the energy detection unit is configured to detect an energy value of the energy module and feeds the energy value information back to the control module, when the energy value detected by the detection module reaches or is lower than the preset value, the control module starts alarm for reminding, and there are many alarm reminding manners, for example, the snow blower sends an alarm sound per se, the controller sends an alarm signal to the remote control device, etc.

FIGS. 11 to 40 show a preferred second embodiment of the present invention, and the present embodiment still takes the snow blower capable of automatically throwing snow as an example for explanation.

The snow blower capable of automatically throwing snow comprises a working module, a moving module, an energy module, a control module, a detection module, a location module, and the like. Wherein the working module, the moving module, the energy module, the control module and the detection module are same parts as the foregoing embodiment and are not repeated here. The difference from the foregoing embodiment is that the snow full automatic snow removal work of the snow blower is realized in a location navigation manner.

The snow blower is not always capable of or required for working in any places, and its working area has a boundary. In addition, when the electric quantity of the energy module of the snow blower is insufficient, it is required to be supplied with electric energy in a fixed place and required to be parked in a place when not in work, that is, a dock. The snow blower 100, a boundary 300 and the dock 500 form an automatic snow removal working system, wherein the boundary 300 is configured to limit the working area of the snow blower, the snow blower can move and work within or between the boundaries, and the dock 500 is configured to park the snow blower, and configured for the snow blower to return back for energy supplement when the energy is insufficient.

The boundary is the joint name of a border and obstacles. The border is the periphery of the whole working area, and is usually connected end to end to close the working area, the border can be tangible or electronic, that is, the border can be a tangible border formed by a wall, a fence and handrails, or the border is a virtual border described on an electronic map or a border formed by the connecting line of N coordinate points, or a virtual border signal such as an electromagnetic signal or optical signal can be sent by a border signal generating device. The obstacles are the parts or areas where the moving cannot be realized within the working area, for example, indoor sofas and bedside tables or outdoor ponds and flower-stands, similarly, the obstacles can be also tangible or electronic, the tangible obstacles can be formed by the aforesaid obstacles per se, and the electronic obstacles can be formed by virtual obstacle signals sent by the border signal generating device. The virtual border signals and the virtual obstacle signals can be the same or different signals, and are selected according to specific needs.

Therefore, the detection module of the snow blower 100 further comprises a boundary detection unit for detecting a relative position relation between the snow blower 100 and the boundary 300, which specifically and possibly comprises one or more of the distance, the angle, and the direction inside and outside the boundary. There are multiple principles for the boundary detection unit, for example, an infrared manner, an ultrasonic manner, a collision detection manner, a magnetic induction manner, etc., and the disposing positions and the amount of the sensors thereof and the corresponding signal generating devices are also multiple, are related to the path planning manners, and are thus specifically explained in combination with specific embodiments and path planning manners in the following.

Figure 12:
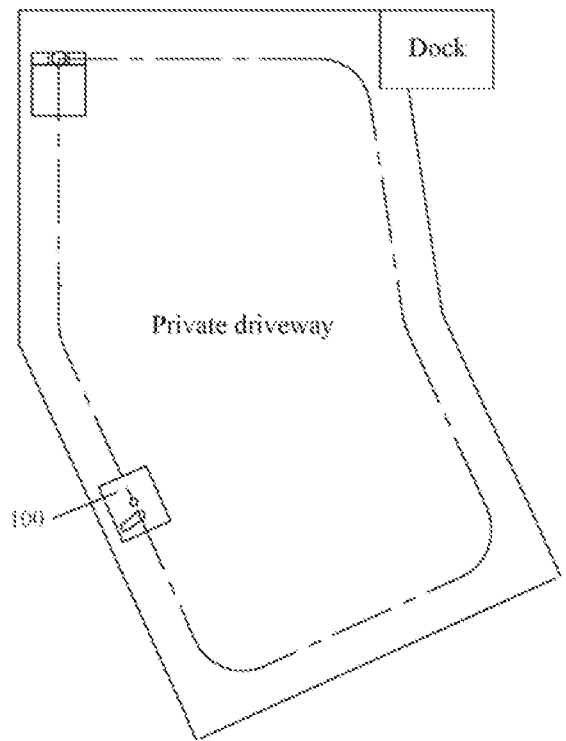
FIG. 12 is a schematic diagram of a snow removal system formed by a boundary, a dock and the snow blower in FIG. 11.
Figure 13:
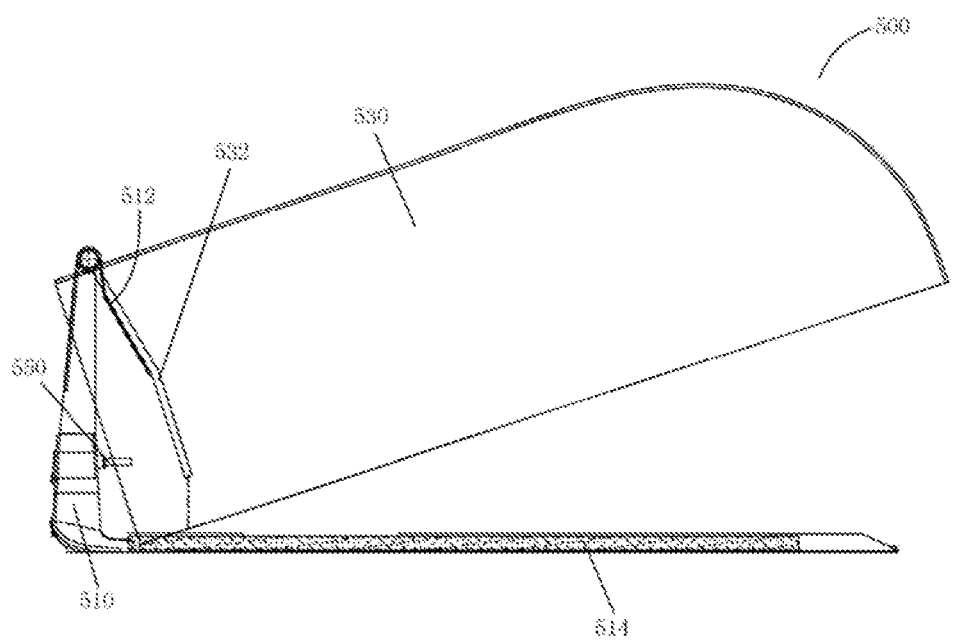
FIG. 13 is a schematic diagram of the dock in FIG. 12, and at this point, the snow blower does not enter the dock.
Figure 14:
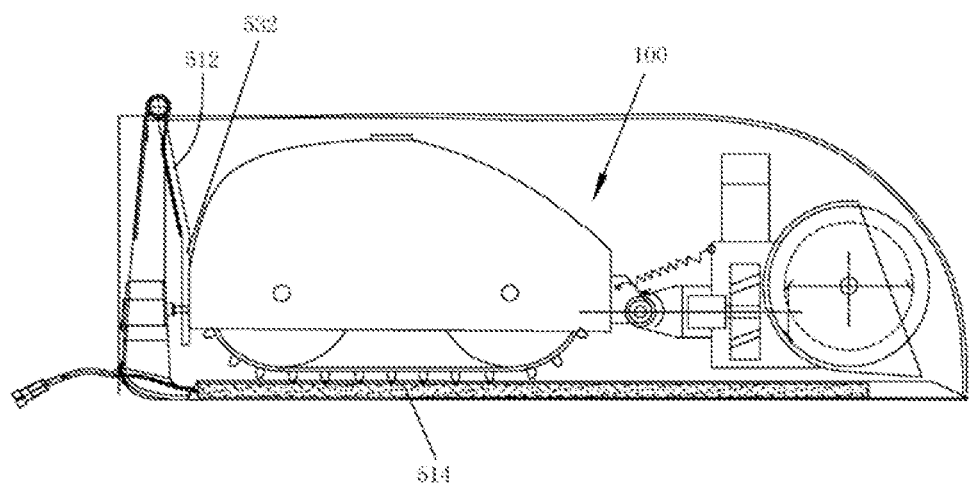
FIG. 14 is a schematic diagram of the dock in FIG. 12, and at this point, the snow blower enters the dock and is jointed by electrodes to be charged.

Referring to FIGS. 12 to 14, the dock 500 is usually located on the edge of a working range, is often located aside or on the boundary 300, and is connected to mains supply or other electric energy supply systems for the snow throwing machine to return for charging. In the present embodiment, in one embodiment, the dock 500 comprises a base 510 and an outer cover 530 movably disposed on the base, the base 510 of the dock 500 is provided with a charging electrode 550, configured to be connected to the corresponding electrode of the snow blower 100. When the snow blower 100 does not enter the dock 500, the outer cover 530 is open, and when the snow blower 100 enters the dock 500, the outer cover 530 is automatically closed to close the snow blower 100 within the dock 500. By the position conversion of the outer cover 530, a closed space can be formed after the snow blower 100 enters the dock 500, the snow blower is convenient to store when the snow blower 100 is not required to work, meanwhile, the snow blower 100 is isolated from the outside low temperature environment, and the charging and heat preservation of the snow blower 100 in the dock 500 are facilitated. In order to automatically close the outer cover 530, the base 510 is provided with an abutting mechanism for abutting against the outer cover 530 to a position where the outer cover 530 is open, raised ribs 532 are fixedly disposed on the outer cover 530, the abutting mechanism is a torsional spring 512, In one embodiment, one end of the torsional spring 512 is fixed on the base 510 and the other end is abutted against the raised ribs 532 of the outer cover 530, when the snow blower 100 enters the dock 500, the snow blower 100 will abut against the raised ribs 532, and with the moving of the snow blower 100, the outer cover 530 is driven by the raised ribs 532 to overcome the force of the torsional spring 512 to rotate to the closed position. By disposing the above abutting mechanism, the outer cover 530 can be automatically closed along with the entrance of the snow blower, the structure is simple and the cost is low. Of course, the outer cover 530 can also be automatically opened and closed in an electrical control manner, for example, induction automatic doors (infrared induction, microwave induction, touch induction and pedal induction), and the automatic doors controlled by various signals to be automatically started and closed.

In order keep a reasonable temperature in the dock 500 and facilitate charging and storage of the snow blower 100, a heating system can be disposed in the dock 500, a heating thermal insulation material can be arranged on the outside wall, the outer cover 530 or the bottom of the dock 500, or an air heater or an electric heating device such as an electric furnace and an electric heater can be disposed in the dock 500. In the present embodiment, in one embodiment, a carbon crystal floor heating material 514 is embedded into the bottom of the dock 500, and can play a role of rapidly raising the temperature of an object, and 100% of the electric energy input is effectively converted into more than 60% of conducting heat energy and more than 30% of infrared radiation energy. Due to such double-heating principle, for the heated object, firstly the temperature rise is faster, and secondly, the absorbed heat energy is more sufficient. In another preferred solution, a bottom plate of the dock is provided with an electric heating wire, or electric heating plate and temperature controller, internal constant temperature is realized by the temperature controller, and the heat can be effectively preserved by the thermal insulation material on the outer cover.

Figure 15:
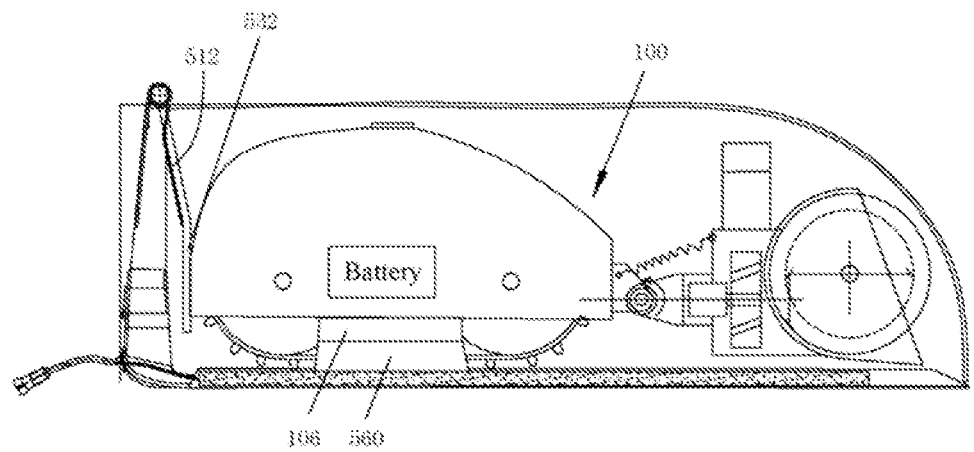
FIG. 15 is a schematic diagram of the dock in FIG. 12, and at this point, the snow blower enters the dock and is wirelessly charged.

As shown in FIG. 15, the charging manner of the snow blower 100 is wireless charging, the dock 500 can be provided with a wireless charging emitting device 560, and correspondingly, the snow blower 100 is provided with a wireless charging receiving device 106. Specifically, the bottom plate of the dock 500 is provided with a wireless charging emitting plate, correspondingly, the snow blower 100 is provided with a wireless charging receiving plate, the energy is transferred between the two by a magnetic field, and thus no wire connection is required, the dock 500 and the snow blower 100 can realize no exposure of conductive contacts, that is, no design of electrified contacts, the danger of electric shock is avoided, and therefore, the mechanical wearing during connection and separation and the loss caused by arcing are also avoided. In addition, no power transmitting elements are exposed, and corrosion by water content and oxygen and the like in air is avoided. Besides, if the snow blower 100 is automatically charged and jointed, the connection is much easier compared with the snow blower with the electrodes.

Figure 16:
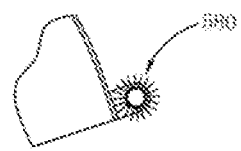
FIG. 16 is a schematic diagram of a solution that the dock in FIG. 12 is provided with a snow sweeping device.
Figure 17:
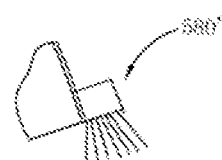
FIG. 17 is a schematic diagram of another solution that the dock in FIG. 12 is provided with a snow sweeping device.

As shown in FIGS. 16 and 17, in the present embodiment, in one embodiment, the dock 500 is further provided with a snow sweeping device 580, configured to clean accumulated snow on the snow blower 100 when the snow blower 100 enters the dock 500. Specifically, a snow sweeping brush is disposed on the edge of the outer cover 530 of the dock 500, and the snow sweeping brush can be controlled to rotate or be triggered by an external force to rotate. The snow sweeping brush is constructed as a rolling brush form. A rotary shaft of the rolling brush is approximately parallel with the ground, and a material of the rolling brush can be a soft material such as plastic, nylon and wool fabric. The rotation of the rolling brush can be automatically controlled, for example, the dock 500 starts the rolling brush to rotate once receiving the signal that the snow blower 100 is returned back for charging, or starts the rolling brush to rotate while the outer cover detects the snow blower and is opened for entrance of the same, or starts the rolling brush to rotate under the touch that the snow blower enters the dock, etc. In addition, the snow sweeping brush can also be constructed into a row brush form disposed along the edge of the outer cover 530. As the snow blower 100 moves to enter the dock 500, the row brush sweeps the top cover of the snow blower 100 to clean the accumulated snow on the top cover. Of course, the snow sweeping brush can also be multiple rotating brushes distributed on the edge of the outer cover 530, the rotary axis approximately forms an angle with the ground, and in this way, the accumulated snow on the top cover can also be cleaned when the snow blower 100 enters the dock 500. In addition, the snow blower 100 can also have the function of cleaning the accumulated snow on the top per se, for example, the top cover is inclined for an angle per se, the top cover can be disposed to regularly shake or to shake once detecting the accumulated snow, and a snow scraper, a hairbrush and the like can also be disposed on the top cover.

According to the location navigation manner in the present embodiment, the coordinates of the snow blower can be obtained in real time by a satellite location manner, and the snow removal path is navigated according to the coordinates. The satellite location manner controls the snow blower to work relative to the man-machine control manner, the cost is slightly high, but the degree of automation is higher, and both of them have the advantages and the disadvantages.

Because the snow blower 100 needs to work during snowing or when there is accumulated snow, in order to realize the snow removal work of the full automatic mode, whether it snows and the snowfall need to be detected at first.

Figure 18:
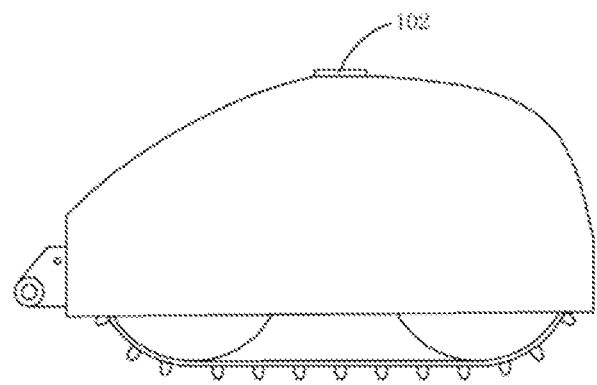
FIG. 18 is a schematic diagram of a first solution that the snow blower is provided with a snow detection device in the preferred second embodiment according to the present invention.
Figure 19:
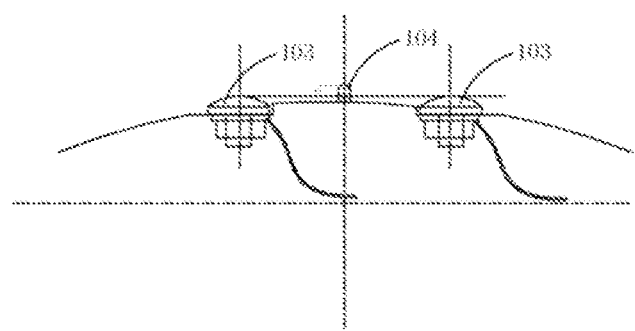
FIG. 19 is a schematic diagram of a second solution that the snow blower is provided with a snow detection device in the preferred second embodiment according to the present invention.
Figure 20:
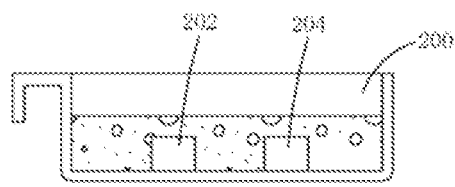
FIG. 20 is a schematic diagram of a third solution that the snow blower is provided with a snow detection device in the preferred second embodiment according to the present invention.
Figure 21:
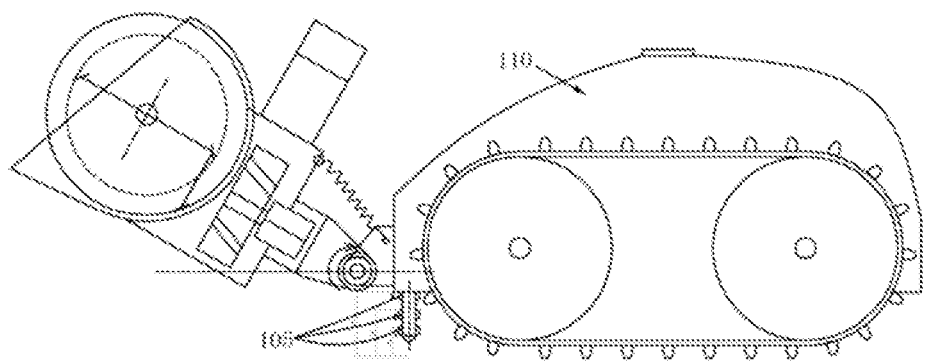
FIG. 21 is a schematic diagram of a fourth solution that the snow blower is provided with a snow detection device in the preferred second embodiment according to the present invention.
Figure 22:
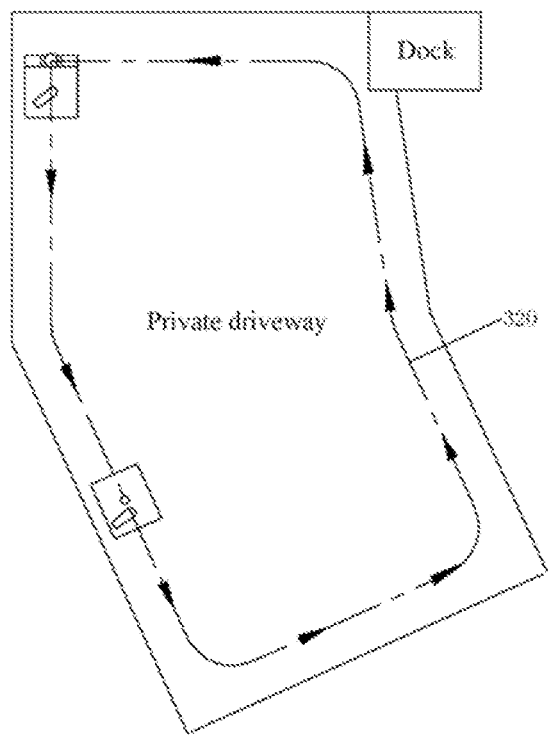
FIG. 22 is a schematic diagram that the snow blower in FIG. 12 sets a working area by adopting a navigation location manner.

There are many solutions for detecting whether it snows and the snow thickness, the preferred first solution is as shown in FIG. 18, a snow detector 102 is mounted on the top of the host of the snow blower, in one embodiment, the snow detection 102 is pressure and humidity sensors, the sensors are better disposed in the highest position of the host 110, the pressure sensor is changed when there is accumulated snow, meanwhile the humidity sensor will detect the humidity change, the sensors feed the detected signals back to the control module, the control module judges whether it snows according to the signals, and calculates the snow thickness if it snows, and the snow blower 100 is controlled to begin to work when the snow thickness reaches a preset value. The preferred second solution is as shown in FIG. 19, two conductive metal bars 103 are mounted on the top of the host of the snow blower 100, an insulating rib plate 104 is mounted between the two conductive metal bars 103, the height of the insulting rib plate 104 is higher than the heights of the two conductive metal bars 103, when the height of the accumulated snow is higher than the height of the insulating rib plate 104, according to the principle of snow conduction, the two conductive metal bars 103 are switched on, a switching on signal is transmitted to the control module, the control module then judges that there is the accumulated snow, and the snow blower is controlled to begin to work. The height H of the insulating rib plate 104 is the minimal snow thickness for triggering the snow blower 100 to begin to work. The preferred third solution is as shown in FIG. 20, a container 200 is provided and is provided with an optical sensor 202 and a humidity sensor 204 on the bottom, the container 200 is placed on the top of the host of the snow blower 100 or the dock 500, when the snow reaches certain thickness, and the optical sensor 202 cannot detect light while the humidity is changed, snow coverage is judged, and then the control module controls the snow blower 100 to begin to work. As shown in the figure, a preferred fourth solution is used for detecting the snow thickness. As shown in FIG. 21, three conductive parts 105 are disposed on the lower side of the host of the snow blower 100, when the first conductive part in the lowest position detects the signal, the snow thickness is H1, and the snow is set to be thin snow; when the second conductive part in the middle detects the signal, the snow thickness is H2, and the snow is set to be moderate snow; and when the third conductive part in the uppermost position detects the signal, the snow thickness is H3, and the snow is set to be heavy snow. The foregoing is the manner of detection by the sensors, of course, whether it snows can also be known by other manners, for example, a weather communication unit receiving weather information in real time is disposed on the snow blower, the weather communication unit transmits the received weather signal to the control module, the control module judges whether it snows and the snowfall according to the received signal, and calculates the snow thickness according to the snowing duration. There are some other manners, for example, when the snow passes by an interval, detection can be realized by sight glass, ultrasonic waves, infrared scanning sensors, etc., and the control module controls the snow blower to begin to work after certain time. Beyond that, there are many other ways for detecting whether it snows and the snow thickness, for example, the snow thickness can also be measured by camera image recognition, ultrasonic waves, etc., which are not repeated here.

The full automatic snow removal mode of the snow blower by the location navigation manner will be explained in detail below. In the present embodiment, the location navigation module can be a DGPS (differential GPS) location module, a GPS location module, a Beidou location module or a differential Beidou location module. In order to ensure the location precision, the DGPS location module and the differential Beidou location module can be adopted. Wherein the DGPS is the system developed in order to improve the precision of code location of the GPS, and adopts a relative location principle to eliminate most of common errors of two different observation points with a differential manner to obtain the higher precision, thereby obtaining more precise path navigation, and the precision can reach the centimeter level. In addition, the location navigation module can also obtain the position of the snow blower in the advancing process by other manners, for example, an ultra wide band technology.

The working flow of the snow blower comprises boundary setting, setting of various specific scenarios, path planning, returning to the charging station, charging manner, and the like and further comprises solutions to the problems in the working flow.

A: Boundary Setting

In the preferred implementing solution, the working area of the snow blower is set in a DGPS manner.

As shown in FIGS. 22-25, when a border line 320 of the snow blower is generated, usually, the snow blower is controlled by manpower to move along the predetermined border line, the snow blower and the location navigation system are integrally mounted generally, and the location navigation system is non-removable. The location navigation system receives a location signal of the base station, the continuous coordinate points when the snow blower moves along the border line 320 can be obtained, and these coordinate points are connected into a line, i.e., the border line 320. Since the location navigation system is non-removable, in order to obtain the coordinate points of the border line, the snow blower must be moved per se, then the coordinate points of the border line can be obtained, but it obviously has the technical problems that the snow blower is heavier and larger, inflexible to move and hard to operate and control.

The location navigation module can be constructed as a location navigation device 130 detached from the snow blower, meanwhile, the location navigation device 130 can also be remounted to the snow blower 100, that is, the location navigation device 130 is detachably mounted on the snow blower. By the present embodiment, the coordinate points of the preset border line can be obtained by the location navigation device 130 only, thereby generating the border line.

The location navigation device 130 comprises a location unit 131, a memory unit 132 and a sending unit 133.

Figure 23:
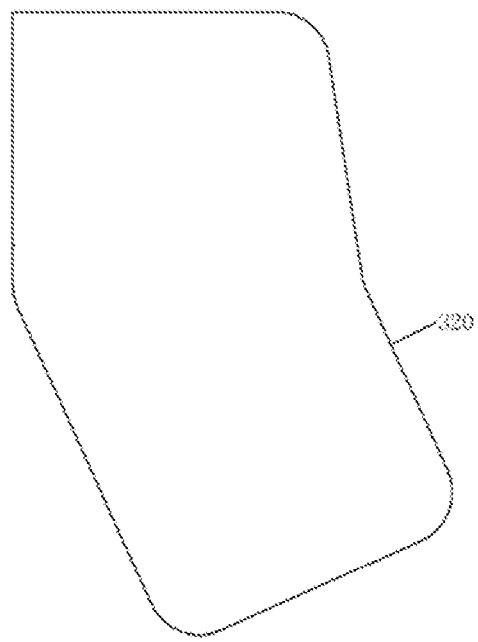
FIG. 23 is a schematic diagram of the working area of the snow blower in FIG. 22.
Figure 24:
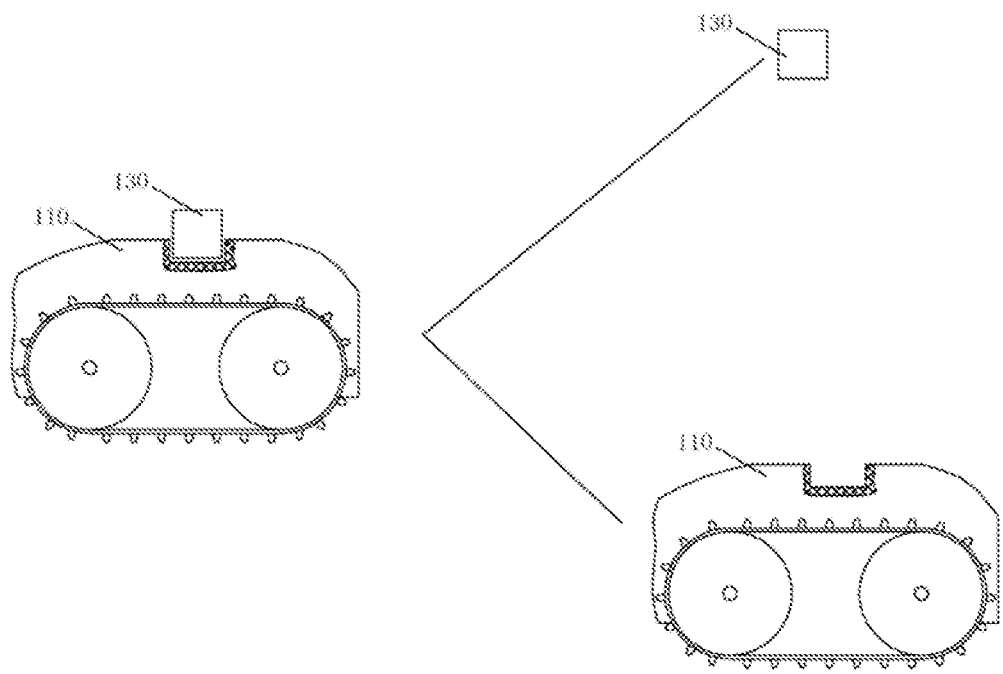
FIG. 24 is a schematic diagram of a detachable location navigation device adopted by the snow blower in FIG. 12.
Figure 25:
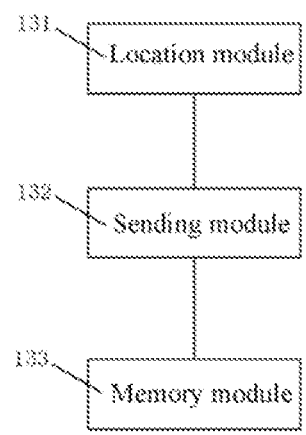
FIG. 25 is a system block diagram of a location navigation device of the snow blower in FIG. 24.

The location unit 131 is configured to obtain the coordinate data when the location navigation device 130 moves along the preset border line. The location navigation device 130 detached from the host 110 of the snow blower is small in size and light in weight, and can be easily carried and moved artificially. Therefore, the location navigation device 130 can be carried artificially to move along the preset border line 320, so as to obtain the coordinate points of the preset border line, the coordinate points are continuous coordinate points, and these continuous coordinate points are connected into the line, that is, the final border line of the snow blower, in other words, a map of the working area, as shown in FIG. 23.

The memory unit 132 is configured to store the location coordinate data of the location unit. The coordinate points obtained by the location unit 131 need to be stored in time, and for this, the location navigation device 130 needs to be provided with the memory unit 132 to prevent data loss.

The sending unit 133 is configured to send the coordinate data stored by the memory module to the outside. The sending unit 133 can send the coordinate data of the border line to the outside timely, for example, to the snow blower. The sending unit 133 can be a wireless sending unit, and can also be a wired sending unit capable of being connected to a data transmission interface (comprising a USB interface, etc.) in the snow blower.

The above location navigation device can be freely detached or mounted in the snow blower, and when the working border line of the snow blower needs to be generated, only the location navigation device needs to be detached from the snow blower, then the border line can be generated simply by the location navigation device, and the generation of the border line is facilitated.

Since the location navigation device 130 can be freely detached from or mounted into the snow blower, in order to ensure connection steadiness when the location navigation device is mounted into the snow blower, the location navigation device 130 can be provided with an interface unit for fixedly mounting the location navigation device in the snow blower. Wherein the interface unit can be a socket or slot, and can be mounted into the snow blower.

In order for convenient power supply, the location navigation device 130 further comprises a battery, configured to provide a power source for the location navigation device. The battery can be charged singly, and can also be charged by the snow blower after the location navigation device 130 is mounted in the snow blower.

The snow blower 100 in the present embodiment comprises the above location navigation device 130, and the control module thereof also comprises a receiving unit, configured to create connection with the sending unit 133 to receive the coordinate data sent by the sending unit 133. The receiving unit can be a wireless receiving unit and can also be a wired receiving unit corresponding to the sending unit 133.

The memory of the snow blower is configured to store the coordinate received by the receiving module. When the navigation device 130 is mounted into the snow blower 110, the memory unit 132 in the navigation device 130 has stored the coordinate data of the border line, since the data are the data stored already, after the location navigation device 130 is mounted in the snow blower 110, the receiving unit can directly store the coordinate data read by the sending unit 133 from the memory unit 132 into the memory of the snow blower 110, so as to be convenient for the snow blower 110 to recognize the border line.

When the snow blower moves, whether the snow blower moves within the border line 320 needs to be detected in real time, for this, the control module of the snow blower also comprises a detection control unit, which is configured to detect whether the coordinate data of the border line 320 stored by the memory are coincided with the coordinate data of the snow blower stored by the memory, and control the snow blower to move within the border line 320 when consistent. When the coordinate data of the snow blower and the coordinate data of the border line 320 are coincided, it is stated that the snow blower has spanned or is about to span across the border line 320, and a moving direction of the snow blower needs to be controlled in time. For this, the detection control unit comprises a detection unit and a moving control unit, and the detection unit is configured to detect whether the coordinate data of the border line 320 stored by the memory are coincided with the coordinate data of the snow blower stored by the memory. The moving control unit is configured to control the snow blower to move within the border line when the coordinate data of the border line 320 stored by the memory are coincided with the coordinate data of the snow blower stored by the memory.

By the above solution, the creation and storage of the map of the snow blower can be finished, thereby realizing the automatic navigation location of the snow blower, the controller calculates the border data of the map according to the coordinate data of the border line stored in the navigation device, and generates map data, the snow blower can be subjected to path planning according to the map, when the snow blower detects insufficient voltage or finishes once snow removal work, the snow blower will automatically store the current coordinates and navigation direction, and return back to the dock 500 for charging, after the charging is finished, the coordinates and navigation direction recorded last time are read, and the snow blower automatically plans the optimal path to reach the coordinate position and then continues to work.

In addition, the above detachable location navigation device 130 can also be universal with other automatic moving devices, for example, an automatic mower, an automatic sweeper, etc., thereby improving the use rate of the location navigation device and reducing a purchase cost of the user.

The location navigation adopted to set the working area of the snow blower is not limited to the above manner, the snow lower can also be provided with the location navigation module per se, the position coordinate data of real time location of the location navigation module are stored in the memory of the snow blower, the controller calculates the data of the map border according to the coordinate data of the border line stored in the memory, and generates map data, and then the snow blower can be subjected to path planning according to the map.

After the user generates the working map, the user can set some special scenarios by the mobile phone and the remote control or on the operation panel of the machine directly, to help the snow blower for division of the working path and the working area and selection of a working mode, which is explained in detail in the following.

B: Intersection Setting

The intersection here means the intersection connecting the sidewalk or lane with a municipal road, due to the reasons of limitation of the working border per se, the size of the snow blower per se, the navigation precision, etc., the snow blower possibly moves to the municipal road, and thus generates some dangers, for example, the snow blower is knocked down by vehicles driven at high speed, is crashed or causes damage to the vehicles or injury to people in the vehicles, in order to avoid these conditions, several solutions are provided below.

Figure 26:
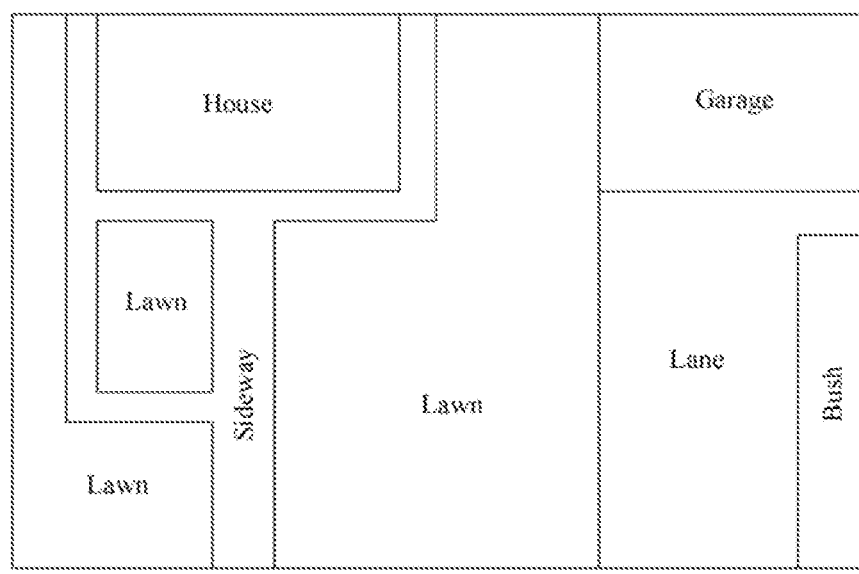
FIG. 26 is a schematic diagram of a house surrounding environment of a user needing snow removal.
Figure 28:
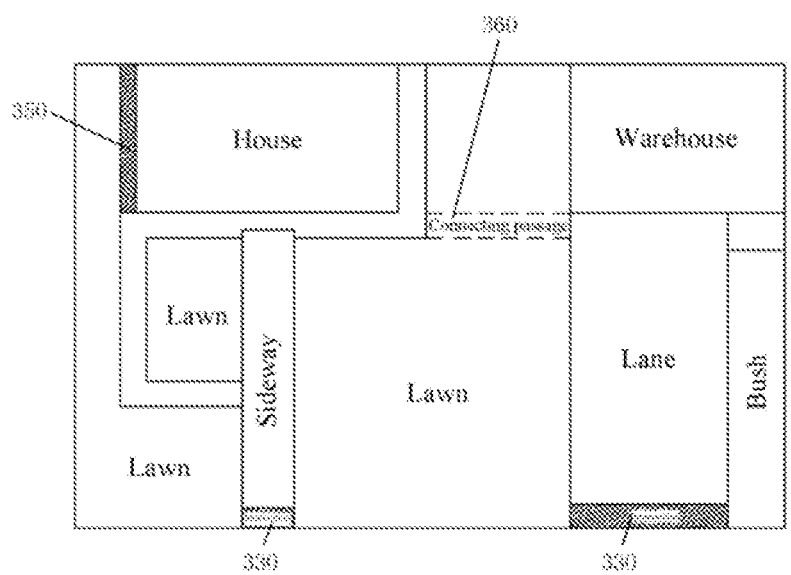
FIG. 28 is a setting schematic diagram of a specific area in the building surrounding environment of FIG. 26.

FIG. 26 shows a schematic diagram of a house surrounding environment of the user of snow removal, the user sets a mark on the intersection 330 on the map, for example, the shadow area in FIG. 28, the size of the area along the sideway or an extending direction of the lane can be preset according to the sizes of the snow blower and the working head of the snow blower, or preset according to navigation errors, then the part of area is filled completely on the map of the working area, that is, the area is not required to be swept by default, and can be manually cleaned by the user, thereby preventing the snow blower from moving to the municipal road.

In addition, the part of area can be artificially excluded outside the snow removal area when the border is set, that is, the nonworking area, and then the snow blower is prevented from moving to the municipal road.

Beyond this, camera scanning can also be used, the intersection is swept if no vehicles are driven in a set distance, or sound-light alarm is started to warn the passing vehicles if the snow blower moves to the municipal road.

C: Lawn Setting

In general cases, the lawn needs no snow removal, and the user usually accumulates the swept snow on the lawn. The lawn is mostly distributed between the roads, after the map is generated according to the several aforesaid manners, the user can mark some areas on the map as the lawn, in the areas marked as the lawn, the user can select whether such the areas needs the snow removal or not, if the snow removal is not needed, then the machine can directly pass by the areas or the machine not move on the lawn, and if the snow removal is needed, then the snow removal mode or snow removal height can be set to avoid the damage to the lawn.

D: Setting of Passages not Connected to Multiple Areas

Figure 27:
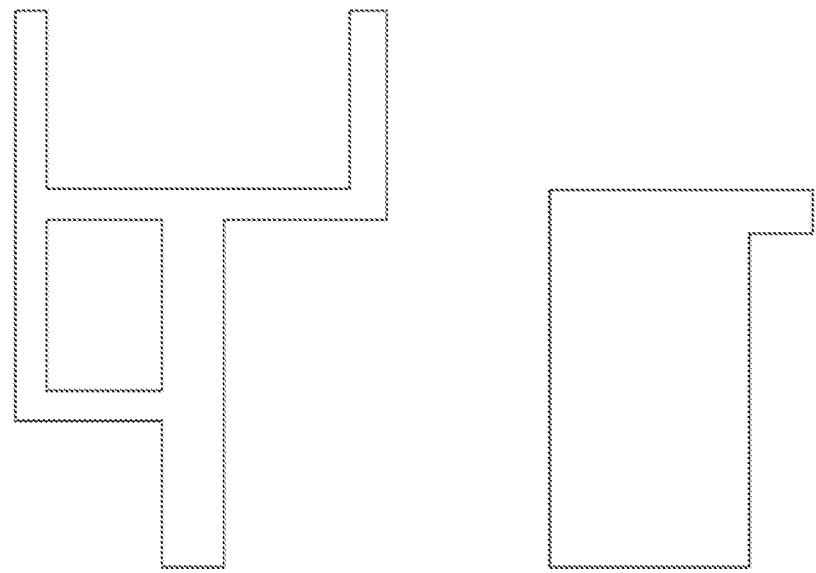
FIG. 27 is a schematic diagram of a working area generated according to the house surrounding environment of FIG. 26.

When there are two or more areas needing the snow removal, or the finally generated map of the user has two or more snow removal areas, the user can set a passage from one snow removal area to another snow removal area, in general cases, the user is suggested to set the passage on the lawn, for example, the area as shown by a virtual line in FIG. 27 is the connecting passage 360 of two snow removal areas, since whether the grass area needs the snow removal or not or the snow removal mode and the snow removal height have been set, extra setting is not required here. Of course, if the user does not set earlier, the user can further set whether the path needs the snow removal or not here. The snow blower can pass by one snow removal area to reach another snow removal area. Of course, the municipal rod can also be selected as the passage, correspondingly, the moving path from one intersection to another intersection needs to be set, for example, the snow blower moves along the border of the municipal road, and performs light-sound alarm to gain the attention of pedestrians and passing vehicles, and compared with the passage in the lawn, the municipal road as the passage is a secondary manner.

A preset minimal size is set for the size of the connecting passage 360, after the user sets the approximate passage path, the snow blower will automatically calculate and supplements the path to the minimal size for passing, and here, the minimal size can be set according to the size of the snow blower per se or the size of the working head. In addition, the passage can also be set in a two-point one-line manner, that is, a start point and an entrance point from one snow removal area to another snow removal are set, and the controller automatically calculates the linear path between the two points (shortest path).

E: Island Setting

When closed areas such as a flower bed and a pool exist in the snow removal area of the user, such part of areas need no snow removal, and are called as islands here, and on the map of the user, they can be set into the islands. The specific manner is that the user directly sets an area island on the map, such manner has relatively large error and is suitable for the situation that the island is higher than the ground, and some collision sensors (for example, the ultrasonic sensor, radar detection, cameras, etc.) can be combined to detect a border of the island, thereby preventing the snow blower from being damaged or the devices of the island from being damaged.

In one embodiment, a more precise manner is that when the working area is set, the user holds the location navigation device 130 to move for a circle around the island, and such area is defined as the island i.e., the non-snow removal area after the map is generated.

Of course, the map generating manner will be different if the island setting manner is different, but the basic principle thereof is similar, or exclusion is performed when the working area is set or is performed on the generated map, no matter what kind of manner, the areas can be defined on the map, such that the snow blower selects whether to work or the working mode according to the defined areas.

F: Narrow Passage Setting

In the map of the user, some paths are relatively narrow and are smaller than the minimal passing size of the snow blower, such paths are defined as the narrow passages 350. For the narrow passages, after the initial map is generated, the controller of the snow blower will automatically calculates the narrow passages and reminds the user, the user manually sets whether the narrow paths need the snow removal or not, and generally if the snow removal is required, the user needs to guarantee that the passages have enough sizes for the snow blower to pass by, and if no working is required, then the user can set no working in such areas.

G: Setting of Working State Alarm Lamp

The snow blower is provided with an alarm lamp, and pedestrians and the user can be warned and reminded in a full bright or flickering manner. Specifically, the user can mark the alarm area or set the alarm time on the map, and the controller in the snow blower can alarm according to the setting of the user after the snow blower reaches the set area and the set time is reached or the set requirements are met at the same time.

H: Setting of Special Scenarios

There are three snow removal manners usually, snow sweeping, snow pushing and snow throwing. The setting of special scenarios here refers to that if the snow removal manner is the snow sweeping or pushing, then a snow piling point needs to be set; and if the snow removal manner is snow throwing, then a snow throwing direction needs to be set.

The snow sweeping is to clean the snow to the front of the snow blower by a rotating rolling brush, the snow pushing is to push the snow to the front of the snow blower, therefore, during snow pushing, the snow in front of the snow blower will be thicker and thicker, in order to prevent such case, the snow blower can be set to push the snow to a set position, i.e., the snow piling point, every time the snow blower pushes the snow for a certain distance. The snow throwing is to roll the snow into the snow blower by an auger and then throw out by a snow throwing cylinder, and the case that the snow is thrown to neighbor's home or the municipal facilities such as a mailbox is not allowed, then the snow throwing direction needs to be set.

Figure 29:
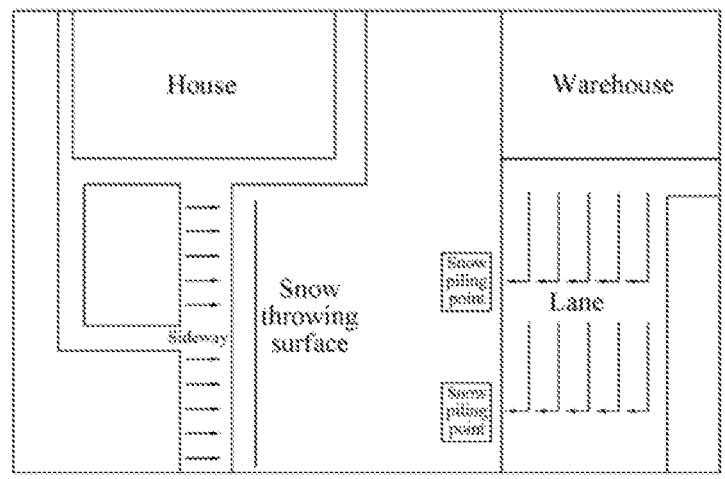
FIG. 29 is a schematic diagram of a snow removal path set according to the working area in FIG. 27.

As shown in FIG. 29, during setting, if the snow removal manner is snow sweeping or snow pushing, whether the user needs to set the snow piling point personally will be automatically reminded by the system, if yes, the user needs to set one or more snow piling points, then the snow blower will calculate the path according to a snow sweeping or snow pushing area, and if the snow piling points are too less, then user is reminded of increasing the snow piling points. If the user selects no need of setting, then the controller will calculate the path according to the snow sweeping or snow pushing area and automatically plans the snow piling points.

If the snow removal manner is snow throwing, the user needs to set the snow throwing direction, or set the snow throwing area, and the controller automatically calculates the snow throwing direction according to the snow throwing area. After the snow throwing direction is set, the path of the snow blower will be optimized according to the setting of the snow throwing direction, such that the snow blower will throw the snow to the set direction or area. If the user does set the snow throwing direction, the snow can be thrown to any direction by default, and the snow removal path will be re-optimized.

I: Working Mode Setting

The user can form different marks on the map according to the areas, for example, a motorway, a sideway, etc., different marks have different working modes, for example, the snow throwing is performed on the paths marked as the motorway, and the snow pushing or snow sweeping is performed on the sideway, or a thick snow removal mode is performed on the motorway and a thin snow removal mode is performed on the sideway; or the user can set the snow throwing or snow pushing mode.

All above setting can be performed on the operation panel of the snow blower, or can be remotely operated on mobile devices such as the mobile phone and a computer, and then operation is performed by the remote control of the snow blower per se. The communication manner between a control end and a terminal of the remote control operation can be WIFI communication, Bluetooth communication, Zigbee communication, radiofrequency communication, etc., or the communication between the control end and the terminal can be realized based on a cellular network.

After all settings are finished, the snow blower can be started to work. Next, the path planning when the snow blower is in work is explained in detail.

Figure 30:
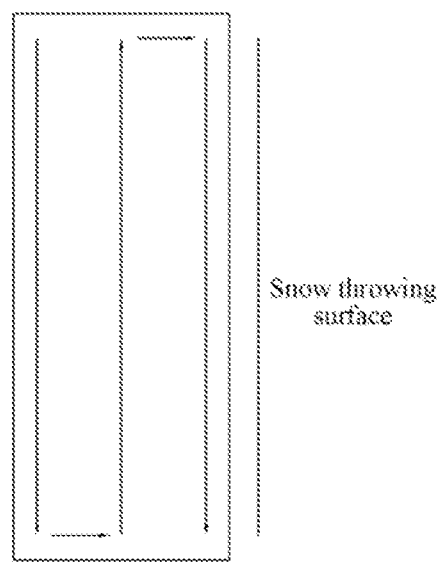
FIG. 30 is a schematic diagram of a first path of snow throwing when the snow removal mode of a snow blower is snow throwing in a preferred embodiment according to the present invention.

If the snow removal manner is different, then the moving path executed by the snow blower is also different to some extent. Specifically, when the snow removal manner is snow throwing, the snow throwing path is generally parallel with an extending direction of the road, and the snow blower moves along an S path and throws the snow out by a snow throwing cylinder. The controller in the snow blower can control the snow throwing cylinder to rotate, which can at least rotate for 360 degrees. In the snow throwing path, if the snow throwing direction is defined, that is, the snow throwing surface as shown in FIG. 30, then the snow throwing cylinder will rotate according to the moving path of the snow blower, such that a snow throwing opening of the snow throwing cylinder always throws the snow to the snow throwing surface. When the user does not define the snow throwing surface, then it is considered that the snow can be thrown to both sides of the road, and the snow throwing direction is generally vertical to the moving road surface.

Figure 31:
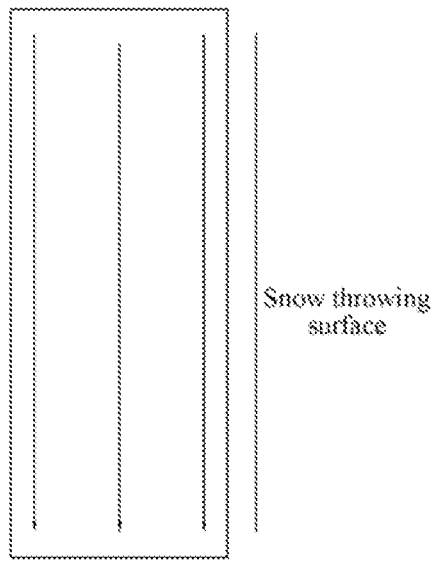
FIG. 31 is a schematic diagram of a second path of snow throwing when the snow removal mode of a snow blower is snow throwing in a preferred embodiment according to the present invention.

As shown in FIG. 31, the snow throwing path can also be that the snow blower moves along one direction and throws the snow, and is retuned back on the path which has been subjected to snow removal and only moves without snow throwing, or the snow throwing direction is not required to be adjusted. Of course, the control module needs the distance from the snow blower to the snow throwing surface to calculate the snow throwing distance, and the snow throwing distance can also be changed by adjusting a rotary speed of the snow throwing wheel.

The snow throwing cylinder throws the snow by rotation, the controller of the snow blower will recognize the rotating current, a rotary speed and the like of the motor, when the current exceeds a set threshold or the rotary speed is lower than the threshold, it is indicated that the thrown snowfall is overlarge, and the snow blower will avoid the overload of a snow throwing motor by reducing the moving speed.

After the snow blower recognizes an obstacle in the snow throwing direction, the snow throwing direction will be adjusted, and if the user defines that the snow can only be thrown to a fixed direction, then the snow throwing will be stopped.

Figure 32:
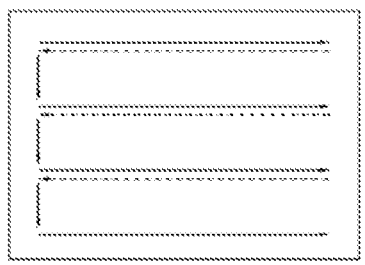
FIG. 32 is a schematic diagram of a first path of snow sweeping when the snow removal mode of a snow blower is snow sweeping in a preferred embodiment according to the present invention.

When the snow removal manner is snow sweeping, there are at least three snow sweeping paths, FIG. 32 shows the first snow sweeping path, the snow sweeping path can be vertical to an extending direction of the road, or parallel with the extending direction of the road, the solid line shows the snow sweeping path, the virtual line shows a repeating path or returning path, the first path has the characteristic of snow sweeping toward one direction and is suitable for the road of which both sides are the snow lands, but the snow can only be thrown to the lawn on one side, thereby avoiding that the snow is thrown to the lawn on the other side during snow sweeping. Since the returning path has been swept, repeated sweeping is not required, and from the moving path of the snow blower, the snow blower moves for two road sections, but actually sweeps one road section, the sweeping efficiency is general and the first path is not suitable for the occasions requiring fast snow removal.

Figure 33:
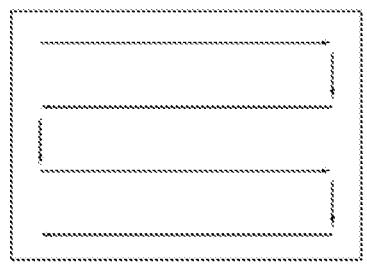
FIG. 33 is a schematic diagram of a second path of snow sweeping when the snow removal mode of a snow blower is snow sweeping in a preferred embodiment according to the present invention.

FIG. 33 shows a second snow sweeping path, the snow sweeping path is vertical to the extending direction of the road, the snow is swept to two sides, that is, the snow can be swept for all the paths where the snow blower moves, the second snow sweeping path can also be called as S path snow sweeping and is suitable for the condition that both sides of the road are lawns and the snow can be thrown to the both lawns, in addition, since the snow sweeping path is vertical to the extending direction of the road, the sweeping distance once is short, not too much snow will be accumulated in front of the snow blower, therefore, the sweeping is not required to be performed to specific snow piling points, no repeated paths exist, and the snow sweeping efficiency is higher.

Figure 34:
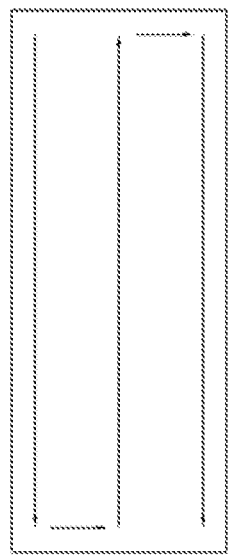
FIG. 34 is a schematic diagram of a third path of snow sweeping when the snow removal mode of a snow blower is snow sweeping in a preferred embodiment according to the present invention.

FIG. 34 shows a third snow sweeping path, the snow sweeping path is parallel with the extending direction of the road, and is also S path snow sweeping, and such snow sweeping manner has the least turning times and the relatively high in efficiency.

Figure 35:
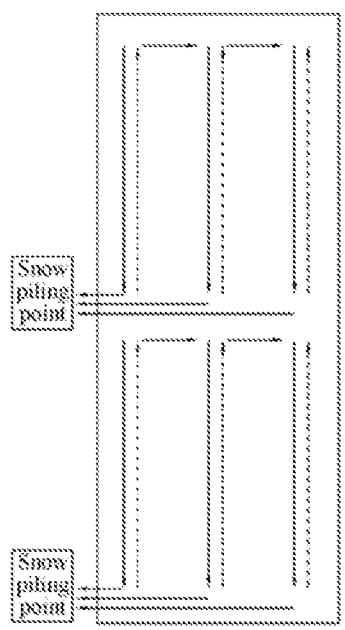
FIG. 35 is a schematic diagram of a first path of snow pushing when the snow removal mode of a snow blower is snow pushing in a preferred embodiment according to the present invention.

As shown in FIGS. 35 to 37, when the snow removal manner is the snow pushing, there are at least three snow pushing paths, FIG. 35 shows the first snow pushing path, the snow pushing path is approximately parallel with the extending direction of the road, since the snow pushing distance is longer, two snow piling points need to be set, the solid line shows the snow pushing path, the virtual line shows the repeated path or the returning path, the first path has the characteristic that the snow blower pushes the snow to the snow piling point from the first position of one direction and is then retuned, then pushes the snow to the snow piling point from the second position of such direction, and so on till the snow on the whole width of the road is cleaned, and then the snow blower pushes the snow to the next snow piling point. Such manner is suitable for the situation that the snow can only be piled to fixed places.

FIG. 36 shows the second snow pushing path, the snow pushing path is approximately vertical to the extending direction of the road, the snow blower pushes the snow to two sides respectively from the middle of the road, there are two choices, one choice is that the snow blower pushes the snow to one side, is returned to the middle and then pushes the snow to the other side, and so on; the other choice is that the snow blower pushes the snow to one side from the middle, is retuned to the middle, then continues to push the snow to such side till the tail end of the road, and then pushes the snow to the other side from the middle of the tail end, i.e., from the head to the end for half of the road and from the end to the head for the other half of the road. Such path is suitable for the situation of the wider road, and the situation that the user does not set the snow piling point and the snow can be piled to both sides of the road.

FIG. 37 shows the third snow pushing path, the snow pushing path is approximately vertical to the extending direction of the road, the snow blower pushes the snow in an S shape from one side of the road, and such manner is suitable for the situation that the once maximal snow pushing amount along the width of the road is smaller than the load of a snow pushing machine, wherein the maximal snow pushing amount can be calculated according the snow thickness, the road width and the length of a snow pushing head.

The above snow pushing paths can be automatically generated according to the map generated by the user, and the user can independently select or defaults by the controller. The defaulting manner of the controller is as follows: if the user does not set the snow piling point, then the first or second snow pushing manner can be adopted, the snow blower recognizes the width of the road surface, if the road surface is too wide and exceeds a set value, then the first snow pushing path is adopted, such that the snow cannot be excessively pushed to cause overlarge load, otherwise, the second snow pushing path is adopted. If the user sets the snow piling points, then the third snow pushing path is adopted. The number of the snow piling points is related to the length of the snow pushing path, and each snow piling point requests that the moving path cannot be too long to avoid the overlarge snow pushing load. The controller of the snow blower will calculate whether the snow piling points set by the user meet the requirements or prompt the user to set sufficient snow piling points.

If there is a ramp in the working area of the snow blower, it may be caused that the working head abuts against the road and cannot move uphill, or the snow cannot be cleaned completely downhill due to a certain distance between the working head and the ground. The state change of the snow blower in a typical ramp is described with reference to FIG. 38.

In the present embodiment, the detection module of the snow blower comprises an acceleration sensor, and the acceleration sensor is mounted in the snow blower and configured to detect a dip angle of the snow blower. Of course, a pressure sensor can also be used for measuring an altitude, and they all can be configured to generate a 3D map. The working head of the snow blower is provided with a motor, configured to drive the working head to ascend or descend relative to the ground.

When the snow blower starts to record the map, a dip angle of each point will be recorded simultaneously, as shown in A1, B1 . . . N1. When the snow blower works according to the path, it will judge whether the dip angle of the front path is overlarge or not, that is, the snow blower will judge the dip angle of the B1 point when at the point A1, the working head will be affected if the dip angle of the B1 point is overlarge, that is, if the dip angle of the B1 point is larger than a preset value, the controller will start the motor to lift the working head for certain angle in advance. The lifted angle is related to the B1 point, and the larger the dip angle is, the larger the lifted dip angle is. After the dip angle is restored to be normal, the controller starts the motor again to descend the working head.

The detection system of the snow blower according to the present embodiments further comprise an obstacle sensor, and the obstacle sensor can be an ultrasonic sensor, an infrared sensor, a laser sensor, a radar, a camera, etc. When the obstacle sensor detects the obstacle, if the working head is the snow pushing head or the snow sweeping head, then the snow pushing head or the snow sweeping head will stop working or work toward the places without the obstacle. If the working head is the snow throwing head, the snow throwing direction will be changed.

Figure 39:
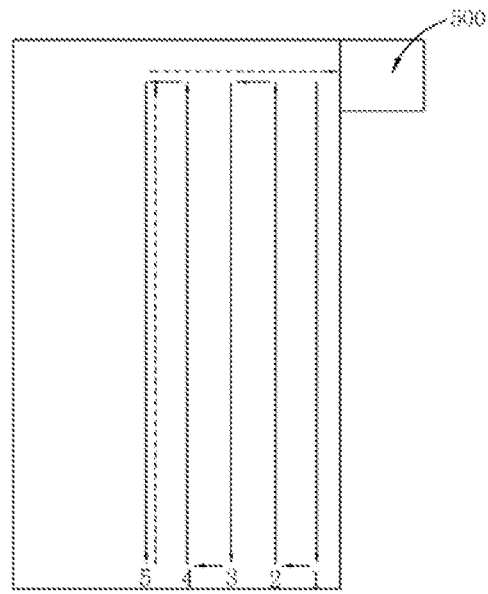
FIG. 39 is a schematic diagram of a first path that the snow blower is returned to be charged in the preferred second embodiment according to the present invention.
Figure 40:
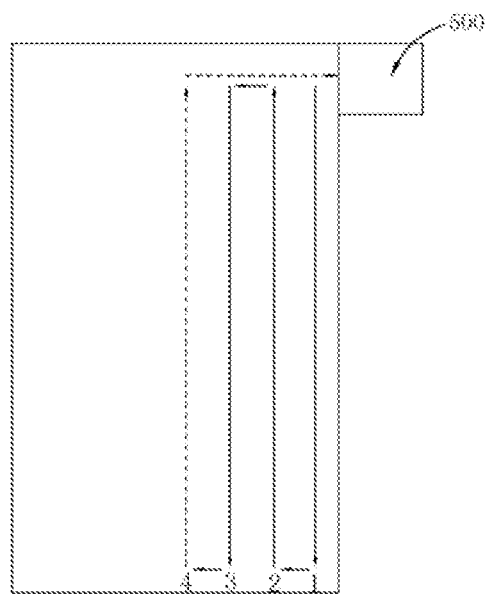
FIG. 40 is a schematic diagram of a second path that the snow blower is returned to be charged in the preferred second embodiment according to the present invention.

The snow blower according to the present embodiments can be automatically returned back to the dock for charging according to self conditions. Specifically, the controller in the snow blower can calculate the energy of the battery and the working time, when the energy of the battery is lower than a preset value or the working time is larger than the preset value, the snow blower is controlled to be returned back to the dock. The returning path of the snow blower is divided into two manners, the first manner is as shown in FIG. 39, the solid line path is the path that has been swept, and the virtual line is the returning path. The returning path has been in the swept path, therefore, the snow sweeping head does not work during returning, thereby saving returning energy. The second manner is as shown in FIG. 40, the solid line path is the path that has been swept, the virtual line is the returning path, the returning path is contained in the snow sweeping path, i.e., the snow sweeping is performed during returning.

The controller of the snow blower will automatically calculate the required working area and required energy, when the energy is enough to support the working area required by once sweeping, the second solution is adopted, when the energy is not enough, the first solution is adopted, and the benefit of adopting the second solution will save more time compared with the first solution.

There are many manners for the snow blower to return back to the dock for charging. The wireless charging manner is preferable in the present embodiment. Specifically, the dock is provided with a wireless charging emitting panel, the snow blower is provided with a wireless charging receiving panel, the wireless charging receiving panel is connected to a battery in the snow blower, and the controller realizes the connection between the wireless charging emitting panel and the wireless charging receiving panel by guiding the snow blower to move through the location navigation module.

In order to precisely guide the wireless charging receiving panel of the snow blower to be accurately flush with the wireless charging emitting panel, the detection system of the snow blower further comprises a signal detection circuit, when the snow blower moves to the dock, the wireless charging emitting panel sends a charging signal to the wireless charging receiving panel, the signal detection circuit detects whether the intensity of the charging signal received by the wireless charging receiving panel reaches the preset value, locates the position of the wireless charging receiving panel when the intensity of the detected charging signal reaches the preset value and guides the snow blower to stop moving for wireless charging. The charging signal can be a current or voltage signal, and the signal detection circuit detects whether the current or voltage generated on a charging loop by the charging signal received by the wireless charging receiving panel reaches the preset value in real time to judge whether the intensity of the charging signal reaches the preset value.

In addition, in order to prevent the condition that the charging cannot be performed since there is accumulated snow on the wireless charging emitting panel, the wireless charging emitting panel in the present embodiment is provided with sensors for detecting the snow and snow weight, and a heating system. After the snow blower is returned and the wireless charging emitting panel and the wireless charging receiving panel are jointed, the weight on the emitting panel will be detected, if the weight exceeds the threshold, the heating system will be started to melt the accumulated snow. After the weight is lower than the threshold, the snow melting is stopped.

By detecting the snow, the snow blower will automatically go out of the dock for snow removal when it snows or the snow thickness reaches the preset value, i.e., user monitoring is not required after once setting is finished. Of course, the snow blower can also receive the information such as weather report and real time weather by a network, and makes a working plan. Or, the snow blower can send the working area, a cutting solution and the like of the user's house to a cloud terminal, and the cloud terminal can optimize the sweeping solution of the snow blower according to the data such as situation, terrain and climate of the user and users around. In addition, the data of the snow blower can be interconnected with the smart home in the house by the cloud terminal, for example, after detecting the snowing, the snow blower will send the data to the cloud terminal, and the could terminal closes windows and switches on an air conditioner of the user and controls the snow blower to go out for working by the smart home. That is to say, the snow blower can serve as part of an intelligent gardening system, the intelligent gardening system is configured to inspect and control gardening devices in a gardening area, and its control center generates a control instruction based on the environment information of the gardening area collected by the sensors, and the snow blower executes the snow removal working according to the control instruction. The gardening devices such as the sensors and the snow blower and the control center intercommunicate with each other to form internet of things.

According to the snow blower in the full automatic working mode, the border map can also be generated by other manners, for example, the manner of combining a closed border line and GPS is adopted to set the working area of the snow blower.

A common method is to pave the border line on the working area, and the border line is connected to a signal generator, such that the border line can generate a signal detected by the snow blower. The snow blower judges whether it is in the working area according to the signal, and further selects the corresponding working mode.

After the user purchases the snow blower, the manufacturers will pave the border line of the working area of the snow blower where the snow removal is required according to the requirements of the user, the border line is paved by some large-scale machinery capable of slotting and sinking cords, or slotting is performed by some electric or manual tools, and then the border line is manually placed in slots.

The border line is an electrified wire, a specific border line signal exists in the wire, the border line signal is sent from the dock, and the snow blower can recognize whether the snow blower is inside or outside the border line by receiving an electromagnetic signal sent by the border line through an induction coil mounted in the snow blower.

When the map is created, the snow blower can apply the electronic compass, the speedometer and the GPS to realize automatic location and navigation, a course angle is measured by the electronic compass, then the relative coordinates of the snow blower are obtained in combination with the dead reckoning of the speedometer, then absolute location and error elimination are performed according to the GPS coordinates, and finally the coordinates of the snow blower at any moment can be obtained.

Figure 41:
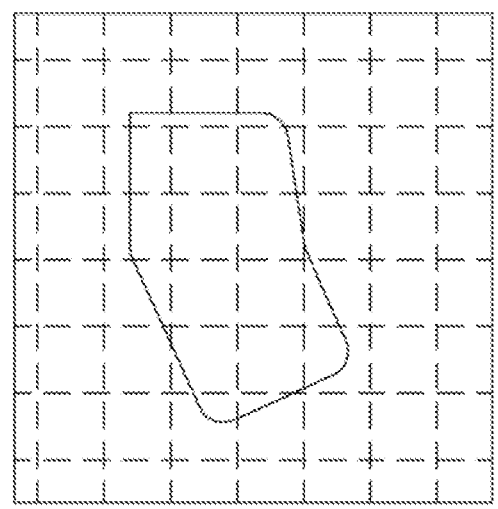
FIG. 41 is a schematic diagram of a grid map of a working area generated by the snow blower in FIG. 22 in a closed loop border line manner, wherein the map is represented with grids.
Figure 42:
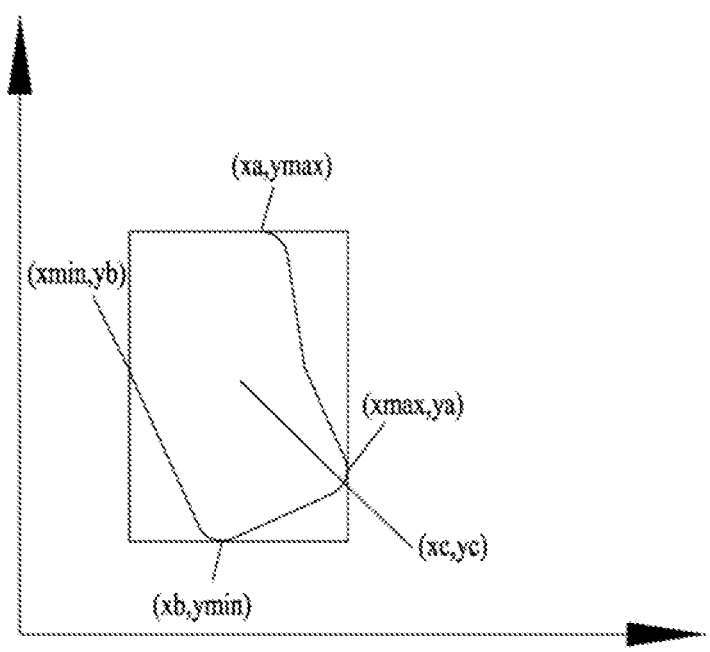
FIG. 42 is an operation diagram of the snow blower in FIG. 41 along a border, wherein the size and parameters of the map are determined in such manner.
Figure 43:
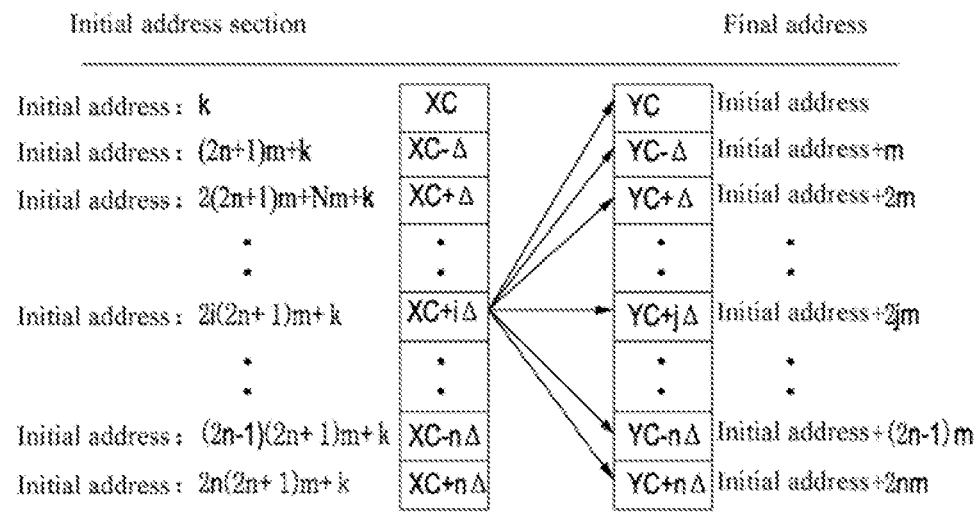
FIG. 43 is an address mapping diagram of a memory unit of the snow blower in FIG. 41, which represents a mapping relationship between map data and the memory unit.
Figure 44:
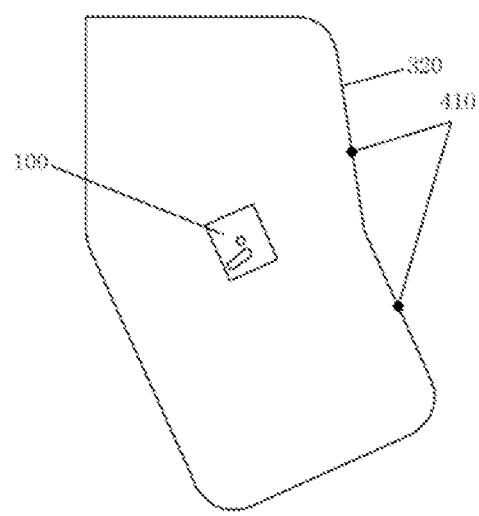
FIG. 44 is a principle schematic diagram of a working area generated by the snow blower in FIG. 22 in an ultra wide band (UWB) manner.

Referring to FIGS. 41 to 43, specifically, a preferred method for constructing and storing the map of the snow blower in the present embodiment comprises the following steps:

1) setting the coordinates of the dock as the original coordinates (x0, y0) of the snow blower, setting the initial value of a maximal value xmax and the initial value of a minimal value xmin of the x coordinate, and the initial value of a maximal value ymax and the initial value of a minimal value ymin of the y coordinate, which are xmax=x0, xmin=x0, ymax=y0 and ymin=y0 respectively in the working area when the snow blower departs from the dock;

2) causing the snow blower to depart from the dock, operate for a circle around the border line of the working area and to be returned back to the dock, and in the operation process, continuously updating the maximal value xmax and the minimal value xmin of the x coordinate, and the maximal value ymax and the minimal value ymin of the y coordinate according to the following manner: respectively comparing the coordinates (xi, yi) with the xmax, xmin, ymax and ymin updated last time at any moment i, wherein if xi<xmin, then xmin=xi, otherwise, the value of xmin is kept unchanged, if xi>xmax, then xmax=xi, otherwise, the value of the xmax is kept unchanged, if yi<ymin, then ymin=yi, otherwise, the value of ymin is kept unchanged, if yi>ymax, then ymax=yi, otherwise, the value of the ymax is kept unchanged, and the (xi, yi) are coordinates of the snow blower at the i moment;

3) according to the finally updated xmax, xmin, ymax and ymin after the snow blower is operated for a circle around the border line, determining the four coordinate points representing a maximal range of the border line, which are (xa, ymax), (xb, ymin), (xmax, ya) and (xmin, yb) respectively, wherein xa is the horizontal coordinate corresponding to the ymax, xb is the horizontal coordinate corresponding to ymin, ya is the horizontal coordinate corresponding to xmax, and yb is the horizontal coordinate corresponding to xmin;

then according to the four coordinates representing the maximal range of the border line, calculating the maximal difference value Xmax=xmax-xmin of the x coordinate and the maximal difference value Ymax=ymax-ymin of the y coordinate in the working area;

simultaneously calculating the center coordinates (xc, yc) of the working area, wherein xc=[(xmax+xmin)2], yc=[(ymax+ymin)/2];

4) calculating the parameter n representing the size of the map according to the following formula, n=[X/2Δ]+1;

wherein Δ is length side of a square grid of the map, X is the larger value between the maximal difference value Xmax of the x coordinate and the maximal difference value Ymax of the y coordinate in the maximal range of the working area, that is, when Xmax≥Ymax, then X=Xmax, and when Xmax<Ymax, X=Ymax; and 5) realizing the mapping between the map data and the address of a memory unit according to the parameter n representing the size of the map, wherein the specific method comprises storing all map grid data in the memory unit according to the format {xi, yi, map grid attribute}, wherein each piece of map grid data occupies the space size of m bytes, the map center coordinates (xc, yc) are stored in an initial address of the memory unit, the offset of the initial address and the minimal address in the map is k, k≥0, and the storage positions of other coordinates (xi, yi) are determined according to the offset of the coordinates and the minimal address solved by the following formula:

$$M(2n+1)m+Nm+k;$$

wherein M and N are determined by the following method:

$$L1=(xi-xc)/\Delta, L2=(yi-yc)/\Delta;$$

When L1>0, M=2|L1|, and when L1<0, M=2|L1|−1;
When L2>0, N=2|L2|, and when L2<0, N=2|L2|−1.

Wherein the map grid attributes in the step 5) are formed by multiple elements related to the map of the snow blower, and comprise the attributes for representing the environments in the map grids and the attributes for representing whether the snow blower passes by the map grids.

The method of the system can finish the creation and storage of the map of the snow blower, thereby realizing the automatic location navigation of the snow blower. When the map data are created, the snow blower firstly operates for a circle around the working area, calculates the data of the map border according to the coordinate values calculated by the sensors and generates a mapping relation between the map data and the address of the storage unit, then the snow blower creates internal map data within the border area and updates the map attributes in the memory. After the map coordinates are created, the snow blower operates according to the map, the snow blower reads the data of the current coordinates and of adjacent four coordinates by location, and the next action and the operation direction of the snow blower are judged according to the advancing direction and the grid properties of the adjacent coordinates, when a working voltage of the snow blower is not enough, the sown blower automatically stores the current coordinates and the navigation direction and is retuned back to the dock for charging, reads the coordinates and the navigation direction recorded last time after the charging, automatically plans the optimal path to reach the coordinate position, and then continues to work. In the method of the present invention, the snow blower creates the map data by the location navigation sensors and enables the map data and the addresses of the storage unit to be in one-one mapping, thereby conveniently storing and reading massive map data.

The map data of the snow blower in the above method are in the grid form, the map environment can be better described by using the attributes of the grid map, in view of the reason of larger data size of the grid map, when the map is created, the snow blower departs from the dock and operates around the border line, continuously calculates the current coordinates in the operation process, and obtains the four important characteristic coordinate points representing the map size after operating for one circle, which respectively comprise the two points with the maximal and minimal horizontal coordinates of the map and the two points with the maximal and minimal longitudinal coordinates of the map, then the mapping relation between the map data and the addresses of the map data is automatically created according to these four characteristic coordinate points, the map data and the memory unit are tightly combined by creating the address mapping, not only is the rapid reading and storage of the map data realized, but also the method is suitable for the maps of different sizes by adopting a parameter adjusting manner, such that the snow blower can operate under any working environment.

After the map data are created by such method, the map data have uniqueness, that is, the contents of the memory unit correspond to the coordinates of the whole environment map one to one, when the snow blower needs to call the map in the operation process, the map data can be rapidly read by only calculating the parameter in the map corresponding to the current coordinates, thereby ensuring that the snow blower has a clear understanding on the environment map.

Another manner adopted for setting the working area of the snow blower is UWB, to generate the border map.

Referring to FIGS. 44 to 48, the location system of the snow blower comprises a border 320 defining the working area of the snow blower 100, UWB labels 410 are disposed outside the working area, the outer part of the working area comprises a border line 320 and the two UWN labels 410 outside the border line 320, the location navigation module of the snow blower is a UWB location module, and the UWB location module calculates the two positions of the snow blower by the two UWB labels 410, and takes the position in the border line as the position of the snow blower.

For the above location system of the snow blower, the UWB labels are disposed outside the working area of the snow blower, the snow blower is provided with an UWB location module, the position of the snow blower in the working area can be precisely located by the UWB location, the path planning is convenient to perform, and the working efficiency of the snow blower is improved.

The UWB location module sends a UWB signal to the UWB labels 410 to wake the UWB labels 410, the UWB signal is fed back to the UWB location module after the UWB labels 410 are waked, the UWB location module sends a location UWB signal to the UWB labels 410 after receiving the fed UWB signal and starts timing, the UWB labels 410 send a location feedback signal to the UWB location module after receiving the location UWB signal, and the UWB location module stops timing after receiving the location feedback signal and calculates the position of the snow blower 100.

Figure 45:
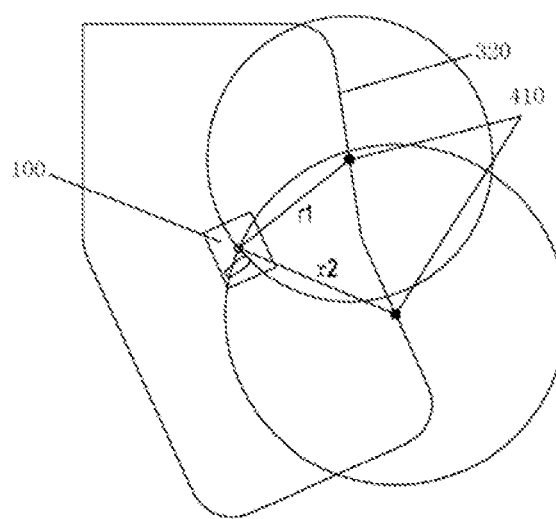
FIG. 45 is a principle schematic diagram when a UWB location system of the snow blower in FIG. 22 has two UWB labels.

Two or three UWB labels 410 can be disposed. FIG. 45 has two UWB labels 410. The outer part of the working area comprises a border line 320 and an outer part of the border line 320, two UWB labels can be disposed on the border line 320 and can also be disposed outside the border line 320, or one UWB label is disposed on the border line 320 and the other UWB label is disposed outside the border line 320. The two UWB labels 410 as shown in FIG. 45 are disposed on the border line 320. When the path planning is performed, the accurate position of the snow blower 100 needs to be located at first. In the present embodiment, when the UWB location module receives the location feedback signal and then stops timing and calculates the position of the snow blower 100, the UWB location module respectively calculates the distances r1 and r2 between the snow blower 100 and the two UWB labels 410 according to the sent location UWB signal and the time duration between the time of timing starting and the time of timing stopping, two corresponding circles are made with the calculated distances r1 and r2 between the snow blower 100 and the two UWB labels 410 as the radii, and with the positions of the corresponding UWB labels 410 as the circle centers, the positions of intersection points of the two circles are calculated, and the judged positions of the intersection points within the working area are used as the positions of the snow blower 100. The two circles have two positions of the intersection points, since the working area is fixed, it is necessary to abandon the position of the intersection point within the working area. Specifically, a border line receiver can be disposed in the snow blower 100, and the UWB location module can judge whether the position of the intersection point is in the working area according to a border line signal received by the border line receiver.

Figure 46:
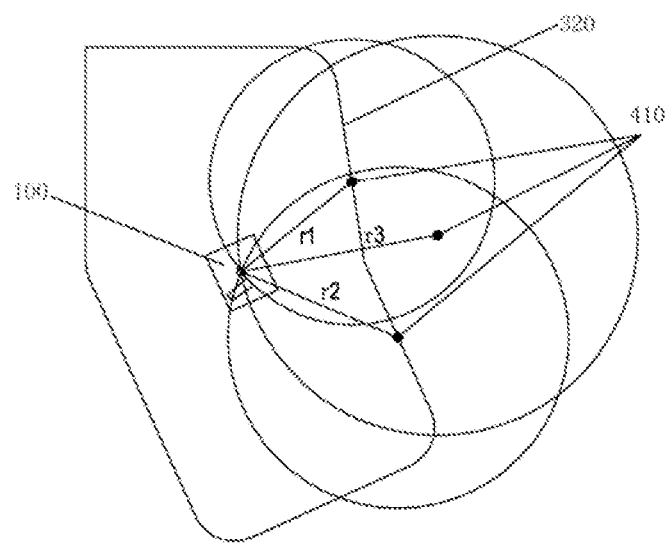
FIG. 46 is a principle schematic diagram when a UWB location system of the snow blower in FIG. 22 has three UWB labels.

FIG. 46 has three UWB labels 410 which are not on the same straight line, when the three UWB labels 410 are disposed, one, two or three of the labels can be disposed outside the border line 320. In the three UWB labels 410 as shown in FIG. 46, two UWB labels are disposed on the border line 320, and one UWB label is disposed outside the border line 320. When the path planning is performed, the accurate position of the snow blower 100 needs to be located at first. In the present embodiment, when the UWB location module receives the location feedback signal and then stops timing and calculates the position of the snow blower 100, the UWB location module respectively calculates the distances r1, r2 and r3 between the snow blower 100 and the three UWB labels 410 according to the sent location UWB signal and the time duration between the time of timing starting and the time of timing stopping, three corresponding circles are made with the calculated distances r1, r2 and r3 between the snow blower 100 and the three UWB labels 410 as the radii, and with the positions of the corresponding UWB labels 410 as the circle centers, and the calculated position of the intersection point of the three circles is used as the position of the snow blower 100. As shown in FIG. 46, the three circles have only one position of the intersection point in common, and the position of the intersection point is the position of the snow blower 100.

Respective UWB labels are respectively disposed on the border of the working area or in multiple preset positions on the lawn aside, are easier to mount and are closer to the UWB location module, which is favorable for the UWB location module to find the position per se.

Three or more than three UWB labels are mounted at least in the working area or nearby the working area. The snow blower is provided with the UWB location module per se. The UWB location module can realize self location by using the waking and distance measuring of the three or more than three UWB labels. In one embodiment, there are three UWB labels, one of the UWB labels can be disposed aside the dock and obtains electric energy from the dock, and the other two UWB labels can obtain electric energy by solar energy or other manners.

In the present embodiment, in order to conveniently wake the UWB labels 410, when the UWB location module sends the UWB signal to the UWB labels 410 to wake the UWB labels 410, the UWB signal sent by the UWB location module is a low level signal.

The above self location method for a snow blower comprises the following steps:

S101 sending the waking signal to respective UWB labels by the UWB location module, wherein the UWB location module is disposed on the snow blower and respective UWB labels are respectively disposed in multiple positions;

S102 after respective UWB labels are waked, sending a waking feedback signal to the UWB location module;

S103 after the UWB location module receives the waking feedback signal, sending a location signal to respective UWB labels, and starting timing;

S104 after respective UWB labels receive the location signal, respectively sending a location feedback signal to the UWB location module;

S105 stopping timing after the UWB location module receives the location feedback signal, and calculating the distances with respective UWB labels according to timing results; and S106 locating the position of the snow blower according to the calculated distances between the snow blower and the respective UWB labels.

The waking signal, the waking feedback signal, the location signal and the location feedback signal are all UWB signals, and rapid distance measuring is realized by using the UWB location module and the UWB labels.

In one of the embodiments, the step of sending a location signal to respective UWB labels by the UWB location module, and starting timing comprises the following step:

sending the location signal to respective UWB labels by the UWB location module, and starting timing for respective UWB labels respectively.

The step of calculating the distances with the respective UWB labels by the UWB location module according to the timing results comprises the following step:

after the UWB location module receives the location feedback signal sent by one UWB label, stopping timing for such UWB label, and calculating the distance with such UWB label according to the timing result.

The UWB location module sends the location signal to each UWB label and respectively starts timing for each UWB label; after receiving the location feedback signal sent by certain one UWB bale, the UWB location module stops the timing for such UWB label, and the UWB location module can calculate the distance with such UWB label according to the timing result specific to the certain one UWB label. Therefore, according to the timing result for each UWB label, the distances between the UWB location module and the respective UWB labels can be calculated.

In one of the embodiments, the step of calculating the distances with respective UWB labels according to the timing results comprises the following step:

calculating the distance between the UWB location module and any one UWB label according to the following formula:

$$D = c \times \frac{1}{2}(T_A - T_{replyB})$$

wherein D is the distance between the UWB location module and the UWB label, $T_A$ is the total time of the UWB location module for the UWB label from the time of timing starting to the time of timing stopping, $T_{replyB}$ is the time delayed by the UWB label from receiving the location signal to sending the location feedback signal and C is the light propagation speed.

A specific distance measuring method of the ultra wide band (i.e., UWB) comprises time of arrival (TOA), time difference of arrival (TDOA) and roundtrip time of flight (RTOF), etc., wherein the RTOF is taken as an example for explanation.

Figure 47:
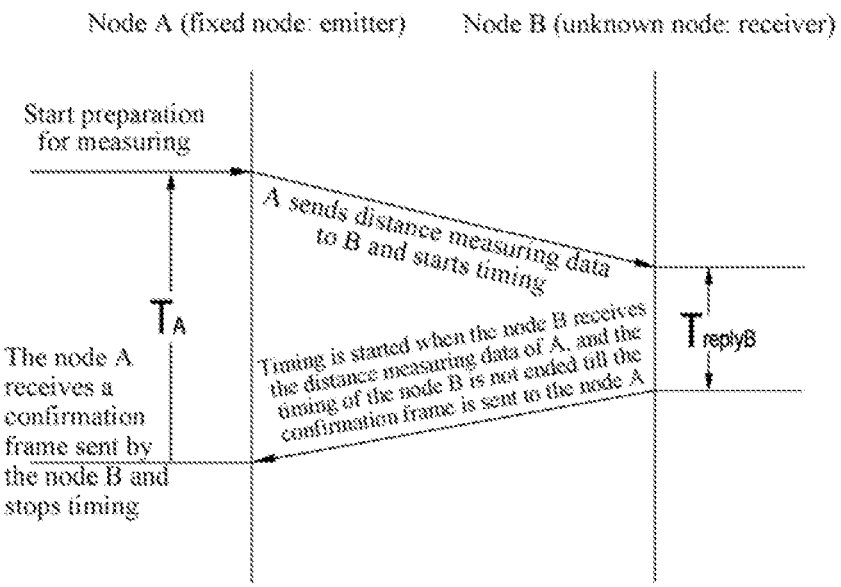
FIG. 47 is a principle schematic diagram of distance measuring of the snow blower in FIG. 22 by the UWB.

FIG. 47 is referred and is a schematic diagram of a UWB distance measuring principle.

When the snow blower starts to operate, the snow blower firstly emits the UWB signal to wake other pre-mounted UWB location labels by the UWB location module A per se, then emits the UWB signal, and starts timing. After receiving the UWB signal, other labels B feed back the UWB signal, the location module A on the snow blower stops timing when receiving the UWB signal fed by the label again, hence it can be obtained that $$T_R = \frac{1}{2}(T_A - T_{replyB})$$

Wherein, $T_R$ is the time that the signal is transmitted to B from A, $T_A$ is the total time from the time of starting timing to the time of stopping timing for the UWB label by the UWB location module, that is, the signal total time in the measuring process, and $T_{replyB}$ is the time delayed by the UWB label from receiving the location signal to sending the location feedback signal. Then the distance between the two points is:

$$D = c \times T_R = c \times \frac{1}{2}(T_A - T_{replyB})$$

Wherein c is the light propagation speed.

Figure 48:
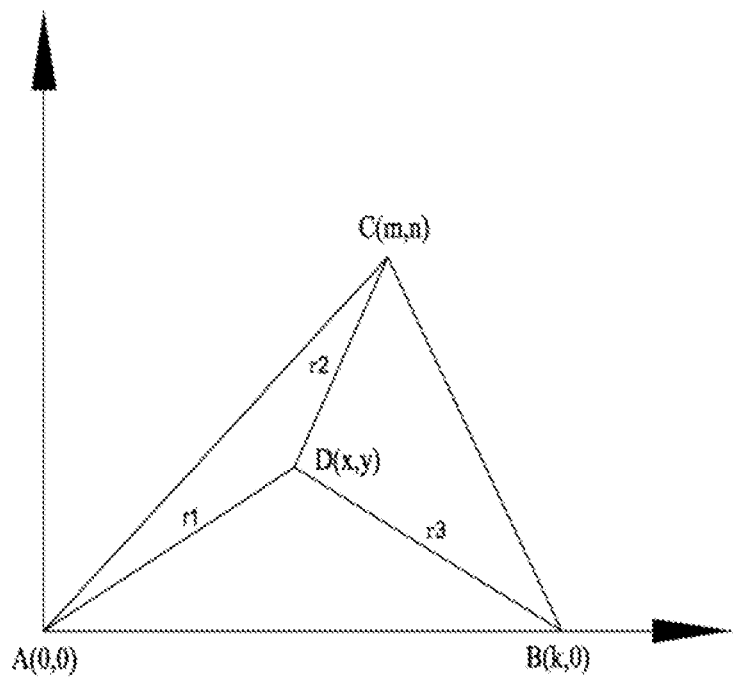
FIG. 48 is a schematic diagram of a location principle of a Trilaterate algorithm of UWB distance measuring in FIG. 22.

FIG. 48 is a referred and is a schematic diagram of a UWB location principle.

The snow blower communicates with respective UWB labels by the UWB location module per se, so as to calculate the distance with the respective UWB labels, and after the distances with three different UWB labels are at least measured, the snow blower can be located by determining the position per se through an algorithm.

In one embodiment, the Trilaterate algorithm can be adopted for location. FIG. 5 is referred and is a schematic diagram of a Trilaterate algorithm location principle.

When the snow blower and the whole set of location system are mounted, the distances between three auxiliary location devices (corresponding to the three UWB labels in the present embodiments) are measured at first, the connecting line of two of the location devices is taken as an x axis, then a mathematic model as shown in the figure can be simplified, wherein the point D(x, y) represents the UWB location device assembled on the snow blower, while A(0, 0), B(k, 0) and C(m,n) are the coordinates of the three auxiliary location points (corresponding to the three UWB labels in the present embodiments). The coordinates of the three points can be measured by the distances between the points A, B and C. While the distances between the three location devices and the point D are r1, r2 and r3 respectively, and can be measured by the UWB location device. Then the position parameters of the snow blower can be calculated according to the following formulas:

$$r1^2 = x^2 + y^2$$

$$r2^2 = (k-x)^2 + y^2$$

$$r3^2(m-x)^2 + (n-y)^2$$

Then the values of x and y are as follows:

$$x = \frac{k^2 + r1^2 - r2^2}{2k}$$

$$y = \frac{m^2 + n^2 + r1^2 - r3^2 - 2mx}{2n}$$

Therefore, the location of the snow blower is finally realized.

In one of the embodiments, after the step of locating the position of the snow blower, the method comprises the following steps:

feeding the location position information to the control module on the snow blower by the UWB location module; and controlling the snow blower to execute corresponding operation according to the location position information.

After moving respective UWB labels, the UWB location module sends the location signal to the respective UWB labels and starts timing, the respective UWB labels send the location feedback signal to the UWB location module respectively, and the UWB location module stops timing after receiving the location feedback signal. The distances with the respective labels are calculated according to the timing results, thereby locating the position of the snow blower.

The UWB location module feeds the location position information back to the control module on the snow blower, the control module performs corresponding actions according to the location position information, thereby realizing the automatic location of the snow blower and further performing path planning.

By the UWB location module disposed on the snow blower and the respective UWB labels disposed in multiple preset positions, the automatic location of the snow blower is realized and further the path planning is performed.

Another manner for setting the working area of the snow blower is to circle on an electronic map, for example, Google map.

The user loads the electronic map such as the Google map by a mobile phone, a remote control and other manners. The mobile phone or computer has a GPS or WIFI location module and the like, by which the user can rapidly find the position of own home on the map. On the Google map of the own home, the user circles one working area, and the mobile phone or the computer guides the working area into a controller of the snow blower and generates a map as shown in FIG. 41. When in work, according to the generated map, a reasonable snow removal path is processed and planned in the border of the area needing snow removal by path planning.

In addition, the location navigation function may not be adopted, the working area of the snow blower is set in a remote control extraction manner, and the working area is recognized based on a video manner.

Figure 49:
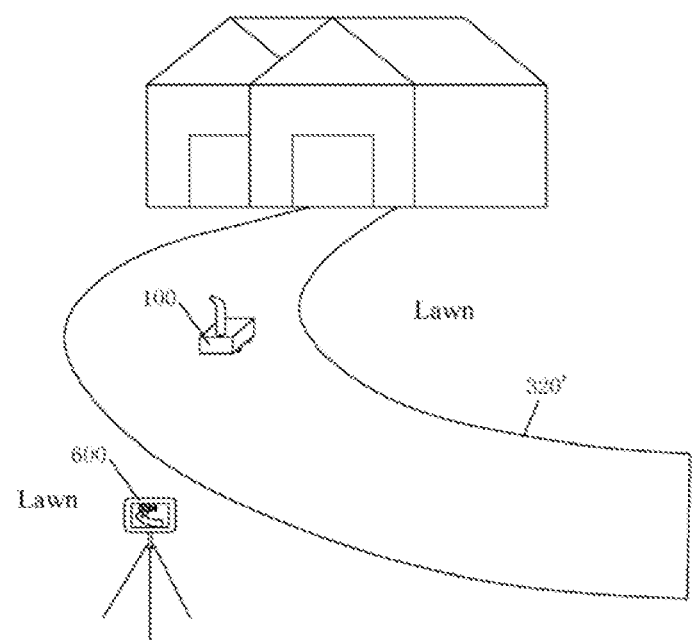
FIG. 49 is a schematic diagram of a working area map generated by a snow blower in a remote image extraction manner in a preferred third embodiment according to the present invention.
Figure 50:
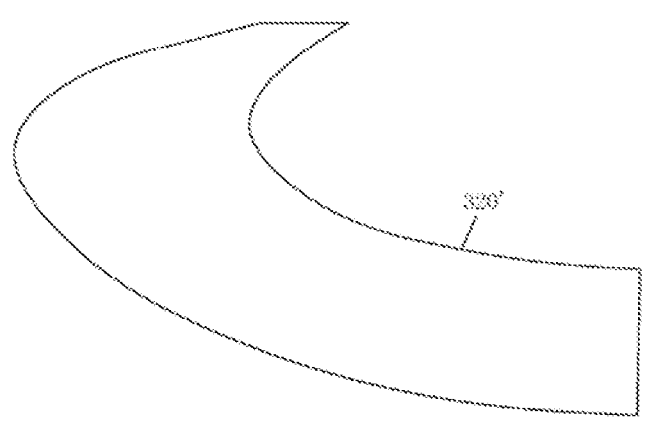
FIG. 50 is a schematic diagram of a working area map generated by the snow blower in FIG. 49.

As shown in FIGS. 49 and 50, the whole automatic snow removal system comprises the snow blower and a monitoring device 600 such as a SMARTPHONE or IPAD for monitoring a working state of the snow blower, a man-machine interaction module of the snow blower comprises a wireless communication unit, the wireless communication unit is connected to the control module and configured to receive a signal sent by the monitoring device such as the SMARTPHONE or IPAD and transmit the signal to the control module, and the control module controls a moving direction, a moving speed, the working state and the like of the snow blower 100 according to different signals. The monitoring device 600 such as the SMARTPHONE or IPAD is fixed by a support and is disposed in a place capable of shooting the whole working area, firstly, a vision field is adjusted, then the picture of the working area is shot, that is, the area is determined; then the user describes the working area on the picture of the working area, i.e., area extracting, to obtain a border line 320', and the extracted working area is as shown in FIG. 40.

When the snow blower works, the monitoring device 600 such as the SMARTPHONE or IPAD will monitor whether the snow blower is in the extracted working area in real time, that is, whether the snow blower works in the defined area, a signal is sent to the wireless communication unit if the snow blower is not in the working area, the wireless communication unit receives the signal and transmits to the control module, and the snow blower 100 is controlled by the control module to change the path.

The manner of setting the working area by the remote image is not limited to the above manner. In another embodiment, the snow blower further comprises a camera shooting/picture taking device disposed on the main body, configured to obtain an environment image and the images of close moving objects, in one embodiment, the camera shooting/picture taking device is a camera. The user can receive the image shot by the camera in real time by a mobile device such as a mobile phone, a computer and a remote control disposed on the snow blower, and remotely controls the snow blower to move and remove the snow, the controller records an advancing path, and the map is automatically generated after the recording is finished.

Figure 51:
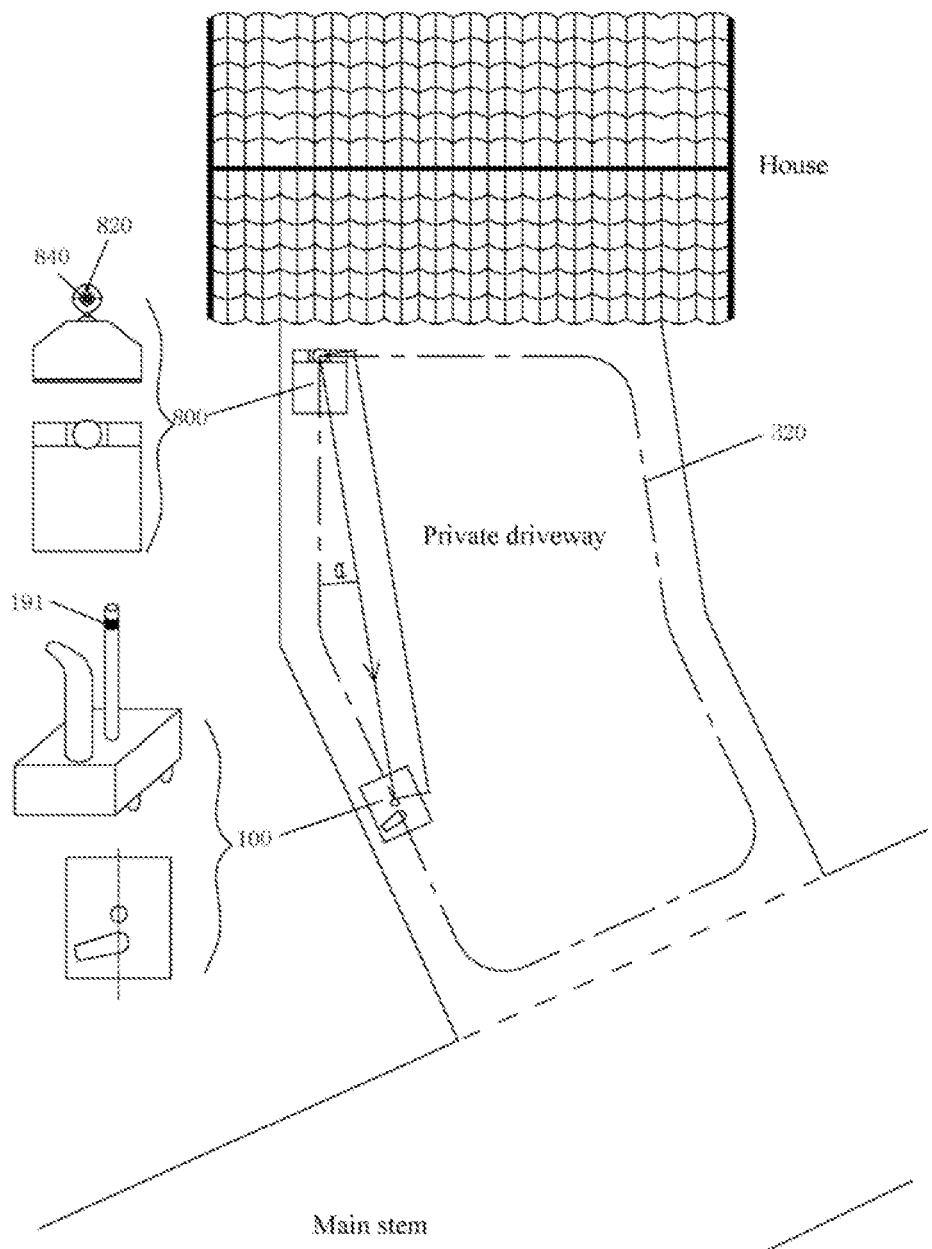
FIG. 51 is a schematic diagram that a snow blower adopts the border setting of a three-dimensional polar coordinate solution of a preferred fourth embodiment according to the present invention.
Figure 52:
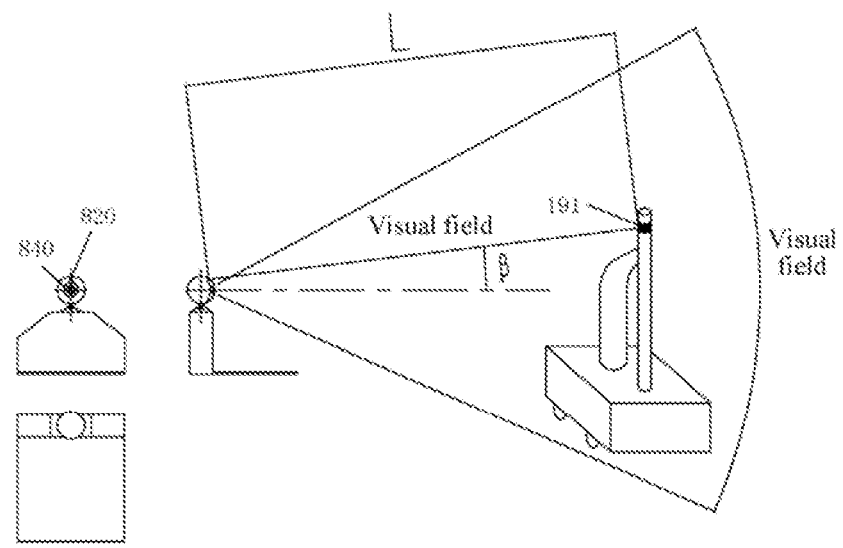
FIG. 52 is a principle diagram of laser distance measuring and angle measuring of the snow blower in FIG. 51 by the three-dimensional polar coordinate solution.
Figure 53:
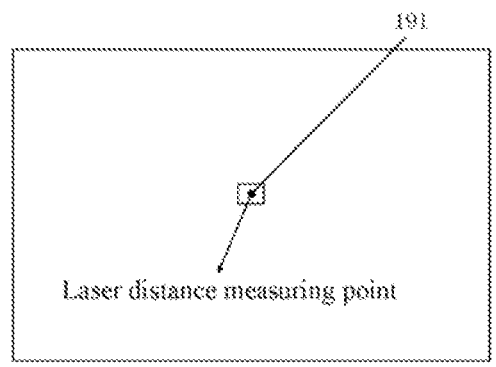
FIG. 53 is a schematic diagram of a frame image that the snow blower in FIG. 51 tracks features and marks of the snow blower by the three-dimensional polar coordinate solution.

FIGS. 51 to 53 show a preferred third embodiment of the present invention, which is a solution of border setting and path planning by a three-dimensional polar coordinate solution, i.e., a manner of image tracking, laser distance measuring and angle measuring of a machine-identified object. The snow removal system in the present embodiment comprises a snow blower 100 and a fixed site 800. The fixed site has a detection module and a site wireless communication module, wherein the detection module comprises a laser distance measuring module 820, a cloud deck camera 840 and a sensor configured to measure an angle (for example, a triaxial acceleration sensor), and correspondingly, the snow blower is provided with an obvious identified object 191 and a machine wireless communication module, wherein the cloud deck camera 840 can rotate for 360 degrees horizontally and can rotate for 180 degrees up and down, and the laser distance measuring module 820 is mounted aside the camera. The could deck is further provided with an angle sensor (not shown), the angle sensor, the camera 840 and the laser distance measuring module 820 are relatively static. The site wireless communication module on the fixed site can communicate with the snow blower. The top of the snow blower is provided with the identified object 191 having an obvious mark (for example, a specific color or specific shape, or a partially lighting object), the size of the identified object is very small relative to the snow blower, and can be conveniently subjected to image identification. The machine wireless communication module mounted on the snow blower can communicate with the fixed site. The setting manner for the working area is as follows: enabling the snow blower to be on the fixed site, and enabling the camera to face front as an original point of the three-dimensional polar coordinates; remotely controlling or hand-pushing the snow blower for a circle along the border to be swept, and ensuring that no people or other objects shield the snow blower from identifying the identified object in the advancing process; adjusting the camera on the fixed site in such process, such that the image of the identified object and a light spot of the laser distance measuring module of the snow blower are aligned with a central area of the image of the identified object, at this point, recording the laser distance measuring distance L, and a planar offset angle α and a vertical angle β of the camera, thereby obtaining the three-dimensional polar coordinates of the snow blower in such position. A continuous border track can be obtained by multipoint sampling to form a closed border.

The GNSS needs well receiving of a satellite signal to work reliably. However, the satellite signal is blocked by a building, a roof, a sunshade, leaves or a tree sometimes. In order to improve the accuracy of a receiver or signal station of a GNSS system, a target receiver can be used in short distance, which is so-called differential GNSS. There are some differential technologies, for example, the typical DGPS (or GPS), RTK and wide range RTK (WARTK). However, the signal from one signal may also be stopped, for example, the case that the garden or other working areas are just around the house.

In addition, other position determining devices also have the similar problem, for example, when an optical beacon is used, the sight may be blocked in certain areas. If the snow blower cannot correctly receive the signal from the position determining system, it will face a challenge, and cannot be correctly navigated in the working area and the coverage of the working area may not achieve the expected effect.

In such cases, the snow blower may also adopt an inertia navigation system per se for navigation work, but according to the working principle of an inertia navigation system (the working principle of the inertia navigation is that based on the Newtonian mechanics laws, the accelerated speed of a carrier in an inertia reference system is measured and is integrated subject to integration to time, and it is converted into a navigation coordinate system to obtain the information such as a speed, a yaw angle and a position in the inertia navigation system). It can be known that the inertia navigation system belongs to a calculation navigation manner, and the precision must be reduced along with time, which is not favorable for the long term work of the snow blower.

Therefore, in view of the situation that the snow blower may not receive the reliable and accurate signal and some problems in the inertia navigation system, some solutions are put forward in the following, such that even when the signal is weak, the snow blower can still reliably work for long time.

The working area has no border line, for example, the position kept in the working area by using the location system (for example, GNSS), and the working area is defined by coordinates.

The snow blower is provided with a position determining device, for example, a GNSS device. In one embodiment, the GNSS device is a GPS device. The GNSS is connected to the controller, such that the controller can determine the current position of the snow blower and controls the movement of the snow blower with the GNSS device based on the current position. In other implementable embodiments, the position determining device comprises an optical (laser) position detection device, other wireless frequency position detection devices, a UWB signal station, a receiver, etc. The snow blower is further provided with at least one sensor, configured to provide a signal for dead reckoning. Such dead reckoning navigation sensor can be a speedometer, an accelerator, a gyroscope, an electromagnetic compass, a magnetometer, a compass, etc.

Figure 54:
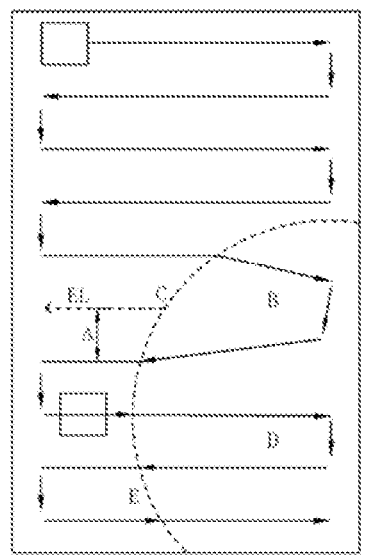
FIG. 54 is a schematic diagram of a first solution to poor receiving of a satellite signal of a snow blower in a preferred embodiment according to the present invention.

FIG. 54 shows a working area formed by the border line or coordinates, and the snow blower works in the working area. The working area comprises two parts, the first part is an area covered by GNSS navigation, i.e., a GNSS navigation area; and the second part is the area not covered by the GNSS navigation, that is, other interruption areas of which the satellite signal is shielded by the building, the roof, the sunshade, the tree or other plants or the satellite signal is relatively weak. The snow blower 100 is configured to work by using the GNSS device. One of the aforesaid snow removal modes is taken as an example for explanation.

As long as the GNSS device of the snow blower can receive the enough and reliable signals of the satellite or the signal station, the controller can determine that the received signal is reliable, and responds to execute the determined working mode. When the GNSS device of the snow blower cannot receive the reliable satellite signal, the controller executes the operation of continuously using another navigation system, or determines an alternative snow removal mode, that is, the location detection mode is not required.

When the snow blower detects that one reliable position cannot be determined, the dead reckoning navigation is switched, the calculation work is derived, and the final known position and direction are adopted as the current position and an assumed direction, for example, the current position is determined by measuring the amount of rotating wheels (or, the rotary speed and time of a rotary shaft). Of course, the deriving technologies for calculation also comprise relative navigation of other manners, for example, a visual/optical navigation system, SLAM, fingerprint fusion, and the like.

As shown in FIG. 54, it can seen that the generated operation mode B may be different from the GNSS-based operation mode, due to the error of the sensor device, the compass or speedometer is configured for dead reckoning navigation. In order to avoid or reduce these errors, the controller calibrates the dead reckoning navigation sensor when the snow blower can reliably receive the GNSS signal. The controller detects the derived calculation navigation error and the calculation navigation sensor derived in response to the error calibration. The controller determines no navigation errors based on the difference between the current position and the expected position by comparing the current position and the expected position.

FIG. 54 takes the parallel lines as an example of the path of the snow blower in the working area, the snow blower moves in the working area under guiding of the signal received by the GNSS device, and the moving parallel lines are equal in length. The snow blower enters the interruption area, the controller switches to dead reckoning navigation, and the snow removal paths B generated thereby are almost parallel lines. However, according to the angle between the moving lines and the driving distances (i.e., the size of the interruption area), the snow blower reenters the GNSS navigation area, in other words, when the reliable signal is received again, the current position and the expected position are compared. The C point is the position where the snow blower reenters the GNSS navigation area, and at this point, the snow blower reenters the GNSS navigation area to determine the distance A between the current position and the expected position. The expected position is determined according to the time that the snow blower loses the GNSS navigation, a moving average speed and snow removal work parameters (or operation mode).

If the error Δ calculated by the controller is negligible, the controller causes the dead reckoning navigation sensor to calibrate. Of course, the controller can also determine the calibration of the dead reckoning navigation sensor based on other navigation parameters. The navigation parameter is not limited to the above position, and can also be a driving direction, a speed, an accelerated speed, an inclined angle, etc. For example, the snow blower is returned back to the GNSS navigation area, it may determine the current speed according to the position determining device, compares the current speed with the speed calculated by the dead reckoning navigation module, determines whether the error can be neglected or not and performs corresponding adjustment.

The sensor can be continuously calibrated by the controller. In general cases, the error cannot be neglected as long as the error can be detected. If the errors are negligible errors, then the adjustment ratio is correspondingly adjusted. The adjustment can be executed by the user or the controller/operator or a designer of the snow blower.

If the snow blower reenters the interruption area later, the dead reckoning navigation sensor will calibrate the snow removal path generated thereby, for example the position D in the figure, more similar to the snow removal path under the GNSS navigation. As the snow blower is returned back to the GNSS area, for example, the position E in the figure, the snow blower will approach to the expected position.

In another embodiment, the snow blower can correct its position and/or direction according to the detected error Δ. Here the correction can be that the snow blower is driven along the expected moving path, for example the referring line EL in the figure, and is returned back to the expected position in the snow removal path. Therefore, the influence of the error dead reckoning navigation sensor of the snow blower on the errors of the dead reckoning navigation can be reduced minimally.

In the foregoing, even through some parts in the working area cannot receive the reliable GNSS signal, the snow blower can still execute and finish the work according to requirements.

In the present embodiment, the satellite signal can be a navigation location signal such as a GPS signal or Beidou navigation signal.

In the foregoing two preferred embodiments, the working module can also comprise one or more of a working head mechanism such as a snow sweeping mechanism 120 and a snow pushing mechanism 160, and working motors driving these mechanisms to work, and may also comprise a snow sweeping/pushing height adjusting mechanism. The working head mechanism can be replaced according to needs, or automatically replaced. By taking manual replacing as an example, the snow blower 300 comprises a host 110 and one or more of the snow removal mechanism 120, a snow throwing mechanism 140 and the snow pushing mechanism 160 which are detachably matched with the host 110, the host 110 of the snow blower 200 is provided with different working head mechanisms to correspondingly execute the working modes, that is, if the host 110 is provided with the snow removal mechanism 120, correspondingly, the snow blower 100 executes the snow sweeping mechanism; if the host 110 is provided with the snow throwing mechanism 140, correspondingly, the snow blower 100 executes the snow throwing mechanism; and if the host 110 is provided with the snow pushing mechanism 160, correspondingly, the snow blower 100 executes the snow pushing mechanism. Different snow removal modes correspond to different working conditions, for example, the snow sweeping corresponds to a thin snow condition, the snow pushing corresponds to a moderate or thick snow condition, the snow throwing is suitable for the snow of various thicknesses, in one embodiment, the snow throwing is suitable for the moderate or thick snow condition.

Figure 55:
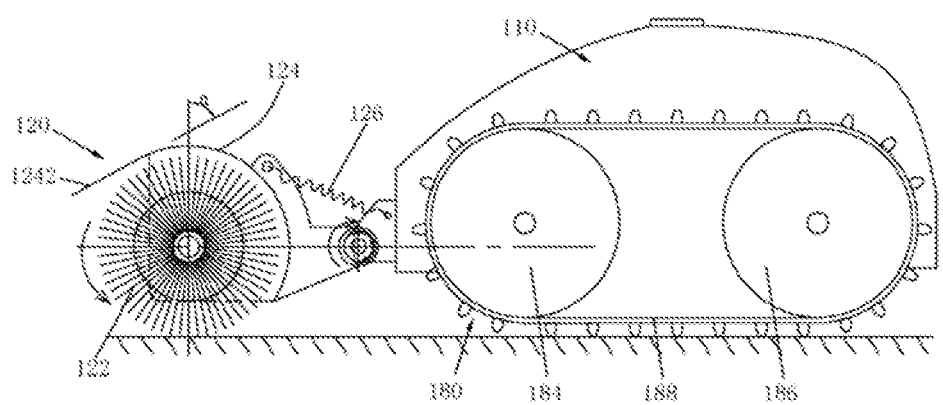
FIG. 55 is a front view that a snow blower is provided with a snow sweeping working head in a preferred embodiment according to the present invention.

In the foregoing embodiments, the snow throwing machine is taken as an example for explanation, of course, those skilled in the art can perform simple replacement, the foregoing embodiment can also be a snow sweeper or snow pusher, that is, other modules can be referred as long as the corresponding working heads are different. The specific working head is as shown in FIG. 55, the working head mechanism is a snow sweeping mechanism, the snow sweeping mechanism 120 comprises a rolling brush 122, a protective cover 124 mounted on the periphery of the rolling brush 122 and a working motor driving the rolling brush 122 to rotate (not shown in the figure), and the rolling brush 122 rotates at high speed along with the advancing of the snow blower 100, thereby sweeping the snow to the front of the snow blower 100. The working motor can drive the rolling brush to rotate by some common transmission mechanisms, such as a conical gear mechanism and a turbine worm mechanism. The rotary speed of the rolling brush 122 is smaller than 1000 r/m, in one embodiment, the rotary speed is smaller than r/m. The material of the rolling brush is mostly nylon and can also be a nonmetal material such as plastic, rubber and a wool fabric to prevent the injury to people during mistake collision. The rotary direction of the rolling brush 122 can be the clockwise direction or the counterclockwise direction, and if the rotary direction is different, the snow throwing direction and distance will be different to some extent. As shown by an arrow direction in FIG. 55, the rolling brush 122 rotating at the high speed carries the snow to be thrown out from the upper side of the rolling brush, and if along an opposite direction of the arrow, the snow will be thrown out from the lower side of the rolling brush 122. In order for greater safety of snow throwing, the protective cover 124 extends for a distance to the front part of the rolling brush along a tangential direction to form a protective plate 1242, which can guide the snow rotated along with the rolling brush 124 to be thrown out to the lower side. In one embodiment, a snow throwing angle α of the protective plate 1242 relative to the vertical direction is between 20°-70°, which not only prevents the snow from being blocked in the protective cover 124 but also ensures the snow throwing safety without affecting the snow sweeping efficiency. Of course, in order to obtain the optimal snow throwing efficiency, the snow throwing angle is better between 45° to 65°. In addition, in order to prevent the large vibration of the snow blower in the advancing, a damping mechanism 126 can be disposed between the snow removal working head of the snow removal mechanism type and the host 110, specifically, the damping spring 126 can be a damping spring, one end of the spring is connected on the protective cover 124, the other end is connected on the host 110, the structure is simple and the mounting is convenient.

Figure 56:
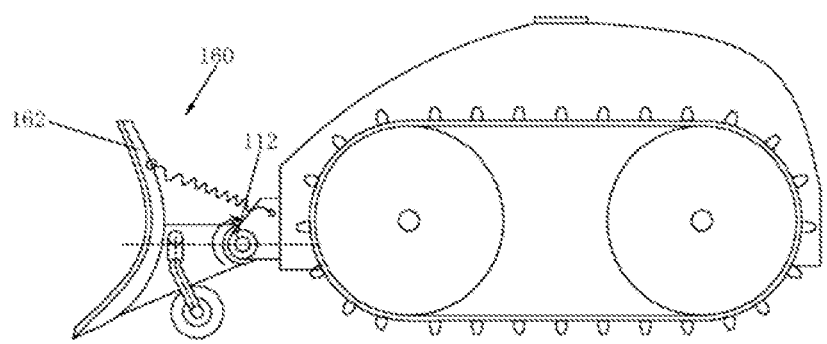
FIG. 56 is a front view that a snow blower is provided with a snow pushing working head in a preferred embodiment according to the present invention.
Figure 57:
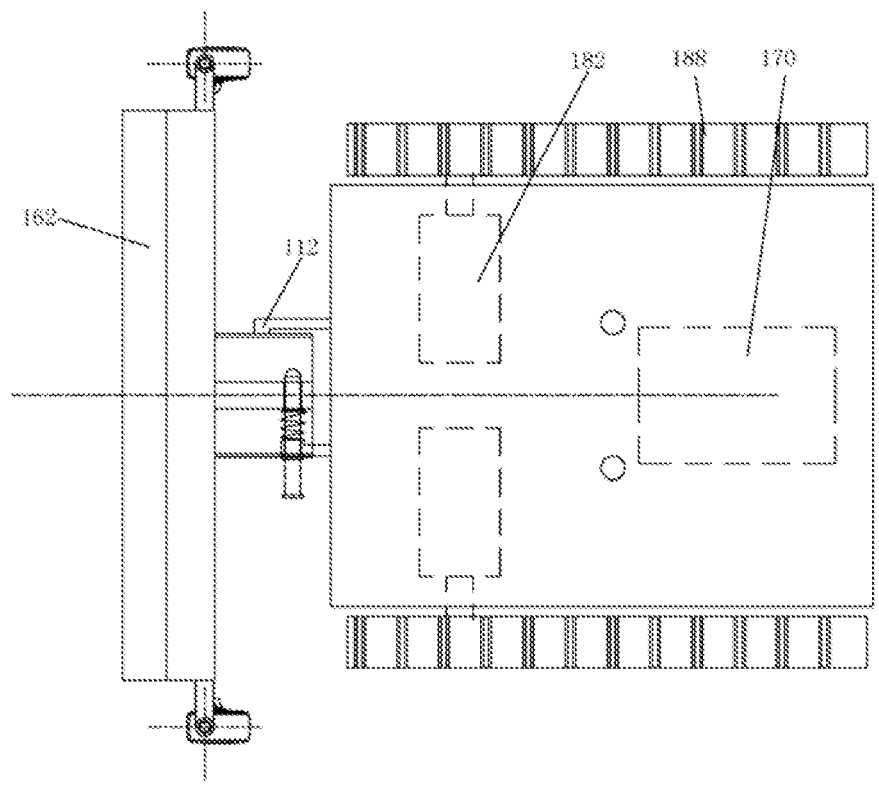
FIG. 57 is a top view of the snow blower in FIG. 56.

As shown in FIGS. 56 and 57, the snow pushing mechanism 160 comprises a snow pushing shovel 162, which is approximately inward concave, one end of the snow pushing shovel is abutted against the ground and pushes the snow to a fixed place with the advancing of the snow blower 100, and the height of the snow pushing shovel 162 relative to the ground can be adjusted according to different conditions.

The foregoing three working head mechanisms can all be detachably mounted on the host 110 of the snow blower 100. Specifically, referring to FIG. 57, a connecting part 112 is disposed on one side of the host 110, the connecting part 112 is provided with a power supply interface, correspondingly, the snow removal mechanism 120 and the snow throwing mechanism 140 have corresponding power supply interfaces, while the snow pushing mechanism 160 needs no power supply and does not need to be provided with the power supply interface, therefore, the electric connection with the host can be realized by connecting the snow removal mechanism 120 and the snow throwing mechanism 140 to the connecting part 112, and its working motor is powered by an energy module in the host. In one embodiment, the three working head mechanisms, i.e., the snow removal mechanism 120, the snow throwing mechanism 140 and the snow pushing mechanism 160 are in pivoting connection with the host 110, are connected by dowels or bolts and can pivot relative to the host 110.

Figure 58:
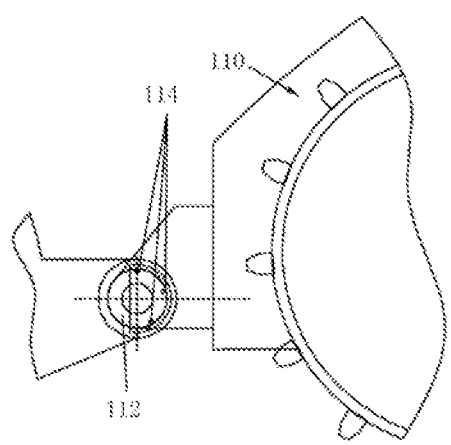
FIG. 58 is a schematic diagram of an automatic recognizing working head of a snow blower in a preferred embodiment according to the present invention.

According to different working head mechanisms, the snow blower also has a function of automatically recognizing the working head, as shown in FIG. 58, the connecting parts between the three working head mechanisms and the host are respectively provided with recognizing devices in different positions, the recognizing devices can be constructed as magnets, or triggering switches or communication interfaces, etc., different working head mechanisms are connected to the host to generate different signals which are fed back to the control module, the control module judges the forms of the working heads according to the received different signals and automatically executes the control manners corresponding to the working heads, for example, adjusting a motor rotary speed, a moving speed, etc. By taking the signal switches as an example, the connecting part 112 of the host is provided with three signal switches 114, the connecting part between the snow removal mechanism 120 and the host can trigger the first signal switch, the connecting part between the snow throwing mechanism 140 and the host can trigger the second signal switch, the connecting part between the snow pushing mechanism 160 and the host can trigger the third signal switch, according to the different triggered signal switches, the control module executes the control mode corresponding to the received triggering signal. According to the present invention, in one embodiment, the snow blower is provided with three working head mechanisms, and at least two signal switches can be disposed to realize the recognition of the three working heads. Of course, more working heads can be configured according to the needs, and correspondingly, multiple signal switches are disposed to recognize different working heads. In addition, the manner of a communication mode can also be used, that is, a PCB is disposed in the working head and can communicate with a main control part, and can notice the main control working head of the type of the module in a communication manner.

Figure 59:
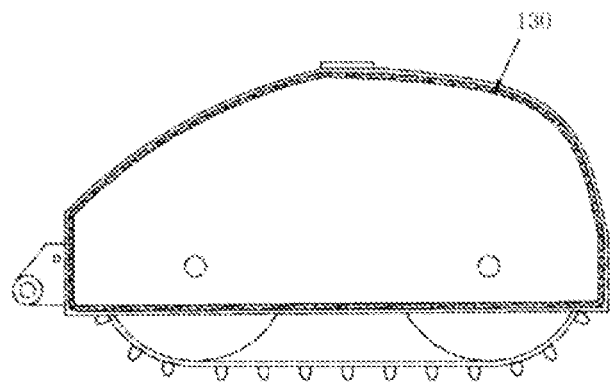
FIG. 59 is a schematic diagram of a thermal insulation solution of a host of a snow blower in a preferred embodiment according to the present invention.

In order to cause respective modules in the host and related parts to not be affected in the temperature of a low temperature environment of ice and snow and keep higher operation efficiency, some modules and related parts in the host need to be kept within an ideal temperature range. As shown in FIG. 59, in the present embodiment, in one embodiment, all or part of the housing of the host is covered by an electric heating thermal insulation material 130, for example, a solid electric heating cake filled with heat preservation cotton (for example, asbestos, etc.), and the thermal insulation working principle is that a dual-temperature control electric heating energy storage structure is used to gradually release the heat energy. An automatic overheating protective device and an automatic thermal insulation indication device, a small electric furnace controlled by a PTC thermosensitive resistor switch are disposed internally, the PTC is the thermister of a positive temperature coefficient, when the current passes, the thermister will emit heat (the heat of the electric furnace is also conducted thereto), when the temperature reaches a certain value, the thermister is increased severely in resistance and can be regarded as disconnection, at this point, the consumption of the electric energy is stopped, then the slow heat release is realized depending on the thermal insulation of the heat preservation cotton, and the thermal insulation time is long. In this way, the snow blower can be heated only during charging and then the host is subjected to thermal insulation by the electric heating thermal insulation material, thereby preventing the elements and parts such as a battery and the controller from working under the low temperature state.

The electric heating thermal insulation material 130 can also be liquid, an electrode heating method is adopted, and double temperature control security of high quality temperature control and a thermal fuse is adopted. The temperature controller will automatically cut off the circuit when the liquid temperature reaches 65 degrees in a normal case, heating is stopped, and the temperature of the heat by contact of chemical substances therein is about 40° C. A liquid energy storage heating agent is used, the heating temperature rise is fast, the liquid is added once and can be used permanently, and the advantages of long service life and durable temperature preservation are realized. In addition, the function of a lithium battery can be used, an internal heating piece heats, and the temperature can reach about 50° C.

Figure 60:
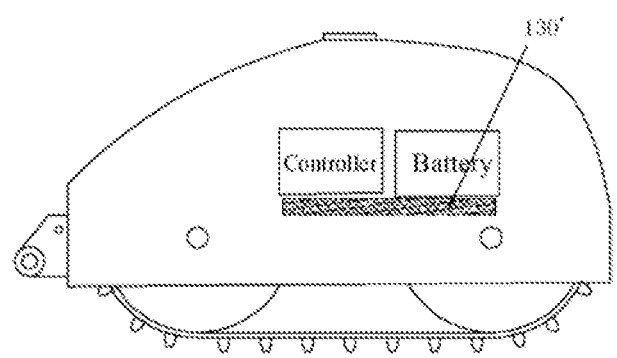
FIG. 60 is a schematic diagram of a thermal insulation solution for important modules in a host of a snow blower in a preferred embodiment according to the present invention.

The above electric heating thermal insulation material 130 is disposed on the host housing, can coat the outer part of the host housing, can also be located in the host housing, is constructed according to a shape of the host housing, and is mounted together with the host housing. In another embodiment, as shown in FIG. 60, the electric heating thermal insulation material 130' is disposed by only being close to the battery and the controller, the controller is the core part of the whole snow blower, while the discharging or charging of the battery under the low temperature should be avoided, therefore, at least a battery box controller should be subject to temperature preservation. The electric heating thermal insulation material is better disposed on the bottom of the battery and the controller to be favorable for preserving the temperature from bottom to top.

As mentioned above, when the snow blower is an automatic snow throwing machine, the snow on the ground is collected into the snow throwing mechanism by the snow scraping component and then thrown outwards. In the process that the snow scraping component collects the accumulated snow on the ground, the snow and inclusions in the snow will be collected. In the process of throwing the snow outwards, the snow and the inclusions are thrown out together. When the energy of thrown objects (including the snow and the inclusions) are overhigh, people or objects nearby will be damaged by crashing. In order to avoid such accidents, the present embodiments provides three solutions. The first solution is to dispose an obstacle sensing component such as an obstacle detection device on the snow throwing machine, and the control module controls the snow throwing component 144 to throw the snow to the area without people or objects or stop snow throwing according to a signal transmitted by the obstacle sensing component. The second solution is to control the energy of the thrown objects, such that the energy is within a safe energy range, thereby thoroughly avoiding the injury to people or the damage to the objects located nearby. The third solution is to apply the first solution and the second solution to the snow throwing machine at the same time. The second solution is introduced emphatically.

The reason that the thrown objects cause injury to the people or the damage to the objects nearby the snow blower is that when the thrown objects make contact with the people or objects, they have certain speed and certain mass, i.e., have certain momentum. In combination with the research on the people and objects, the injury to the people or the damage to the objects cannot be avoided till the momentum is lower than 0.041 kg·m/s. The two factors, which affect the momentum, including the mass M and the speed V during the contact with the people or objects are analyzed in the following.

In view of the mass M, when high density inclusions such as stones and steel balls are included in the snow, these inclusions have larger mass and correspondingly have larger momentum, and cause heavier injury to the people or damage to the objects. Therefore, the research should be focused on the weights of the large-mass objects which are possibly included in the accumulate snow and possibly thrown out by the snow blower. According to the research on the ground situation and the research on the structure of the snow blower, the inclusions that are possibly included in the accumulated snow to enter the snow blower and are thrown out have the weight of about 0.001 kg. The typical situation is the steel balls with the diameter being about 6.35 mm. According to the momentum formula: I=M×V, the speed V of the inclusions cannot be higher than 41 m/s.

In view of the speed V, the V of the thrown objects when in contact with the people or objects depends on the following factors: 1) the initial speed V0 when the thrown objects depart from the snow throwing mechanism; 2) the distance D that the thrown objects span after the thrown objects depart from the snow throwing mechanism and reach the people or objects nearby; and 3) the speed attenuation V generated by overcoming the dead gravity and air resistance in the process that the thrown objects span for the distance D. On such basis, the speed V when the thrown objects make contact with the people or objects nearby is equal to V0−V'. Therefore, in order to avoid the crashing injury to the people or the damage to the objects, V0−V' is smaller than or equal to 41 m/s. In order to meet such requirement, the means that can be adopted comprise changing any one of V0 or V'. In the following, the means of changing V0 and V is introduced in combination with the factors affecting V0 and V'.

In view of V', it is related to the distance D for the thrown objects to span to reach the people or objects. The larger the distance D is, the larger speed attenuation generated by overcoming the air resistance and the dead gravity is, and the larger V is; on the contrary, the smaller the distance D is, the smaller V is. According to the research of the present embodiment, in the near distance, the positions where there are the people or objects most likely are the positions away form the outer edge of the machine body of the snow blower for 750 mm±50 mm. If it is guaranteed that the people or objects cannot be injured by crashing in the positions with the distances of D=750 mm±50 mm, then it can be basically ensured that the people or objects nearby the snow blower are not injured or damaged by crashing. This is because the probability that the people or objects are within the closer distance is small, and there are other manners for protecting the people or objects from being injured by the thrown objects. The speed attenuation V is larger for the further distance, the speed when the thrown objects reach the people or objects is smaller, and the situation of being crashed by the thrown objects will not happen. Since the distance D is between 700 mm-800 mm, the number is very small, then the speed attenuation V of the thrown objects generated by the gravity and the air resistance within such distance can be neglected. That is, it is considered that V'≅0. On such basis, V0≤41 m/s, that is, the speed of the thrown objects departing from the snow throwing mechanism is smaller than or equal to 41 m/s.

In view of V0, V0 is related to a working speed of the snow throwing mechanism. In the case of insufficient power of the snow throwing mechanism, V0 is smaller than the working speed of the snow throwing mechanism. In the case of large enough power of the snow throwing mechanism, the initial speed V0 is same as the working speed of the snow throwing mechanism. The snow throwing mechanism comprises a power component and a snow throwing guiding component, the power component collects the accumulated snow and the inclusions therein on the ground into the snow throwing mechanism, which are thrown to a direction guided by the snow throwing guiding component after passing by the snow throwing guiding component. The snow throwing guiding component adjusts the throwing direction of the thrown objects. The snow throwing guiding component can be a guiding cylinder such as a snow throwing cylinder and can also be a guiding plate and various guiding components for guiding and changing the snow throwing direction. Since the stroke of the thrown objects on the snow throwing guiding component is short, the attenuation on the speed of the thrown objects can be neglected. Therefore, the initial speed V0 of the thrown objects is approximately equal to the working speed of the power component. The power component can comprise one level or multilevel power. In the case that the snow throwing mechanism only comprises one level power, the initial speed 0 is basically equal to the working speed of a first level power part, and under such situation, the working speed V1 of the first level power part is smaller than or equal to 41 m/s. In the case that the snow throwing mechanism comprises two-level power, the initial speed V0 is basically equal to the working speed of a second level power part, at this point, the working speed V2 of the second level power part is smaller than or equal to 41 m/s. Correspondingly, the working speed of the first level power part is smaller. The power component can further comprise multilevel power, and the initial speed of the thrown objects is approximately equal to the working speed of the final level power part of the power component. No matter the power component comprises how much levels of power component, the first level power part is usually the snow scraping component. In the present embodiment, the snow throwing mechanism only comprising one level power is taken as an example for explaining the structural design of the snow scraping component.

The snow scraping component can be a cylindrical spiral snow collecting wheel, can also be a cylindrical snow sweeping rolling brush, and can also be any other shapes, for example, the shape of a shovel. When the snow scraping component is cylindrical, it rotatably collects the accumulated snow on the ground into the snow throwing mechanism around the central axial line and further throws the snow out. When the snow scraping component is in other shapes, it movably collects the accumulated snow on the ground into the snow throwing mechanism by a lever or connecting rod and further throws the snow out. In the present embodiment, the snow scraping component is cylindrical, its working speed is the maximal linear speed of the snow scraping component, that is, $V1=\omega \times r$, wherein $\omega=2\pi n$, i.e., $V1=2\pi n \times r$. Therefore, $2\pi n \times r \leq 41$ m/s, which is the design target of the snow scraping component. Under such design target, the present embodiment provides several following possible combinations, and the present embodiments are not limited to the several following possible combinations.

| Radius of the snow scraping component r(m) | Rotary speed of the snow scraping component (r/min) | Angular speed of the snow scraping component (rad/s) | Linear speed of the snow scraping component V1(m/s) |
|---|---|---|---|
| 0.12 | 3200 | 335.104 | 40.21248 |
| 0.12 | 2500 | 261.8 | 31.416 |
| 0.12 | 2000 | 209.44 | 25.1328 |
| 0.12 | 1600 | 167.552 | 20.10624 |
| 0.12 | 1400 | 146.608 | 17.59296 |
| 0.12 | 1300 | 136.136 | 16.33632 |
| 0.12 | 800 | 83.776 | 10.05312 |
| 0.1 | 3200 | 335.104 | 33.5104 |
| 0.1 | 2500 | 261.8 | 26.18 |
| 0.1 | 2000 | 209.44 | 20.944 |
| 0.1 | 1600 | 167.552 | 16.7552 |
| 0.1 | 1400 | 146.608 | 14.6608 |
| 0.1 | 1300 | 136.136 | 13.6136 |
| 0.1 | 800 | 83.776 | 8.3776 |
| 0.085 | 3200 | 335.104 | 28.48384 |
| 0.085 | 2500 | 261.8 | 22.253 |
| 0.085 | 2000 | 209.44 | 17.8024 |
| 0.085 | 1600 | 167.552 | 14.24192 |
| 0.085 | 1400 | 146.608 | 12.46168 |
| 0.085 | 1300 | 136.136 | 11.57156 |
| 0.085 | 800 | 83.776 | 7.12096 |
| 0.065 | 3200 | 335.104 | 21.78176 |
| 0.065 | 2500 | 261.8 | 17.017 |
| 0.065 | 2000 | 209.44 | 13.6136 |
| 0.065 | 1600 | 167.552 | 10.89088 |
| 0.065 | 1400 | 146.608 | 9.52952 |
| 0.065 | 1300 | 136.136 | 8.84884 |
| 0.065 | 800 | 83.776 | 5.44544 |

Under the results of the above design, the momentum when the thrown objects make contact with people or objects is as shown in the following table.

| Radius of the snow scraping component r(m) | Rotary speed of the snow scraping component (r/min) | Linear speed V1 of the snow scraping component (m/s) | Mass M of thrown objects (kg) | Momentum I of the thrown objects (kg · m/s) |
|---|---|---|---|---|
| 0.12 | 3200 | 40.21248 | 0.001 | 0.04021248 |
| 0.12 | 2500 | 31.416 | 0.001 | 0.031416 |
| 0.12 | 2000 | 25.1328 | 0.001 | 0.0251328 |
| 0.12 | 1600 | 20.10624 | 0.001 | 0.02010624 |
| 0.12 | 1400 | 17.59296 | 0.001 | 0.01759296 |
| 0.12 | 1300 | 16.33632 | 0.001 | 0.01633632 |
| 0.12 | 800 | 10.05312 | 0.001 | 0.01005312 |
| 0.1 | 3200 | 33.5104 | 0.001 | 0.0335104 |
| 0.1 | 2500 | 26.18 | 0.001 | 0.02618 |
| 0.1 | 2000 | 20.944 | 0.001 | 0.020944 |
| 0.1 | 1600 | 16.7552 | 0.001 | 0.0167552 |
| 0.1 | 1400 | 14.6608 | 0.001 | 0.0146608 |
| 0.1 | 1300 | 13.6136 | 0.001 | 0.0136136 |
| 0.1 | 800 | 8.3776 | 0.001 | 0.0083776 |
| 0.085 | 3200 | 28.48384 | 0.001 | 0.02848384 |
| 0.085 | 2500 | 22.253 | 0.001 | 0.022253 |
| 0.085 | 2000 | 17.8024 | 0.001 | 0.0178024 |
| 0.085 | 1600 | 14.24192 | 0.001 | 0.01424192 |
| 0.085 | 1400 | 12.46168 | 0.001 | 0.01246168 |
| 0.085 | 1300 | 11.57156 | 0.001 | 0.01157156 |
| 0.085 | 800 | 7.12096 | 0.001 | 0.00712096 |
| 0.065 | 3200 | 21.78176 | 0.001 | 0.02178176 |
| 0.065 | 2500 | 17.017 | 0.001 | 0.017017 |
| 0.065 | 2000 | 13.6136 | 0.001 | 0.0136136 |
| 0.065 | 1600 | 10.89088 | 0.001 | 0.01089088 |
| 0.065 | 1400 | 9.52952 | 0.001 | 0.00952952 |
| 0.065 | 1300 | 8.84884 | 0.001 | 0.00884884 |
| 0.065 | 800 | 5.44544 | 0.001 | 0.00544544 |

The moving path of the automatic moving snow removal device is explained in the following. The automatic moving snow removal device automatically moves along a planned path, and generates a moving track. The set of the moving tracks of the snow blower in the whole working area is defined as a moving track set, comprising multiple moving paths in parallel or forming an angle. In a first case, in the moving track set of the snow blower, there are at least two moving tracks including a first moving track and a second moving track which are basically parallel. The "basically parallel" means that an included angle between the two moving tracks is smaller than or equal to 10°. In a second case, the first moving track and the second moving track are adjacent and are overlapped with each other, and an overlapping width is d to avoid that the residual snow between the two adjacent moving tracks is not cleaned completely. In a third case, a maximal overlapping width between the first moving track and the second moving track is dmax, and a minimal overlapping width is dmin, the length of the shortest of the first moving track and the second moving track is L, the "basically parallel" means that the included angle between the two moving tracks is smaller than or equal to (dmax−dmin)/(180*π*L, and dmin≥0

The snow blower, the snow blower system and the control method for a snow blower under another design thought are introduced in combination with FIGS. 61-66.

Figure 61:
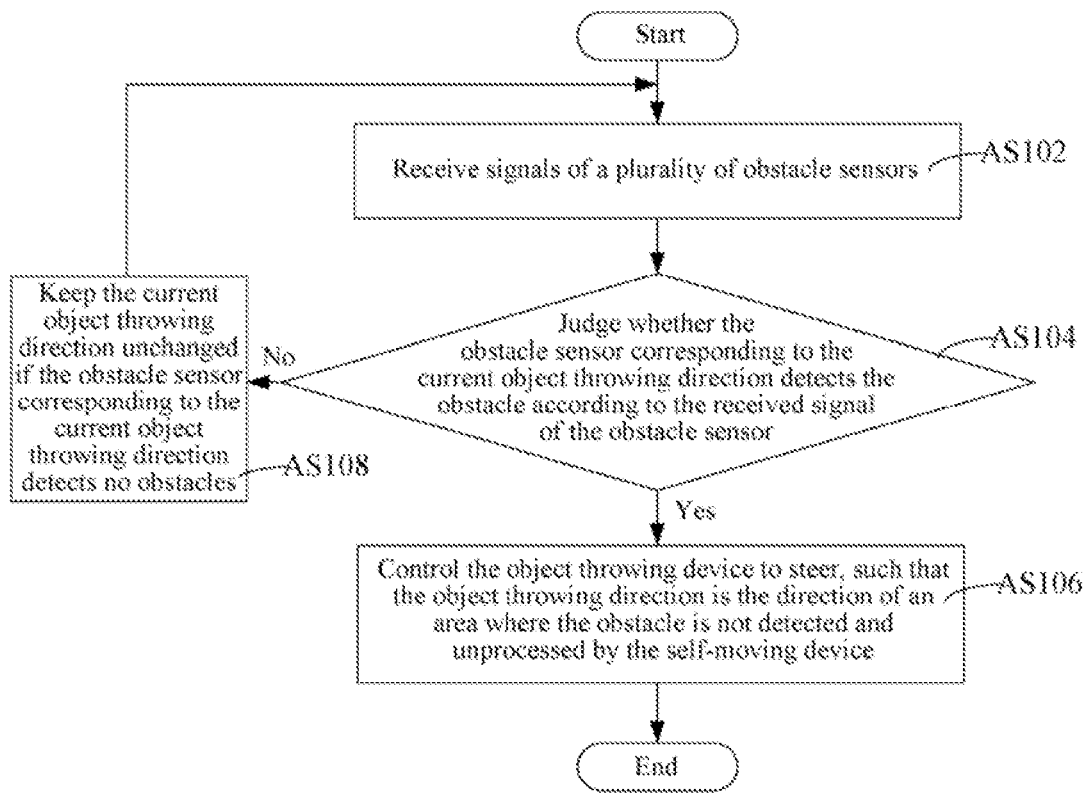
FIG. 61 is a schematic diagram of a control method for a self-moving device in an embodiment.

Referring to FIG. 61, FIG. 61 is a schematic diagram of a control method for a self-moving device in an embodiment. In the embodiment, the self-moving device can be provided with a turnable object throwing device and a plurality of obstacle sensors respectively corresponding to different detection positions. For example, when the self-moving device is a snow throwing machine, the throwing device can be a snow throwing cylinder, and the obstacle sensor can be an ultrasonic sensor. The method can comprise:

AS102: receiving signals of the plurality of obstacle sensors.

Specifically, the self-moving device can be provided controller and a plurality of obstacle sensors, the controller can receive the signals of the plurality of obstacle sensors in real time, for example, when the obstacle sensors detect an obstacle within the detection range, the signal is sent to the controller.

AS104: judging whether the obstacle sensor corresponding to the current object throwing direction detects an obstacle according to the received signal of the obstacle sensor.

Figure 62:
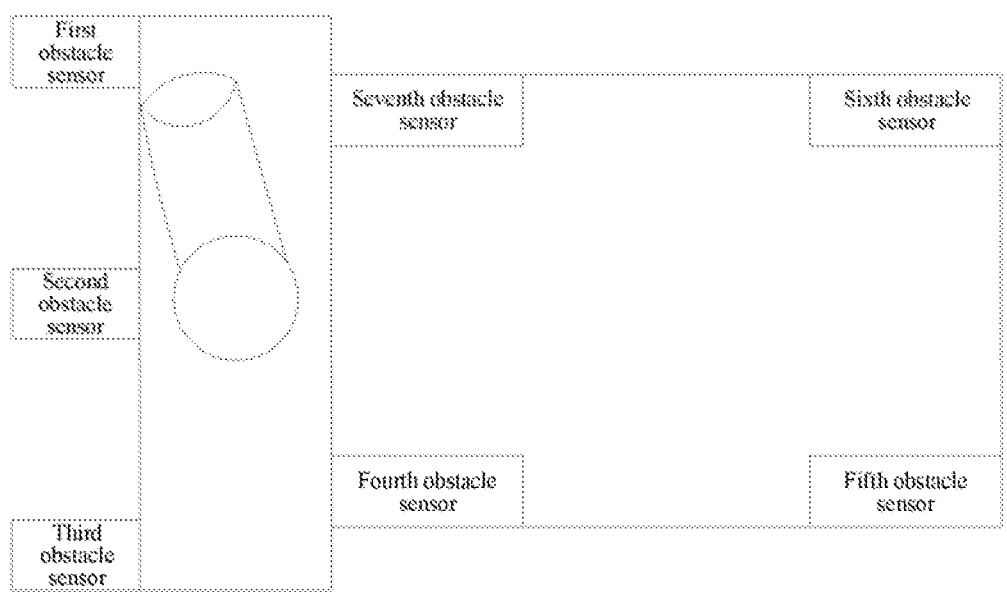
FIG. 62 is a schematic diagram of a self-moving device in an embodiment.

Specifically, the plurality of obstacle sensors can be numbered, for example, as shown in FIG. 62, FIG. 62 is a schematic diagram of a self-moving device in an embodiment, the self-moving device is provided with 7 obstacle sensors, in other embodiments, the self-moving device can also be provided with 5, 8, 10 and 12 obstacle sensors, the 7 obstacle sensors are respectively located around the self-moving device, to ensure that the obstacles around the self-moving device can be detected. The controller can judge whether the obstacle sensor corresponding to the current object throwing direction detects the obstacle according to the received signal of the obstacle sensor.

AS106: controlling the object throwing device to steer when the obstacle sensor corresponding to the current object throwing direction detects the obstacle, such that the object throwing direction is the direction of an area where the obstacle is not detected and which is unprocessed by the self-moving device.

When the obstacle sensor corresponding to the current object throwing direction detects the obstacle, then the object throwing direction of the object throwing device is required to be changed, but if the changed object throwing direction points at the area that has been processed by the self-moving device, then the work of the self-moving device will be caused to be ineffective, for example, when the self-moving device is a snow throwing machine, if the current snow throwing direction is a first direction, a second direction points at the area that has been processed by the self-moving device, when the obstacle exists in the first direction, if the object throwing direction of the object throwing device is set to be the second direction, then the snow throwing machine will be caused to throw snow to the swept area, as a result, the previous sweeping work is ineffective and re-cleaning is required. In order to solve the problem according to the present embodiment, when the snow throwing direction is reset, firstly whether the direction corresponding to the obstacle sensor not detecting the obstacle points at the area that has been processed by the self-moving device is judged, if the direction corresponding to the obstacle sensor not detecting the obstacle does not point at the area that has been processed by the self-moving device, then the object throwing direction is set to be the direction of the corresponding obstacle sensor not pointing at the area that has been processed by the self-moving device.

AS108: if the obstacle sensor corresponding to the current object throwing direction does not detect the obstacle, then keeping the current object throwing direction unchanged, and continuing the step AS102 of receiving signals of the plurality of obstacle sensors.

According to the above control method for a self-moving device, by receiving the signals of the plurality of obstacle sensors on the self-moving device, whether there is the obstacle in the current object throwing direction is judged in real time, and if not, the object throwing direction is timely set to be the direction of the area where the obstacle is not detected and which is unprocessed by the self-moving device, thereby realizing intelligent control, and timely controlling the object throwing direction to prevent the objects from being thrown to other objects or other processed areas to cause danger or repeated work.

Referring to FIG. 62 again, an initial object throwing direction of the object throwing device is set to be the first direction, that is, the direction where the seventh obstacle sensor points at, at this point, since the self-moving device does not begin to work yet, there is no area that has been processed by the self-moving device. Therefore, there is not need to judge whether the direction corresponding to the obstacle sensor not detecting the obstacle points at the area that has been processed by the self-moving device. Therefore, the present embodiment may comprise receiving the signals of the plurality of obstacle sensors before the self-moving device moves, judging whether the obstacle sensor corresponding to the current object throwing direction detects an obstacle according to the received signal of the obstacle sensor, and if the obstacle sensor corresponding to the initial object throwing direction detects the obstacle, then setting the object throwing direction to be the direction corresponding to the obstacle sensor not detecting the obstacle. Therefore, in the present embodiment, it can be guaranteed that before the self-moving device moves, an object throwing direction can be preset according to the surrounding environment.

Figure 63:
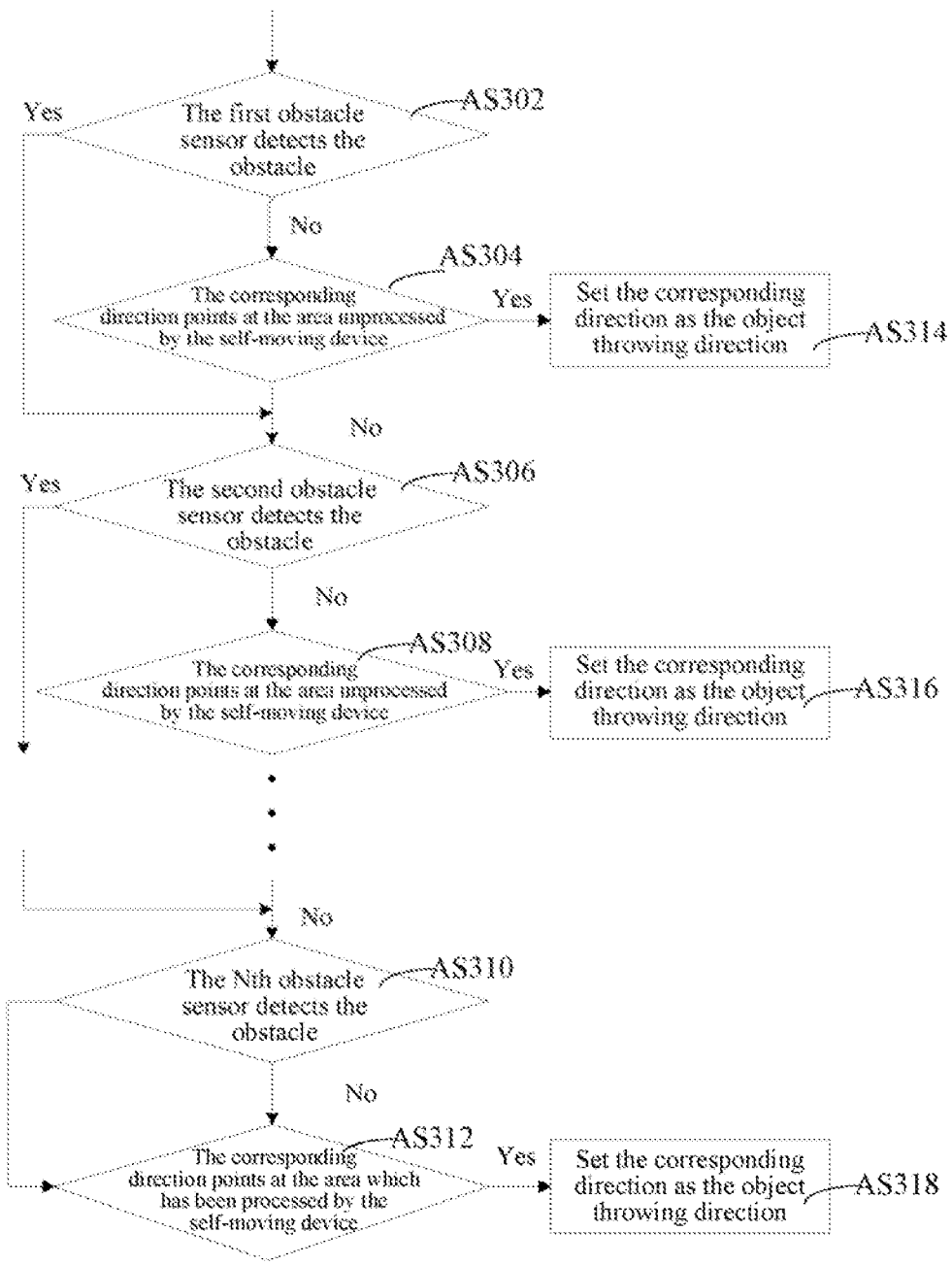
FIG. 63 is a processing flowchart of step S106 in the embodiment of FIG. 61.

Referring to FIG. 63, FIG. 63 is a processing flowchart of the step AS106 in the embodiment of FIG. 61. In the present embodiment, the step of setting the object throwing direction to be the direction of an area where the obstacle is not detected and which is unprocessed by the self-moving device can comprise: judging whether the obstacle sensors except for the obstacle sensor corresponding to the current object throwing direction detect the obstacle, if the obstacle sensor not detecting the obstacle exists, judging whether a direction corresponding to the obstacle sensor not detecting the obstacle points at the area unprocessed by the self-moving device, if the direction corresponding to the obstacle sensor not detecting the obstacle points at the area that has been processed by the self-moving device, then continuing to judge till one of the obstacle sensors not detecting the obstacle is judged and the direction corresponding to such obstacle sensor points at the area unprocessed by the self-moving device, and setting the corresponding direction to be the object throwing direction.

For example, referring to FIG. 63, assuming that the obstacle sensor corresponding to the current object throwing direction is the seventh obstacle sensor, when the seventh obstacle sensor detects the obstacle, then step AS302 of judging whether the first obstacle sensor detects the obstacle is performed, and if the first obstacle sensor detects no obstacle, then the step AS304 of judging whether the direction corresponding to the first obstacle sensor points at the area unprocessed by the self-moving device is continued. If the first obstacle sensor detects the obstacle, then the step AS306 of judging whether the second obstacle sensor detects the obstacle is continued, if the second obstacle sensor detects no obstacle, then the step AS308 of judging whether the direction corresponding to the second obstacle sensor points at the area unprocessed by the self-moving device is continued, otherwise, the step of judging whether the third obstacle sensor detects the obstacle is continued, and so on till the last obstacle sensor is judged, i.e., the step AS310 of judging whether the Nth obstacle sensor detects the obstacle is judged. In the above judging process, when there is one obstacle sensor not detecting the obstacle and the direction corresponding to such obstacle sensor does not point at the area that has been processed by the self-moving device, the judging can be stopped, and the corresponding direction is set as the object throwing direction. For example, in FIG. 63, as shown in the step AS314 or the step AS316 or the step AS318, if the direction corresponding to the obstacle sensor not detecting the obstacle points at the area unprocessed by the self-moving device, then the object throwing direction is set to be the direction corresponding to the obstacle sensor not detecting the obstacle.

The steps in the above method is performed serially, that is, all the obstacle sensors are judged in sequence, and in other embodiments, all the obstacle sensors can be judged in parallel, which is not repeated here.

Figure 64:
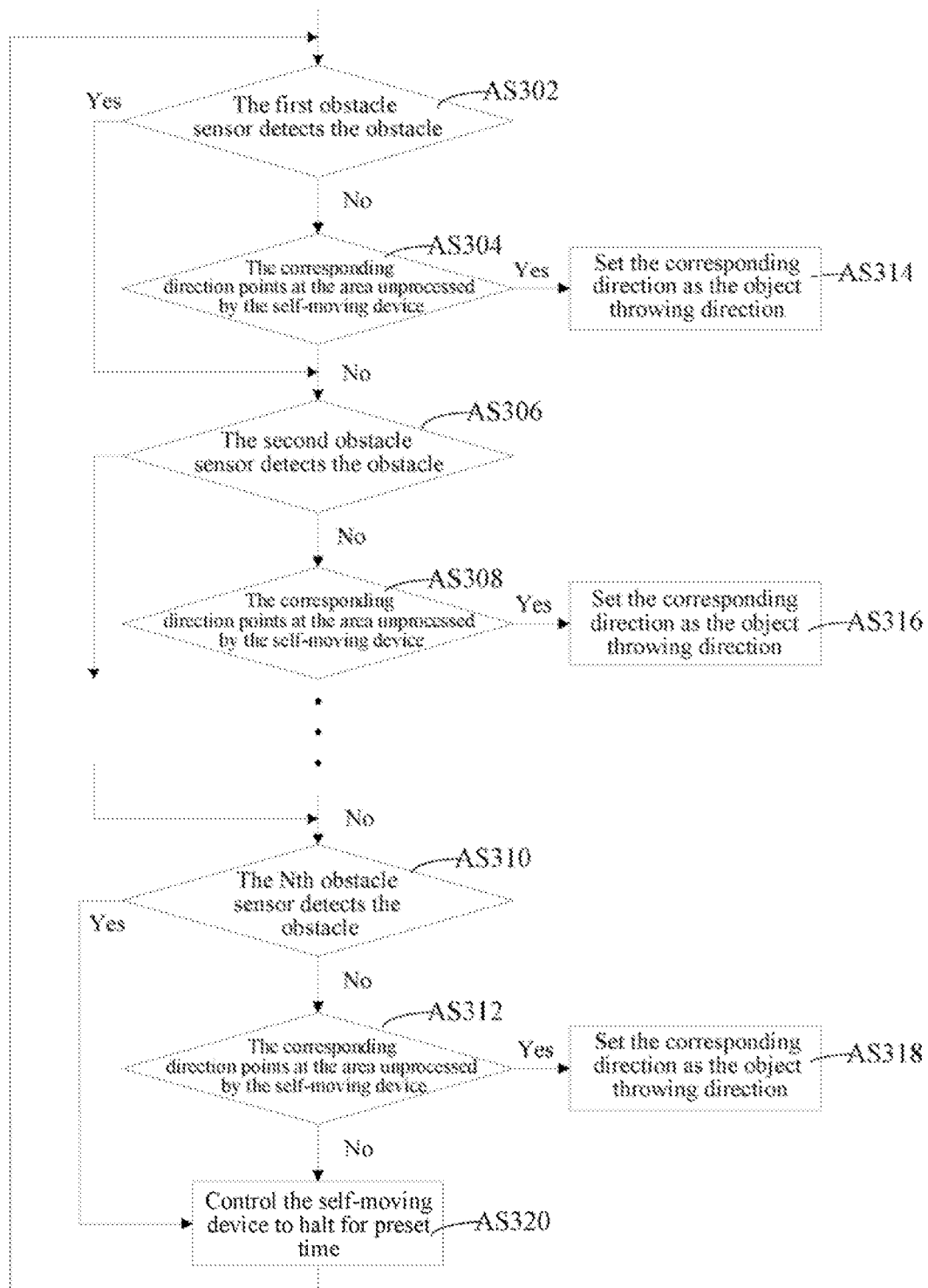
FIG. 64 is another processing flowchart of step S106 in the embodiment of FIG. 61.

In one of the embodiments, referring FIG. 64, FIG. 64 is another processing flowchart of the step AS106 in the embodiment of FIG. 61. The steps AS302 to AS318 in the present embodiment are consistent with the above text and are not repeated here. In the present embodiment, if all obstacle sensors detect the obstacle, or the directions corresponding to the obstacle sensors not detecting the obstacle are all the directions of the areas that have been processed by the self-moving device, then the step AS320 of controlling the self-moving device to halt for preset time, and then continuing to execute the step of judging whether the obstacle sensor corresponding to the current object throwing direction detects an obstacle according to the received signal of the obstacle sensor is continued. In this way, when the obstacle exists around the self-moving device or the obstacle exists in the direction corresponding to the area unprocessed by the self-moving device, the self-moving device is controlled to be halted for certain time, and the work is performed after the obstacle around the self-moving device is cleared.

Figure 65:
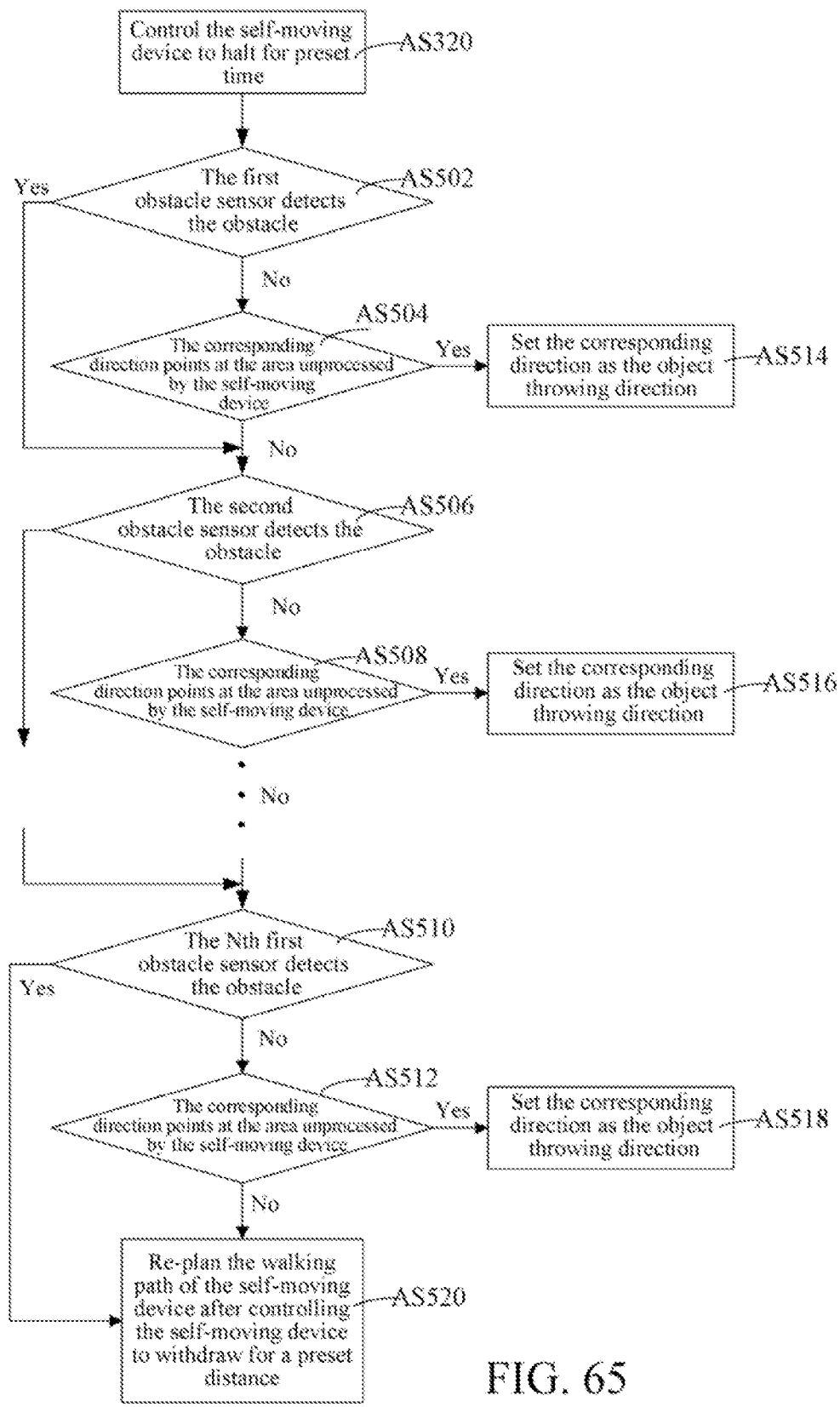
FIG. 65 is a processing flowchart after a step of controlling a self-moving device for halting for preset time in the embodiment as shown in FIG. 64.

In one embodiment, referring to FIG. 65, 65 is a processing flowchart after a step of controlling a self-moving device for halting for preset time in the embodiment as shown in FIG. 64. For example, after the step AS320 of controlling the self-moving device to halt for preset time, the step AS502 of judging whether the first obstacle sensor detects the obstacle can be continued, if the first obstacle sensor detects the obstacle, then the step AS506 of judging whether the second obstacle sensor detects the obstacle is continued, if the second obstacle sensor detects the obstacle too, then whether the third obstacle sensor detects the obstacle is judged, and so on till the last obstacle sensor is judged, that is, the step of judging whether the Nth obstacle sensor detects the obstacle is judged, wherein, N is a positive integer. For example, in the embodiment as shown in FIG. 62, N is 7 and represents the number of the obstacle sensors on the self-moving device. If the first obstacle sensor detects no obstacle, then the step AS504 of judging whether the direction corresponding to the first obstacle sensor points at the area unprocessed by the self-moving device is continued, if the direction corresponding to the first obstacle sensor points at the area unprocessed by the self-moving device, then the step of AS514 of setting the corresponding direction to be the object throwing direction is continued. If the second obstacle detects no obstacle, then the step AS508 of judging whether the direction corresponding to the second obstacle sensor points at the area unprocessed by the self-moving device is continued, if the direction corresponding to the second obstacle sensor points at the area unprocessed by the self-moving device, then the step of AS516 of setting the corresponding direction to be the object throwing direction is continued. Similarly, if the Nth obstacle sensor detects no obstacle, then the step AS512 of judging whether the direction corresponding to the Nth obstacle sensor points at the area unprocessed by the self-moving device is continued, if the direction corresponding to the Nth obstacle sensor points at the area unprocessed by the self-moving device, then the step of AS518 of setting the corresponding direction to be the object throwing direction is continued. But if after the self-moving device is controlled to halt for certain time, all obstacle sensors detect the obstacle, or the directions corresponding to the obstacle sensors not detecting the obstacle are all the direction of the areas that have been processed by the self-moving device, then the step AS520 of controlling the self-moving device to withdraw for certain distance, and re-planning a moving path of the self-moving device is executed.

In such case, if after the self-moving device is controlled to halt for certain time, all obstacle sensors detect the obstacle, or the directions corresponding to the obstacle sensors not detecting the obstacle are all the direction of the areas that have been processed by the self-moving device, then the current self-moving device cannot work normally, and therefore the moving path of the self-moving device is re-planned.

In actual application, the method can comprise the following step: if the obstacle sensors except for the obstacle sensor corresponding to the current object throwing direction detect the obstacle, then after the self-moving device is controlled to halt for preset time, whether the obstacle sensor not detecting the obstacle exists is judged according to the received signal of the obstacle sensor. In the present embodiment, since all obstacle sensors detect the obstacle, i.e., the obstacle exists around the self-moving device, then the self-moving device cannot throw objects at this point, therefore, the self-moving device is controlled to halt for time buckets such as 2 min, 3 min and 4 min, and then whether the obstacle sensor still judges the obstacle is judged. If the obstacle sensor not detecting the obstacle exists, then whether the direction corresponding to the obstacle sensor not detecting the obstacle points at the area unprocessed by the self-moving device is continuously judged. At this point, if the obstacle sensor not detecting the obstacle exists, and the direction corresponding to the obstacle sensor not detecting the obstacle points at the area unprocessed by the self-moving device, then the object throwing direction can be set to be such direction. If the direction corresponding to the obstacle sensor not detecting the obstacle still points at the area that has been processed by the self-moving device, then the after the self-moving device is controlled to withdraw for preset distance, the moving path of the self-moving device is re-planned. Specifically, if the self-moving device is controlled to halt for preset time, either all the obstacle sensor detect the obstacle, or the direction corresponding to the obstacle sensor not detecting the obstacle still points at the area that has been processed by the self-moving device, then the self-moving device cannot work at present. Therefore, the moving path of the self-moving device is re-planned. If the direction corresponding to the obstacle sensor not detecting the obstacle points at the area unprocessed by the self-moving device, then the object throwing direction is set to be any direction of the corresponding obstacle sensor pointing at the area unprocessed by the self-moving device.

Besides, in actual application, the method can comprise the following step: if the directions corresponding to the obstacle sensors not detecting the obstacle all point at the directions of the areas that have been processed by the self-moving device, then after the self-moving device is controlled to halt for preset time, then continuing to judge whether the obstacle sensor not detecting the obstacle exists according to the received signal of the obstacle sensor. In the present embodiment, since all obstacle sensors detect the obstacle, i.e., the obstacle exists around the self-moving device, then the self-moving device cannot throw objects at this point, therefore, the self-moving device is controlled to halt for time buckets such as 2 min, 3 min and 4 min, and then whether the obstacle sensor still judges the obstacle is judged. If the obstacle sensors not detecting the obstacle exist, then whether the direction corresponding to the obstacle sensor not detecting the obstacle points at the area unprocessed by the self-moving device is continuously judged; at this point, if the obstacle sensor not detecting the obstacle exists and the direction corresponding to the obstacle sensor not detecting the obstacle points at the area unprocessed by the self-moving device, then the object throwing direction is set to be such direction. If the direction corresponding to the obstacle sensor not detecting the obstacle still points at the area that has been processed by the self-moving device, then the self-moving device is controlled to withdraw for the preset distance, and the moving path of the self-moving device is re-planned. Specifically, if after the self-moving device is halted for certain time, either all obstacle sensors detect the obstacle or the direction corresponding to the obstacle sensor not detecting the obstacle still points at the area that has been processed by the self-moving device, then the current self-moving device cannot normally work, therefore, the moving path of the self-moving device is re-planned. If the direction corresponding to the obstacle sensor not detecting the obstacle points at the area that has been processed by the self-moving device, then the object throwing direction is set to be any direction of the corresponding obstacle sensor pointing at the area unprocessed by the self-moving device.

In addition, it should be noted that when the object throwing device is steered, the self-moving device can work or not, for example, when the self-moving device is the snow throwing machine and when the snow throwing cylinder is steered, the snow throwing machine can continue to move to clean the snow on the road surface. In addition, when two or more obstacles detect the obstacle, the system can calculate a proper direction to control the object throwing device to steer.

Figure 66:
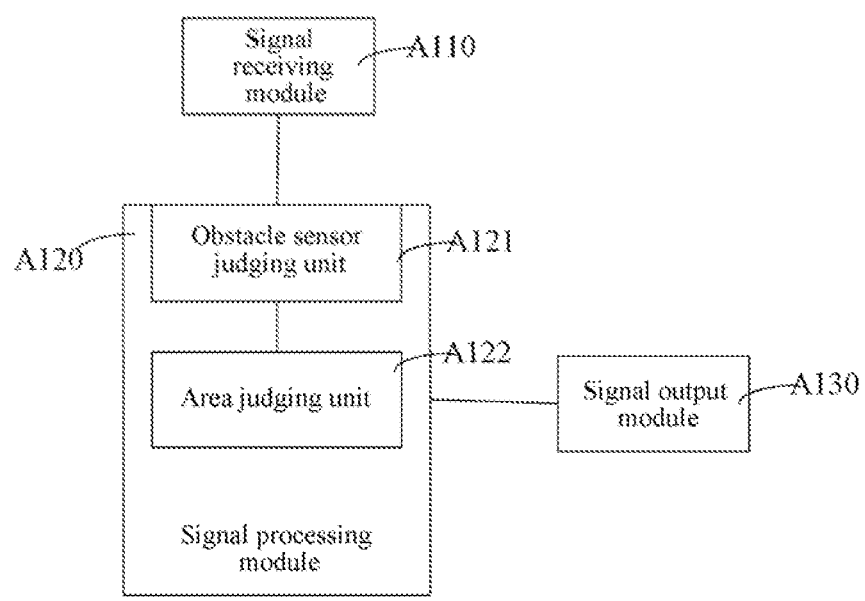
FIG. 66 is a structural schematic diagram of a control system for a self-moving device in an embodiment.

Referring to FIG. 66, FIG. 66 is a structural schematic diagram of a control device for a self-moving device in one embodiment. In the embodiment, the self-moving device is provided with a turnable object throwing device and a plurality of obstacle sensors, the system can comprise a signal receiving module A110, a signal processing module A120 and a signal output module A130. An input end of the signal processing module A120 is connected to an output end of the signal receiving module A110. An input end of the signal output module A130 is connected to an output end of the signal processing module A120. The signal receiving module A110 is configured to receive signals of the plurality of obstacle sensors, the signal processing module A120 is configured to judge whether the obstacle sensor corresponding to the current object throwing direction detects an obstacle according to the received signal of the obstacle sensor, the signal output module A130 is configured to cause the object throwing device to steer when the obstacle sensor corresponding to the current object throwing direction detects the obstacle, such that the object throwing direction is the direction of an area where the obstacle is not detected and which is unprocessed by the self-moving device. The specific working manners and processing flows of the three modules can refer to the above and are not repeated here.

In one embodiment, the signal processing module comprises an obstacle sensor judging unit A121 and an area judging unit A122, an input end of the obstacle sensor judging unit A121 is connected to the output end of the signal receiving module A110, an input end of the area judging unit A122 is connected to an output end of the obstacle sensor judging unit A121, the obstacle sensor judging unit A121 is configured to judge whether the obstacle sensors except for the obstacle sensor corresponding to the current object throwing direction detect the obstacle; and the area judging unit A122 is configured to, if the obstacle sensor not detecting the obstacle exists, judge whether a direction corresponding to the obstacle sensor not detecting the obstacle points at the area unprocessed by the self-moving device.

In one embodiment, the signal output module A130 is configured to, when all obstacle sensors detect the obstacle, or the directions corresponding to the obstacle sensors not detecting the obstacle are all the directions of the areas that have been processed by the self-moving device, control the self-moving device to halt for preset time, and then judge whether the obstacle sensor corresponding to the current object throwing direction detects an obstacle according to the received signal of the obstacle sensor; and after the self-moving device is halted for certain time, all obstacle sensors detect the obstacle, or the directions corresponding to the obstacle sensors not detecting the obstacle are all the directions of the areas that have been processed by the self-moving device, control the self-moving device to withdraw for certain distance, and re-plan a moving path of the self-moving device.

Figure 67:
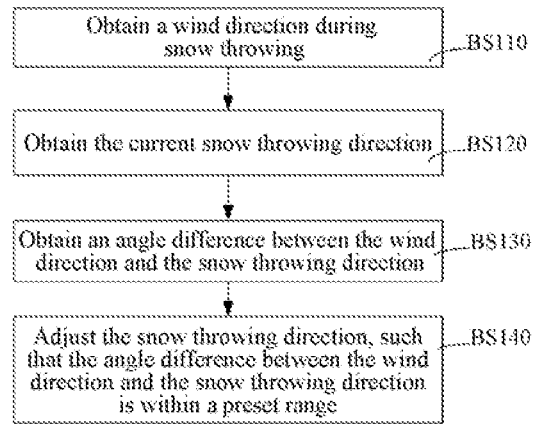
FIG. 67 is a flow schematic diagram of a snow throwing method in an embodiment.
Figure 68:
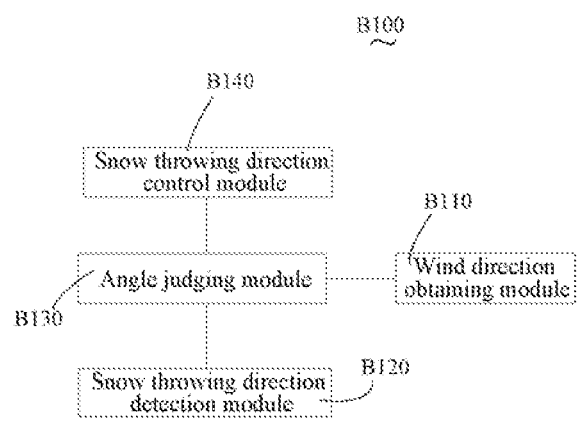
FIG. 68 is a structural block diagram of a snow throwing system in an embodiment.

The snow throwing method and the snow throwing system under a third design thought are introduced in combination with FIGS. 67-68. The present embodiments provide a snow throwing method, which can realize downwind snow throwing, avoids dead wind snow throwing, or control the dead wind snow throwing effect within a receivable degree, thereby ensuring the snow throwing effect and improves the working efficiency.

As shown in FIG. 67, a snow throwing method comprises:

Step BS110: obtaining a wind direction during snow throwing.

After the snow throwing machine is started for operation, the wind direction under the current operation environment needs to be determined timely. Specifically, the wind direction is obtained by using an existing wind speed and wind direction detector. The wind direction detection is a mature technology per se and is not explained excessively here. By using the detector, the wind power can be detected simultaneously.

After being detected, the wind direction is sent to a snow throwing direction control module in a wireless or wired communication manner as one basis for adjusting the snow throwing direction later.

After the snow throwing machine is started for operation, if the wind direction is basically fixed, the wind power is basically unchanged, or when the wind direction is basically fixed, and only the wind power is changed, the detector can directly detect and obtain the wind direction, which serves as the wind direction during snow throwing, i.e., serving as one basis for adjusting the snow throwing direction later.

When the wind direction is not fixed, and the wind power is unchanged or changed: the step BS110 specifically comprises: obtaining multiple wind power of multiple wind directions and the wind directions within a preset time period; selecting the wind direction of the maximal wind power; and taking the wind direction with the largest wind power as the wind direction during snow throwing.

The wind direction with the largest wind power is the main wind direction affecting snow throwing, and therefore is also the adjusting basis for the main direction of snow throwing. By taking it as the adjusting basis, it can be ensured that no dead wind snow throwing exists during snow throwing, and the downwind snow throwing can be effectively realized.

During snow throwing, the thrown snow has certain initial speed, and the initial speed has certain role for keeping the snow throwing direction. Therefore, the thrown snow can be obviously affected only when the wind power is larger. While when the wind is only breeze with the unchanged wind direction or breeze with the changed wind direction, the wind still exists, but does not always affect the snow throwing. In other words, even though the snow is thrown against the wind, the snow removal effect will not be affected.

Therefore, further, when the wind direction is not fixed, and the wind power is unchanged or changed, the method further comprises the step judging whether the maximal wind power exceeds a predetermined threshold; and taking the wind direction of the maximal wind direction as the wind direction during snow throwing if yes, and selecting any wind direction as the wind direction during snow throwing or no wind direction if no.

The predetermined threshold here is the proper wind power threshold determined according to the initial speed of snow throwing. If the wind power exceeds the threshold, then the wind direction corresponding to the wind power is taken as the wind direction during snow throwing, that is, taken as the subsequent adjusting basis. If the wind power of the multiple wind directions are all smaller, then any wind direction can be selected as the wind direction during snow throwing. When any wind direction is not selected, the snow throwing direction is kept unchanged.

Step BS120 obtaining a current snow throwing direction.

Specifically, the sensor for detecting an angle mounted on the snow throwing mechanism can be used to obtain the throwing angle of the thrown snow. If the snow throwing mechanism is a snow throwing head rotary mechanism, the sensor for detecting the angle (for example, a rotational potentiometer) can be mounted in the rotary mechanism, and is controlled by a step-motor to rotate, to adjust the snow throwing direction.

Step BS130 obtaining an angle difference between the wind direction and the snow throwing direction.

The angle difference between the wind direction and the snow throwing direction is calculated by using an angle judging submodule.

Step BS140 adjusting the snow throwing direction to enable the angle difference between the wind direction and the snow throwing direction to be within a preset range.

Specifically, enabling the angle difference between the wind direction and the snow throwing direction to be within the predetermined range comprises adjusting the snow throwing direction to be consistent with the wind direction. At this point, no angle difference exists between the two, that is, the difference is zero.

The manners for adjusting the snow throwing direction at least comprise:

rotating the snow throwing mechanism to change the snow throwing direction. For example, the angle when the snow is thrown by rotating the snow throwing mechanism.

The snow throwing method according to the present embodiments further comprise the following step:

Step BS150, obtaining the wind power after the wind direction is changed.

In the normal snow throwing process of the snow throwing machine, the snow throwing is performed according to the determined snow throwing direction, downwind snow throwing can be realized, the dead wind snow throwing can be avoided, and even the dead wind snow throwing occurs, it can be controlled within a controllable degree.

But in normal snow throwing, the wind direction can still be changed. While after the wind direction is changed, the wind power may be changed or not, which can affects the snow throwing or not. Therefore, in this step, after being obtained, the wind power can still serve as the basis for subsequently adjusting the snow throwing direction.

Step BS160, judging whether the wind power exceeds a predetermined threshold.

Specifically, the predetermined threshold here is the proper wind power threshold determined according to the snow throwing initial speed.

Step BS170, entering the step of adjusting the snow throwing direction to enable the angle difference between the wind direction and the snow throwing direction to be within a preset range if yes, and keeping the snow throwing direction unchanged if no.

If the wind power after the wind direction exceeds the predetermined threshold, then the snow throwing direction is adjusted, such that the angle difference between the snow throwing direction and the wind direction is within the predetermined range, that is, the step BS130 is executed.

While when the wind power after the wind direction is changed is smaller than the predetermined threshold, the snow throwing direction is not adjusted, and at this point, the snow throwing effect is not affected. Of course, the snow throwing direction can also be adjusted according to the changed wind direction.

When the wind power after the wind direction is smaller than the preset threshold, and the snow throwing direction is not adjusted and kept unchanged, in order to avoid the influence of device errors on the snow throwing effect, the initial speed when the snow is thrown can be increased.

With reference to FIG. 68, the present embodiments further provide a snow throwing system B100, comprising:
a wind direction obtaining module B110, configured to obtain a wind direction during snow throwing;
a snow throwing direction detection module B120, configured to obtain a current snow throwing direction;
an angle judging module B130, configured to obtain an angle difference between the wind direction and the snow throwing direction; and a snow throwing direction control module B140, configured to adjust the snow throwing direction to enable the angle difference between the wind direction and the snow throwing direction to be within a preset rang.

According to the above snow throwing system, the wind direction obtaining module B110 obtains the wind direction under the operation environment of the snow throwing machine, then the snow throwing direction detection module B120 detects the current snow throwing direction, and the angle judging module B130 is configured to calculate the angle difference between the wind direction and the snow throwing direction. Then the snow throwing direction control module B140 controls the snow throwing direction, such that the angle difference between the snow throwing direction and the wind direction is within the predetermined range. In this way, the downwind snow throwing can be realized, or even the dead wind snow throwing occurs, it can be controlled in a receivable degree.

Further, the manner for the snow throwing direction control module B140 to adjust the snow throwing direction is to rotate the snow throwing mechanism to change the snow throwing direction.

Further, the wind direction obtaining module B110 is further configured to: obtain wind power after the wind direction is changed; and judge whether the wind power exceeds a predetermined threshold. When the wind power exceeds the predetermined threshold, the snow throwing direction control module B140 adjusts the snow throwing direction, such that the angle difference between the snow throwing direction and the wind direction is in the predetermined range. When the wind power does not exceeds the predetermined threshold, the snow throwing direction control module B140 keeps the snow throwing direction unchanged or adjusts the snow throwing direction according to the adjusted wind direction.

When the wind power does not exceed the predetermined threshold, and the snow throwing direction control module B140 keeps the snow throwing direction unchanged, the throwing direction control module B140 is further configured to increase an initial speed when the snow is thrown, thereby ensuring that the snow throwing is not affected by the dead wind.

Further, the wind direction obtaining module B110 is further configured to: obtain multiple wind power of multiple wind directions and the wind directions within a preset time period; select the wind direction of the maximal wind power; and take the wind direction of the maximal wind power as the wind direction during snow throwing. The wind direction obtaining module B110 is further configured to: judge whether the maximal wind power exceeds a predetermined threshold; and take the wind direction of the maximal wind direction as the wind direction during snow throwing if yes, and select any wind direction as the wind direction during snow throwing or no wind direction if no.

The predetermined threshold here is the proper wind threshold determined according to the initial snow throwing speed. If the wind power exceeds the threshold, then the wind direction corresponding to the wind power is taken as the wind direction during snow throwing, that is, as the reference for subsequent adjustment. If the wind power of the multiple wind directions are all smaller, then any wind direction can be selected as the wind direction during snow throwing. Or any wind direction is not selected, and at this point, the snow throwing direction is kept unchanged. In this way, when the wind direction is not fixed, and the wind power is unchanged or changed, the wind direction obtaining module B110 can fast determine the wind direction as the adjustment reference.

Respective technical features of the above embodiments can be combined freely, in order for concise description, not all possible combinations of respective technical features of the above embodiments are described. However, the combinations of these respective technical features are considered to be within the scope of the description as long as they do not conflict against each other.

The foregoing embodiments merely express several embodiments of the present invention, the description is relatively specific and detailed, but cannot be understood as a limitation to the scope of the present invention. It should be pointed out that those ordinary skilled in the art can make several transformations and improvements without departing from the concept of the present invention, which all belong to the protective scope of the present invention. Therefore, the protective scope of the present invention patent should take the appended claims as a criterion.

What is claimed is:

1. An automatic moving snow removal device comprising:
    a working module, configured to execute a specific work of the automatic moving snow removal device;
    a moving module, configured to drive the automatic moving snow removal device to move on a ground; and
    a control module, configured to:
        control the working module and the moving module of the automatic moving snow removal device, to cause the automatic moving snow removal device to move and work within a preset border;
        generate a snow removal path according to a map of the preset border, wherein the map of the preset border comprises at least two different areas, and the at least two different areas comprise at least one snow removal area and at least one of an intersection area, a lawn area, an island area or a narrow passage area;
        execute different control modes according to corresponding marks of the at least two different areas; and
        control the automatic moving snow removal device to move along the snow removal path according to coordinate data provided by a location navigation module.

2. The automatic moving snow removal device according to claim 1, wherein the map of the preset border is formed by continuous coordinates formed in a manner that the location navigation module moves for a circle along a border of a working area.

3. The automatic moving snow removal device according to claim 1, wherein the preset border is an electrified wire disposed along a border of a working area.

4. The automatic moving snow removal device according to claim 3, wherein:
    the location navigation module comprises a satellite location navigation module,
    the automatic moving snow removal device further comprises a position detection module configured to detect a relative position relationship between the automatic moving snow removal device and the electrified wire,
    the control module is further configured to:
        calculate relative coordinates of the automatic moving snow removal device by dead reckoning according to information detected by the position detection module, and
        perform absolute location and error elimination according to coordinates of the satellite location navigation module, to obtain the map of the preset border formed by continuous coordinates of the automatic moving snow removal device along the electrified wire.

5. The automatic moving snow removal device according to claim 1, wherein:
    the location navigation module comprises an ultra wide band location module,
    at least two ultra wide band labels are disposed inside or outside the preset border,
    the ultra wide band location module is configured to calculate relative coordinates of two positions of the automatic moving snow removal device by the at least two ultra wide band labels, and move for a circle along a border of a moving area to form two continuous relative coordinates relative to the ultra wide band labels, and
    the two continuous relative coordinates form the map of the preset border.

6. The automatic moving snow removal device according to claim 1, further comprising:
a dip angle detection module configured to detect a dip angle of the automatic moving snow removal device, wherein:
the location navigation module is configured to record a coordinate value of each point when the automatic moving snow removal device moves along a preset area,
the dip angle detection module is further configured to record a dip angle value of each point, and
the control module is further configured to generate a border map in a 3D form according to the coordinate value and the dip angle value of each point.

7. The automatic moving snow removal device according to claim 1, wherein the snow removal path comprises a path toward one direction or reciprocates back and forth along an extending direction parallel with a road.

8. The automatic moving snow removal device according to claim 1, wherein the snow removal path comprises a path toward one direction or reciprocates back and forth along an extending direction vertical to a road.

9. The automatic moving snow removal device according to claim 1, wherein the snow removal path comprises at least one snow piling point.

10. The automatic moving snow removal device according to claim 1, wherein the snow removal path contains a fixed snow throwing direction.

11. The automatic moving snow removal device according to claim 1, wherein the control module is further configured to default a snow removal to be required for the snow removal area, no snow removal to be required for the island area, and the snow removal to be selective for other areas.

12. The automatic moving snow removal device according to claim 1, wherein the at least two different areas comprise at least two snow removal areas and a connecting passage area between the at least two snow removal areas.

13. The automatic moving snow removal device according to claim 12, wherein the control module is further configured to default a snow removal to be required for the at least two snow removal areas, and the snow removal to be selective for the connecting passage area.

14. The automatic moving snow removal device according to claim 1, wherein the automatic moving snow removal device further comprises a working alarm device, and if the automatic moving snow removal device enters a set area and/or reaches a preset alarm time, the control module is further configured to control the working alarm device to alarm.

15. The automatic moving snow removal device according to claim 1, wherein the control module is further configured to control the automatic moving snow removal device to move to a preset site after the automatic moving snow removal device moves along all the snow removal paths completely.

16. The automatic moving snow removal device according to claim 1, further comprising: an energy module configured to provide energy for the moving module and the working module of the automatic moving snow removal device.

17. The automatic moving snow removal device according to claim 16, wherein the automatic moving snow removal device further comprises a heating thermal insulation device configured to be repeatedly heated by electric energy and keep at least part of the energy module and/or the control module at a preset temperature range.

18. The automatic moving snow removal device according to claim 17, wherein the heating thermal insulation device comprises an electric heating thermal insulation material at least partially covering one or more of a housing of the automatic moving snow removal device, and/or the energy module, or the control module; and the electric heating thermal insulation material is electrified for heating during energy supplement of the automatic moving snow removal device, and is configured to perform thermal insulation during working of the automatic moving snow removal device.

* * * * *